United States Patent
Snellman et al.

(10) Patent No.: US 12,282,466 B2
(45) Date of Patent: Apr. 22, 2025

(54) COMMUNICATING FINE-GRAINED APPLICATION DATABASE ACCESS TO A THIRD-PARTY AGENT

(71) Applicant: ALTR Solutions, Inc., Austin, TX (US)

(72) Inventors: Mark Snellman, Orlando, FL (US); James Douglas Beecham, Austin, TX (US); Judson Benton Locke, Indialantic, FL (US); Christopher Edward Struttmann, Indialantic, FL (US); Thomas Daly, Austin, TX (US)

(73) Assignee: ALTR Solutions, Inc., Austin, TX (US)

(*) Notice: Subject to any disclaimer, the term of this patent is extended or adjusted under 35 U.S.C. 154(b) by 542 days.

(21) Appl. No.: 17/144,110

(22) Filed: Jan. 7, 2021

(65) Prior Publication Data
US 2021/0209077 A1  Jul. 8, 2021

Related U.S. Application Data

(60) Provisional application No. 62/958,198, filed on Jan. 7, 2020.

(51) Int. Cl.
| | | |
|---|---|---|
| *G06F 16/21* | (2019.01) | |
| *G06F 9/4401* | (2018.01) | |
| *G06F 9/54* | (2006.01) | |
| *G06F 16/2452* | (2019.01) | |
| *G06F 16/25* | (2019.01) | |

(52) U.S. Cl.
CPC .......... *G06F 16/217* (2019.01); *G06F 9/4411* (2013.01); *G06F 9/541* (2013.01); *G06F 16/219* (2019.01); *G06F 16/24524* (2019.01); *G06F 16/252* (2019.01)

(58) Field of Classification Search
CPC .......... G06F 16/24524; G06F 16/252
See application file for complete search history.

(56) References Cited

U.S. PATENT DOCUMENTS

| | | | |
|---|---|---|---|
| 9,866,545 B2 | 1/2018 | Beecham | |
| 10,225,263 B2* | 3/2019 | Knight | .......... H04L 63/105 |
| 10,581,977 B2 | 3/2020 | Goldfarb et al. | |
| 2003/0181199 A1* | 9/2003 | Yamaguchi | .......... H04L 9/40 455/418 |
| 2008/0147647 A1* | 6/2008 | Reeb | .......... G06F 16/2423 707/999.005 |
| 2014/0344891 A1 | 11/2014 | Mullick et al. | |
| 2015/0082392 A1 | 3/2015 | Gregg et al. | |

(Continued)

OTHER PUBLICATIONS

"Oracle Fine Grained Auditing," Juniper Secure Analytics Configuring DSMs Guide, Juniper Networks, Oct. 12, 2016, https://www.juniper.net/documentation/en_US/jsa7.3.1/jsa-configuring-dsm/topics/concept/concept-jsa-dsm-oracle-fine-grained-auditing.html.

*Primary Examiner* — Vaishali Shah
(74) *Attorney, Agent, or Firm* — Pillsbury Winthrop Shaw Pittman LLP

(57) ABSTRACT

A driver reads incoming database requests to obtain application-level user information delimited in the request. The driver may determine a subset or multiple subsets of data to which access is being request by an application. The driver may access a policy comprising rules governing application-level users and apply the rules to the request, such as to allow, mask, or disallowing respective subsets of data to pass from the database to the application.

24 Claims, 16 Drawing Sheets

(56) References Cited

U.S. PATENT DOCUMENTS

| | | |
|---|---|---|
| 2015/0324602 A1 | 11/2015 | Lim |
| 2016/0019736 A1 | 1/2016 | Radicella et al. |
| 2016/0077902 A1* | 3/2016 | Feng ................. G06F 8/315 |
| | | 719/328 |
| 2016/0277398 A1 | 9/2016 | Gregg et al. |
| 2016/0315971 A1 | 10/2016 | Lim |
| 2016/0342661 A1 | 11/2016 | Kumarasamy et al. |
| 2016/0371495 A1* | 12/2016 | Bhat ................. G06F 21/445 |
| 2017/0103106 A1 | 4/2017 | Kass |
| 2017/0142125 A1 | 5/2017 | Lim |
| 2017/0301162 A1 | 10/2017 | Radicella et al. |
| 2017/0364698 A1* | 12/2017 | Goldfarb ............ G06F 16/9024 |
| 2018/0267905 A1* | 9/2018 | Kawai ................ G06F 12/1009 |
| 2018/0329916 A1 | 11/2018 | Waas et al. |
| 2019/0251775 A1 | 8/2019 | Denison |

\* cited by examiner

COMMUNICATING FINE-GRAINED APPLICATION DATABASE ACCESS TO A THIRD-PARTY AGENT

CROSS-REFERENCE TO RELATED APPLICATIONS

The present application claims the benefit of U.S. Provisional Patent Application 62/958,198, filed 7 Jan. 2020; and the present application is related to U.S. patent application Ser. No. 16/267,290, titled FRAGMENTING DATA FOR THE PURPOSES OF PERSISTENT STORAGE ACROSS MULTIPLE IMMUTABLE DATA STRUCTURES, filed 4 Feb. 2019, which is a continuation of Ser. No. 15/845,436, titled FRAGMENTING DATA FOR THE PURPOSES OF PERSISTENT STORAGE ACROSS MULTIPLE IMMUTABLE DATA STRUCTURES, issued as U.S. Pat. No. 10,242,219, filed 18 Dec. 2017, which is a continuation of U.S. patent application Ser. No. 15/675,490, titled FRAGMENTING DATA FOR THE PURPOSES OF PERSISTENT STORAGE ACROSS MULTIPLE IMMUTABLE DATA STRUCTURES, issued as U.S. Pat. No. 9,881,176, filed 11 Aug. 2017, which claims the benefit of U.S. Provisional Patent Application 62/374,278, titled FRAGMENTING DATA FOR THE PURPOSES OF PERSISTENT STORAGE ACROSS MULTIPLE IMMUTABLE DATA STRUCTURES, filed 12 Aug. 2016; and U.S. patent application Ser. No. 15/675,490 is a continuation-in-part of U.S. patent application Ser. No. 15/171,347, titled COMPUTER SECURITY AND USAGE-ANALYSIS SYSTEM, issued as U.S. Pat. No. 10,581,977, filed 2 Jun. 2016, which claims the benefit of U.S. Provisional Patent Application 62/169,823, filed 2 Jun. 2015. The entire content of each aforementioned patent filing is hereby incorporated by reference.

BACKGROUND

1. Field

The present disclosure relates generally to cybersecurity and, more, specifically to application-level user permissioning for access to data stored within a database.

2. Description of the Related Art

Datastores, such as document repositories, file systems, relational databases, non-relational database, memory images, key-value repositories, and the like, are used in a variety of different types of computing systems. Often, data to be stored is received by the datastore and then later retrieved during a read operation. In many cases, the datastore arranges the data in a manner that facilitates access based on an address of the data in the datastore (e.g., a file name) or content of the data (e.g., a select statement in a structured query language query).

In many cases, the security and integrity of the data in the datastore cannot be trusted. Often, an attacker who has penetrated a computer network will modify or exfiltrate records in a datastore that are intended to be confidential. Further, in many cases, the attacker may be credentialed entity within a network, such a as rogue employee, making many traditional approaches to datastore security inadequate in some cases. Aggravating the risk, in many cases, such an attacker may attempt to mask their activity in a network by deleting access logs stored in datastores.

SUMMARY

The following is a non-exhaustive listing of some aspects of the present techniques. These and other aspects are described in the following disclosure.

Some aspects include a process including: registering a security driver to receive database requests generated by an application compatible with a database driver, the security driver obtaining a database request generated by the application; detecting, by the security driver, a user agent string appended to the database request, the user agent string including at least one identifier indicative of a user of the application or a client executing the application; obtaining, by the security driver, a policy by which access to a portion of data within a database arrangement by the application is governed for different users or client devices to permit at least one user or client device access to the portion of data and deny at least one user or computing device access to the portion of data; determining, by the security driver, based on the obtained policy and the identifier included in the user agent string, whether the user of the application or the client executing the application is permitted or denied access to the portion of data; determining, by the security driver, based on the obtained policy and the database request, whether the database request indicates access of the portion of the data; in response to determining that the user of the application or the client executing the application is denied access to the portion of data and the database request indicates access of the portion of data, modifying, by the security driver, for the database request to deny access to the portion of data, at least one of: a write to exclude values to write within the portion of data without excluding values to write within another portion of data within the database arrangement, a read to exclude values to read from the portion of data without excluding values to read from another portion of data within the database arrangement, or data returned by the database arrangement to exclude values read from the portion of data without excluding values read from another portion of data within the database arrangement; and returning, by the security driver, to the application responsive to the database request, a database response being based on the modification and compatible with the application.

Some aspects include a process including: obtaining, by a driver of a client executing an application, a database request generated by the application executing on the client; detecting, by the driver, at least one value indicative of a user of the application or the client executing the application that generated the database request; obtaining, by the driver, policy information conveying permissions to access information in at least some records within a database arrangement for some users or some client devices; determining, by the driver, based on the permissions and the detected value, whether the user of the application or the client executing the application is requesting access to a portion of restricted information from one or more records within the database arrangement among a set of records implicated by the database request; obtaining, by the driver, information in records in the set of records implicated by the database request by conveying one or more requests for the information to the database arrangement; identifying, by the driver, based on the permissions, the portion of restricted information within the obtained information; modifying, by the driver, the portion of restricted information without modifying at least some other portion of the obtained information; and providing, by the driver, to the application responsive to the database request, a database response including the at least some other portion of the obtained information.

Some aspects include a process including: obtaining a database request generated by an application executing on a client computing device; detecting at least one value indicative of a user of the application or the client computing device executing the application that generated the database request; obtaining policy information conveying permissions to access information in at least some records within a database arrangement for some users or some client devices; determining, based on the permissions and the value, whether the user of the application or the client executing the application is requesting access to a portion of restricted information from one or more records within the database arrangement among a set of records implicated by the database request; conveying one or more requests for the information in records in the set of records implicated by the database request to the database arrangement; modifying the portion of restricted information within one or more database responses without modifying at least some other portion of unrestricted information; and providing, to the application responsive to the database request, a modified database response based on the one or more database responses and the modifying, the modified database response including the unrestricted information.

Some aspects include a process including: accessing a first database driver configured to interface with a relational database, wherein: the first database driver includes an application programming interface (API) configured to receive requests in a schema of the API by which applications request to write data to or read data from the relational database; the first database driver reads data from the relational database responsive to a read request in the schema of the API; and the first database driver writes data to the relational database responsive to a write request in the schema of the API; registering a process of a second database driver to receive requests in the schema of the API instead of the first database driver, the second database driver being different from the first database driver and presenting an API including functions of the API of the first database driver to applications compatible with the first database driver; receiving, with the service, the requests in the schema of the API from an application compatible with the first database driver, at least some of the requests being passed unmodified to the first database driver; obtaining a policy governing access to at least some data; modifying, in association with a read request passed unmodified to the database driver and comprising a statement specifying criteria by which records within the database are selected, a subset of data associated with the selected records based on the policy, wherein modifying the subset of data comprises: identifying the subset of data in the selected records based on the policy, and changing values in the subset of data to generate modified records; and returning, to the application, responsive to the read request, a response including the modified records to control access to the at least some data by the application.

Some aspects include a process including: interfacing with a database driver and an application compatible with the database driver; obtaining database requests in the schema of the API from the application; passing at least some of the database requests to the database driver; obtaining a policy by which user, computing device, or application access to at least some data within the database is controlled; modifying records obtained by the database driver from the database which include a portion of the controlled data; and returning, to the application, responsive to a given one of the database requests for which one or more records including a portion of the controlled data are returned, one or more modified records in which values corresponding the portion of the controlled data in the one or more records are changed and at least some other values are not changed.

Some aspects include a process including: obtaining a first driver configured to interface with a second driver and applications compatible with the second driver, wherein: the second driver includes an application programming interface (API) configured to receive database requests in a schema of the API by which applications request to write data to or read data from a database, the second driver reads data from the database responsive to a read request in the schema of the API, and the second driver writes data to the database responsive to a write request in the schema of the API; registering the first driver to receive database requests in the schema of the API from an application compatible with the second driver; receiving, with the first driver, the database requests in the schema of the API from the application, at least some of the database requests being passed by the first driver to the second driver in the schema of the API; obtaining, with the first driver, a policy by which access to at least some data within the database is controlled; modifying, with the first driver, a subset of data associated with records within the database responsive to applying the policy, wherein applying the policy comprises identifying the subset of data based on the policy and changing values in the subset of data to generate a modified subset of data; and returning, to the application, with the first driver, responsive to a read request in the database requests that comprises a statement by which at least some of the records within the database are selected, a response including modified data in place of the subset of data within the at least some records.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
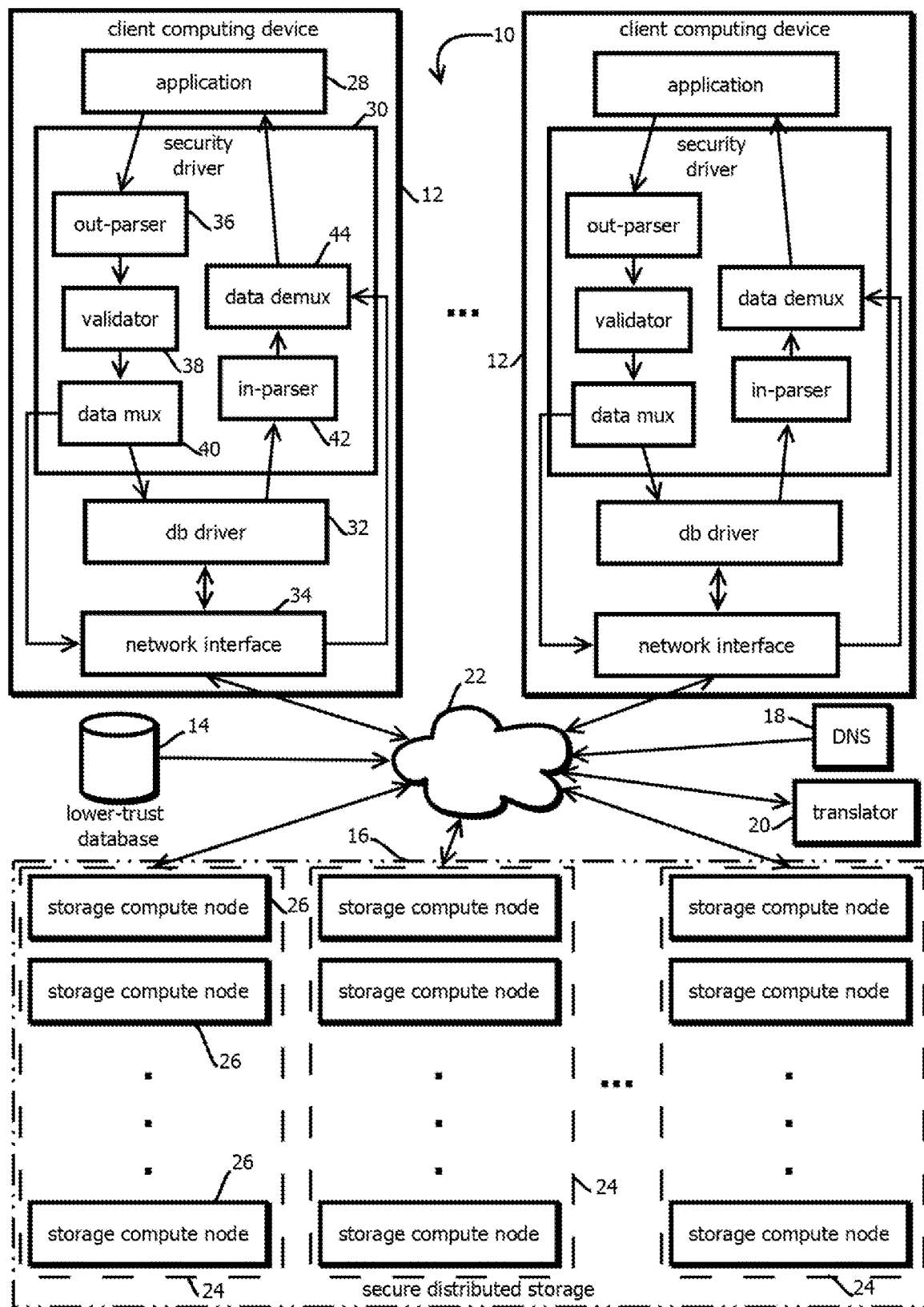
FIG. 1 is a logical and physical architecture block diagram that shows an example of a computing environment in which the present techniques may be implemented in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

A variety of problems relating to security of datastores and networks of computers used by organizations are addressed by various versions of techniques described below. These different techniques can be used together, synergistically in some cases, so their descriptions are grouped into a single description that will be filed in multiple patent applications with different claim sets targeting the different techniques and combinations thereof. In view of this approach, it should be emphasized that the techniques are also independently useful and may be deployed in isolation from one another or in any permutation combining the different subsets of techniques, none of which to suggest that any other description herein is limiting. Conceptually related groups of these techniques are preceded by headings below. These headings should not be read as suggesting that the subject matter underneath different headings may not be combined, that every embodiment described under the heading has all of the features of the heading, or that every feature under a given heading must be present in an embodiment consistent with the corresponding conceptually related group of techniques, again which is not to suggest that any other description is limiting.

These techniques are best understood in view of an example computing environment 10 shown in FIG. 1. The computing environment 10 is one example of many computing architectures in which the present techniques may be implemented. In some embodiments, the present techniques are implemented as a multi-tenant distributed application in which some computing hardware is shared by multiple tenants that access resources on the computing hardware in computing devices controlled by those tenants, for example, on various local area networks operated by the tenants. Or in some cases, a single tenant may execute each of the illustrated computational entities on privately-controlled hardware, with multiple instances of the computing environment 10 existing for different organizations. Or some embodiments may implement a hybrid approach in which multi-tenant computing resources (e.g., computers, virtual machines, containers, microkernels, or the like) are combined with on-premises computing resources or private cloud resources. In some embodiments, the computing environment 10 may include and extend upon the security features of a computing environment described in U.S. patent application Ser. No. 15/171,347, titled COMPUTER SECURITY AND USAGE-ANALYSIS SYSTEM, filed 2 Jun. 2016, the contents of which are hereby incorporated by reference.

In some embodiments, the computing environment 10 includes a plurality of client computing devices 12, a lower-trust database 14, secure distributed storage 16, a domain name service 18, and a translator server 20 (or elastically scalable collection of instances of translator servers disposed behind a load balancer). In some embodiments, each of these components may communicate with one another via the Internet 22 and various local area networks in some cases. In some embodiments, communication may be via virtual private networks overlaid on top of the public Internet. In some embodiments, the illustrated components may be geographically distributed, for example, more than 1 kilometer apart, more than 100 kilometers apart, more than a thousand kilometers apart, or further, for example distributed over the content event of North America, or the world. Or in some cases, the components may be co-located and hosted within a airgapped or non-airgapped private network. In some embodiments, each of the illustrated blocks that connects to the Internet 22 may be implemented with one or more of the computing devices described below with reference to FIG. 13.

In some embodiments, each of the client computing devices 12 may be one of a plurality of computing devices operated by users or applications of an entity that wishes to securely store data. For example, a given business or governmental organization may have more than 10, more than 100, more than 1,000, or more than 10,000 users and applications, each having associated computing devices that access data stored in the lower-trust database 14 (or a collection of such databases or other types of datastores) and the secure distributed storage 16. In some embodiments, multiple entities may access the system in the competing environment 10, for example more than five, more than 50, more than 500, or more than 5000 different entities may access shared resources with respective client computing devices or may have their own instance of the computing environment 10. In some embodiments, some of the client computing devices 12 are end-user devices, for example, executing a client-side component of a distributed application that stores data in the lower-trust database 14 and the secure distributed storage 16, or reads is such data. Client computing devices may be laptops, desktops, tablets, smartphones, or rack-mounted computing devices, like servers. In some embodiments, the client-computing devices are Internet-of-things appliances, like smart televisions, set-top media payers, security cameras, smart locks, self-driving cars, autonomous drones, industrial sensors, industrial actuators (like electric motors), or in-store kiosks. In some embodiments, some of the client computing devices 12 may be headless computing entities, such as containers, microkernels, virtual machines, or rack-mounted servers that execute a monolithic application or one or more services in a service-oriented application, like a micro services architecture, that stores or otherwise axis is data in the lower-trust database 14 or the secure distributed storage 16.

In some embodiments, the lower-trust database 14 and the secure distributed storage 16 may each store a portion of the data accessed with the client computing devices 12, in some cases with pointers therebetween stored in one or both of these datastores. In some embodiments, as described below, this data may be stored in a manner that abstracts away the secure distributed storage 16 from a workload application through which the data is accessed (e.g., read or written). In some embodiments, data access operations may store or access data in the lower-trust database 14 and the secure distributed storage 16 with a workload application that is not specifically configured to access data in the secure distributed storage 16, e.g., one that is configured to operate without regard to whether the secure distributed storage 16 is present, and for which the storage of data in the secure distributed storage 16 is transparent to the workload application storing content in the lower-trust database 14 and the secure distributed storage 16. In some embodiments, such a workload application may be configured to, and otherwise designed to, interface only with the lower-trust database 14 when storing this data, and as described below, some embodiments may wrap interfaces for the lower-trust database 14 with additional logic that routes some of the data to the secure distributed storage 16 and retrieves that data from the secure distributed storage 16 in a manner that is transparent to the workload application accessing content (i.e., data written or read by the workload application).

Content stored in the lower-trust database 14 and secure distributed storage 16 may be created or accessed with a variety of different types of applications, such as monolithic applications or multi-service distributed applications (e.g., implementing a microservices architecture in which each service is hosted by one of the client computing devices 12). Examples include email, word processing systems, spreadsheet applications, version control systems, customer relationship management systems, human resources computer systems, accounting systems, enterprise resource management systems, inventory management systems, logistics systems, secure chat computer systems, industrial process controls and monitoring, trading platforms, banking systems, and the like. Such applications that generate or access content in the database 14 for purposes of serving the application's functionality are referred to herein as "workload applications," to distinguish those applications from infrastructure code by which the present techniques are implemented, which is not to suggest that these bodies of code cannot be integrated in some embodiments into a single workload application having the infrastructure functionality. In some cases, several workload applications (e.g., more than 2, more than 10, or more than 50), such as selected among those in the preceding list, may share resources provided by the infrastructure code and functionality described herein.

In some embodiments, the lower-trust database 14 is one of the various types of datastores described above. In some cases, the lower-trust database 14 is a relational database, having a plurality of tables, each with a set of columns corresponding to different fields, or types of values, stored in rows, or records (i.e., a row in some implementations) in the table, in some cases, each record, corresponding to a row may be a tuple with a primary key that is unique within that respective table, one or more foreign keys that are primary keys in other tables, and one or more other values corresponding to different columns that specify different fields in the tuple. Or in some cases, the database may be a column-oriented database in which records are stored in columns, with different rows corresponding to different fields. In some embodiments, the lower-trust database 14 may be a relational database configured to be accessed with structured query language (SQL) commands, such as commands to select records satisfying criteria specified in the command, commands to join records from multiple tables, or commands to write values to records in these tables.

Or in some cases, the lower-trust database 14 may be another type of database, such as a noSQL database, like various types of non-relational databases. In some embodiments, the lower-trust database 14 is a document-oriented database, such as a database storing a plurality of serialized hierarchical data format documents, like JavaScript™ object notation (JSON) documents, or extensible markup language (XML) documents. Access requests in some case may take the form of xpath or JSON-path commands. In some embodiments, the lower-trust database 14 is a key-value data store having a collection of key-value pairs in which data is stored. Or in some cases, the lower-trust database 14 is any of a variety of other types of datastores, for instance, such as instances of documents in a version control system, memory images, a distributed or non-distributed file-system, or the like. A single lower-trust database 14 is shown, but embodiments are consistent with, and in commercial instances likely to include, substantially more, such as more than two, more than five, or more than 10 different databases, in some cases of different types among the examples described above. In some embodiments, some of the lower-trust databases may be database of a software-as-a-service application hosted by a third party and accessed via a third party application program interface via exchanges with, for instance, a user's web browser or another application. In some cases, the lower-trust database 14 is a mutable data store or an immutable data store.

In some cases, access to data in the lower-trust database 14, and corresponding access to corresponding records in the secure distributed storage 16, may be designated in part with roles and permissions stored in association with various user accounts of an application used to access that data. In some embodiments, these permissions may be modified, for example, revoked, or otherwise adjusted, with the techniques described in U.S. patent application Ser. No. 15/171,347, titled COMPUTER SECURITY AND USAGE-ANALYSIS SYSTEM, filed 2 Jun. 2016, the contents of which are hereby incorporated by reference.

The database 14 is described as "lower-trust." The term "lower-trust" does not require an absolute measure of trust or any particular state of mind with respect to any party, but rather serves to distinguish the database 14 from the secure distributed storage 16 which has certain security features in some implementations described below and in some cases may be referred to as a "higher-trust" database.

In some cases, some of the data that an application writes to, or has written to, the lower-trust database 14 may be intercepted or moved to the secure distributed storage 16 with techniques described below. Further, access requests from a workload application to the lower-trust database 14 may be intercepted, or responses from such access request may be intercepted, and data from the lower-trust database 14 may be merged with data from the secure distributed storage 16 that is responsive to the request before being presented to the application, as described in greater detail below. Further, read requests may be intercepted, modified, and iteratively executed in a manner that limits how much information in the secure distributed storage is revealed to a client computing device at any one time, as described below.

In some embodiments, the secure distributed storage 16 may include a collection of data centers 24, which may be distributed geographically and be of heterogeneous architectures. In some embodiments, the data centers 24 may be various public or private clouds or on-premises data centers for one or more organization-users, such as tenants, of the computing environment 10. In some embodiments, the data centers 24 may be geographically distributed over the United States, North America, or the world, in some cases with different data centers more than 100 or 1,000 kilometers apart, and in some cases with different data centers 24 in different jurisdictions. In some embodiments, each of the data centers 24 may include a distinct private subnet through which computing devices, such as rack-mounted computing devices in the subnet communicate, for example, via wrap top-of-rack switches within a data center, behind a firewall relative to the Internet 22. In some embodiments, each of the data centers 24, or different subsets of the data centers 24, may be operated by a different entity, implementing a different security architecture and having a different application program interface to access computing resources, examples including Amazon Web Services™, Azure from Microsoft™, and Rack Space™. Three different data centers 24 are shown, but embodiments are consistent with, and in commercial implementations likely to include, more data centers, such as more than five, more than 15, or more than 50. In some cases, the datacenters may be from the same provider but in different regions.

In some embodiments, each of the data centers 24 includes a plurality of different hosts exposed by different computational entities, like microkernels, containers, virtual machines, or computing devices executing a non-virtualized operating system. Each host may have an Internet Protocol address on the subnet of the respective data center 24 and may listen to and transmit via a port assigned to an instance of an application described below by which data is stored in a distributed ledger. In some embodiments, each storage compute node 26 may correspond to a different network hosts, each network coast having a server that monitors a port, and configured to implement an instance of one of the below-described directed acyclic graphs with hash pointers implementing immutable, tamper-evident distributed ledgers, examples include block chains and related data structures. In some cases, these storage compute nodes 26 may be replicated, in some cases across data centers 24, for example, with three or more instances serving as replicated instances, and some embodiments may implement techniques described below to determine consensus among these replicated instances as to state of stored data. Further, some embodiments may elastically scale the number of such instances based on amount of data stored, amounts of access requests, or the like.

Some embodiments may further include a domain name service (DNS) 18, such as a private DNS that maps uniform resource identifiers (such as uniform resource locators) to Internet Protocol address/port number pairs, for example, of the storage compute nodes 26, the translator 20, and in some cases other client computing devices 12 or other resources in the computing environment 10. In some embodiments, a client computing device 12, a storage compute node 16, the database 14, or translator 20 may encounter a uniform resource identifier, such as a uniform resource locator, and that computing entity may be configured to access the DNS 18 at an IP address and port number pair of the DNS 18. The entity may send a request to the DNS 18 with the uniform resource identifier, and the DNS 18 may respond with a network and process address, such as Internet Protocol address and port number pair corresponding to the uniform resource identifier. As a result, underlying computing devices may be replaced, replicated, moved, or otherwise adjusted, without impairing cross-references between information stored on different computing devices. Or some embodiments may achieve such flexibility without using a domain name service 18, for example, by implementing a distributed hash table or load-balancing that consistently maps data based on data content, for example based on a prefix or suffix of a hash based on the data or identifiers of data to the appropriate computing device or host. For instance, some embodiments may implement a load balancer that routes requests to storage compute nodes 26 based on a prefix of a node identifier, such as a preceding or trailing threshold number of characters.

Some embodiments may further include a virtual machine or container manager configured to orchestrate or otherwise elastically scale instances of compute nodes and instances of the translator 20, for instance, automatically applying corresponding images to provisioned resources within one or more data centers 24 responsive to need and spinning down instances as need diminishes.

In some embodiments, the translator 20 may be configured to execute a routine described in greater detail below that translates between an address space of the lower-trust database 14 and an address space of the secure distributed storage 16. In some embodiments, the translator 20 may receive one or more records from the client computing device 12 that is going to be written to the lower-trust database 14, or may receive such records from the lower-trust database 14, and those records may be mapped to the below-describe segment identifiers (or other pointers, such as other node identifiers) in the secure distributed storage 16. The translator 20 may then cause those records to be stored in the secure distributed storage 16 and the segment identifiers to be stored in place of those records in the lower-trust database 14, such as in place of individual values in records. In some embodiments, translation may happen at the level of individual values corresponding to individual fields in individual records, like rows of a table in the database 14, or some embodiments may translate larger collections of data, for example, accepting entire records, like entire rows, or plurality of columns, like a primary key and an individual value other than the primary key in a given row. Some embodiments may accept files or other binary larger objects (BLOBS). The translator 20 that may then replace those values in the lower-trust database 14 with a pointer, like a segment identifier in the secure distributed storage, in the manner described below, and then cause those that data to be stored in the secure distributed storage 16 in the manner described below. In some examples, documents may be stored, which may be relatively small stand-alone values to binary large objects encoding file-system objects like word-processing files, audio files, video files, chat logs, compressed directories, and the like. In some cases, a document may correspond to an individual value within a database, or document may correspond to a file or other binary large object. In some cases, documents may be larger than one byte, 100 bytes, 1 kB, 100 KB, 1 MB, or 1 GB. In some embodiments, documents may correspond to messages in a messaging system, or printable document format documents, Microsoft Word™ documents, audio files, video files or the like.

In some embodiments, the translator 20 may include code that receives requests from drivers and facilitates the translation of data. In some cases, the translator 20 may be one of an elastically scaled set of translators 20 remotely hosted in a public or private cloud. The translator may, in some cases, implement the following functions:

1. Validate Request
   a. Using a database, some embodiments validate a combination of user supplied parameters such as predefined software IDs, client IDs, and machine specific identifiers registered at install time. This is compared against a known list and then further verified with IP address and/or other network specific parameters.
2. Data Validate
   a. Parsing the HTTP body and then decoding some embodiments determine the unique list of reference values to replace with plain text. Using a database, some embodiments first check if the requesting machine has the rights to access the data. Next using a database, some embodiments find the network name of the first hop of the piece of data and place into an array.
3. Threshold Check
   a. With the location of each unique requested segment (or node or document or content) identifier, some embodiments check against a series of threshold or rate objects. Some embodiments look for access rate, time window, or location based rules and apply the requested data against a mapping of rules. If any particular data is breaking a threshold then an anomaly in the system is generated resulting in notifications and logging in some embodiments.
4. Jobs
   a. The translator 20 may split up the data requests into jobs and places the job onto a work queue. The split may be done by a static per message job size and may use a deal-letter exchange to retry and finally fail messages
5. Response Function
   a. Data may be returned from the queue and plain text values may be matched and replaced with the corresponding pointers (such as segment, document, node, or unit-of-content identifiers, which is not to suggest that these or any other list of categories describe disjoint sets). Once all jobs have returned the response a response may be returned in some embodiments.

In some embodiments, the client computing devices 12 may each execute an operating system in which one or more applications 28 execute. These applications may include client-side portions of the above-described examples of workload applications, which may include business logic and other program code by which a service in a microservices architecture is implemented. In some embodiments, the applications 28 may be different in different client computing devices, and an individual client computing device may execute a plurality of different applications. In some embodiments, the applications 28 may be configured to interface with the lower-trust database 14 via a database driver 32 executed within the operating system. The database driver 32 may be any of a variety of different types of drivers such as an ODBC driver, a JDBC driver, and the like. In some embodiments, the database driver 32 may be configured to access the lower-trust database 14 via a network interface 34 of the client computing device 12, such as a network interface card connected to a physical media of a local area network by which the Internet 22 is accessed.

Some embodiments may further include a security driver 30 that interfaces between the application 28 and the database driver 32. In some embodiments, the security driver 30 may be transparent to the application 28, such that an application program interface of the database driver 32 is presented to the application 28 by the security driver 30, and that application program interface may be unmodified from the perspective of the application 28 relative to that presented by the database driver 32 in some cases. In some embodiments, the security driver 30 may wrap an application program interface of the database driver 32, such that the security driver 30 receives application program interface requests from the application 28 to the driver 32, acts on those requests, and in some cases modifies those requests, and then provides the request in some cases with modifications to the database driver 32. Similarly, responses back to the application 28 may be provided by the security driver 30 and in a manner consistent with that provided by the driver 32, as described in greater detail below.

In some embodiments, the security driver 30 is configured to engage the translator 20 after (or to perform) splitting data being written to (or attempting) the lower-trust database 14 by the application 28 into higher-security data and lower-security data. Again, the terms "lower-security" and "higher-security" serve to distinguish data classified differently for purposes of security and do not require measurement against an absolute security metric or a state of mind. The lower-security data may then be written by the database driver 32 to the lower-trust database 14 in the manner provided for by the application 28 without regard to whether the security driver 30 is present.

The higher-security data, on the other hand, may be stored in a manner described below by the translator 20 that renders that data relatively robust to attacks by malicious actors. When returning data to the application 28, for example in response to receiving a read request, these operations may be reversed in some cases. Again, these operations are described in greater detail below. Generally, in some embodiments, the data from the lower-trust database 14 and the data from the secure distributed storage 16 may be merged by the security driver 30, in some cases, before that data is presented to the application 28. By acting on the higher-security data within the client computing device 12, before that data leaves the client computing device 12, some embodiments may reduce an attack service of the computing environment 10. That said, not all embodiments provide this benefit, and some embodiments may implement the functionality of the security driver 30 outside of the client computing devices 12, for example, in a database gateway, in a database management system implemented at the lower-trust database 14, or on another standalone application executed in a computing device disposed between the lower-trust database 14 and the network and the client computing device 12 in a path to the lower-trust database 14.

In some embodiments, the security driver 30 includes an outbound path and an inbound path. In some embodiments, the outbound path includes an out-parser 36, a validator 38, a data multiplexer 40. The out-parser may classify values as higher-security or lower-security values applying one or more rules in a data policy described below. The validator may perform the statement validate function described below. The multiplexer may route data to the lower-trust database 14 or the translator 20 based on the security classification. In some embodiments, the inbound path includes an in parser 42, and a data de-multiplexer 44. The inbound path may include a parser 42 configured to detect pointers to data in query responses from the lower-trust database 14 that point to data in the secure distributed storage 16. The parser 42 may call the translator 20 to request that pointers be replaced with more securely stored data. In some cases, the de-multiplexer 44 may merge data from the translator 20 with lower-security data in the same query response. In some cases, the security driver may implement a process described below with reference to FIG. 8 and perform the following functions:

1. Statement Parse
   a. For a SELECT statement, there could be a WHERE clause which is looking to match data in a protected column. During this phase, some embodiments parse the SELECT statement and check if there is a need to flip any plain text values in the WHERE clause into the reference space. The statement may be marked for processing and passed along.
   b. For an INSERT or UPDATE statement, there could be data in either the statement body or the WHERE clause (INSERT). During this phase, some embodiments parse the statement and check if there is a need to flip any plain text values in the WHERE clause or body into the reference space. The statement may be marked for processing and passed along.
   c. The security driver may use a locally kept copy of the current protection settings for a given client. In some embodiments, it is this locally kept and updated (e.g., periodically or constantly) table that the database, table, and column names in the statements are compared against. The time between getting a new state table is determined by various factors.
2. Statement Validate
   a. During the operation of a database command some embodiments check the statement for potential injection or other malicious SQL statements and block the query or log that the event happened. This is a locally supported operation that can be done by each driver in some cases.
3. Statement Process
   a. Depending upon the results of Parse, the driver may make HTTP requests to a preset URL and asks for plain-text data to be switched into the reference space, e.g., by the translator 20.
   b. The statement may be updated with reference space data if needed and the statement may be delivered to the lower-trust database 14 server.
4. Result Set Process
   a. For a SELECT statement the result set is processed and if columns in the returned data match any entries in the locally held table, the security driver 20 may perform HTTP requests to switch reference space data to plain text space.
   b. The driver 30 may iterate over the data and selects distinct values to place into an HTTP body and requests made using a preset URL and system DNS 18, e.g., by engaging the translator 20.
   c. Data may be returned and replaced for each occurrence in the result set and returned to the application 28 in some cases.

Various aspects of the system above, or other architecture may implement various techniques expanded upon below under distinct headings.

Immutable Datastore for Low-Latency Reading and Writing of Large Data Sets

Generally, traditional databases do not adequately protect against threat actors or internal resources (employees, information-technology staff, etc.) tampering with the data. At best, such systems typically provide audit access and the ability to modify the stored data, but the audit logs typically are mutable and, thus, can be changed just as easily as the data.

Recent immutable examples of databases include blockchain-based databases, such as bitcoind and MultiChain. Blockchain systems are built upon ideas first described in a paper titled "Bitcoin: A Peer-to-Peer Electronic Cash System" under the pseudonym Satoshi Nakamoto in October 2008. These systems typically implement a peer-to-peer system based on some combination of encryption, consensus algorithms, and proof-of-X, where X is some aspect that is difficult to consolidate across the network, such as proof-of-work, proof-of-stake, proof-of-storage, etc. Typically, those actors on a network having proof-of-X arrive at a consensus regarding the validation of peer-to-peer transactions, often using various consensus algorithms like Paxos, Raft, or hashgraph. Or some private blockchains do not implement proof-of-X consensus, e.g., where the computing hardware implementing the blockchain is controlled by trusted parties. Chained cryptographic operations tie a sequence of such transactions into a chain that once validated, is typically prohibitively computationally expensive to falsify.

However, many extant blockchain-based databases are not well suited for certain use cases, particularly those involving latency-sensitive access (e.g., reading or writing) to large files (e.g., documents or other collections of binary data treated as a single entity, often called "blobs"), for instance in a blockchain-hosted filesystem. Indeed, many blockchain databases are not readily configured to store large objects and object files (e.g., on the order of 500 kilobytes or larger, depending on the use case and acceptable latency), as such systems are typically highly specialized for small-payload "transactional" applications. In such systems, when storing larger collections of binary data (e.g., files or blobs), the chain can dramatically slow as the chain gets bigger, particularly for write operations.

As noted above, blockchains generally allow for small bits of information to be stored in an immutable data structure, but the moment data in the chain is altered, the chain is broken and can no longer function in a manner that represents the data to be valid. The most common blockchain implementation is the publicly accessible Bitcoin ledger (for which Blockchains were designed).

As noted, such systems present certain problems for some use cases. These, and other problems are mitigated by some embodiments of a system referred to below as "Docuchain." Docuchain is a blockchain software suite specifically designed for low-latency put and get operations of Binary Large Objects (BLOBs). Docuchain, in some embodiments, uses an improved version of an underlying data structure called "Merkle Trees" to provide the immutable properties of the Blockchain. In some embodiments, Docuchain is operative to respond to commands within less than 50 milliseconds (ms), e.g., and many commercial implementations are expected to provide sub 10 ms operations as perceived by the application interacting with the chain, and sub 5 ms operations at the level of the chain. Further, such response times are expected to scale with the chain size. Some embodiments may scale response times at n log (n), wherein n is the number of entries in the chain.

Merkle Trees generally work by a tree of cryptographic hashes in which each element of the tree contains a hash of the information contained by its children, and leaf elements are hashes of the subject data stored in the Merkle Tree. In many traditional implementations of Merkle Trees for the purposes of storing data, like those in many earlier blockchain databases, the data is stored in a separate logical datastore, hashed, and just the hash is carried into the Merkle Trees. That is, the data being by the database stored is not part of the Merkle Tree, only a hash digest of the data is part of the Merkle Tree.

To mitigate some of the problems with traditional blockchain databases, some embodiments of Docuchain store the data directly in Merkle Trees, though embodiments are not limited to data storage in Merkle Trees, which is not to suggest that other descriptions are limiting. That is, when data is written to the database or read from the database, that data is written into specific fields of the elements (e.g., attributes of node content of nodes) of the Merkle Tree or read from specific fields of the elements of the Merkle Tree (rather than just a hash digest of the data residing in the Merkle Tree with the entire data residing in an external datastore). With this tight coupling, if the data is altered at all, the entire hash for the tree (as is distinct from a hash of a file stored in the database) is thrown off immediately and ultimately the chain will be broken and detected as such during validation operations. Additionally, some embodiments prevent the BLOB from ever being stored in an external (potentially mutable and less secure) datastore. Finally, the tight coupling of the data to the tree is expected to reduce the number of read/write operations necessary to transact with the chain, further reducing potential latency.

In some embodiments, Docuchain contains two components: LibDocuchain and DocuSocket.

In some embodiments, LibDocuchain is a software library that contains the following data structures:
MerkleTree<H, T>
DataBlock<H, T>
BlockManager<H, T>
where "H" represents a cryptographic hashing function, and "T" represents the data type being stored in the chain. Generally, hashing functions map data of arbitrary size to data of fixed size. Examples of cryptographic hash functions include SHA256, SHA-2, MD5, and the like (e.g., applied more than once Docuchain, in some embodiments, can use a variety of different types of hashing functions and this is expected to include later developed hashing algorithms (e.g., new post-quantum cryptographic hashes).

The BlockManager, in some embodiments, is responsible for taking data, placing into the appropriate block and inserting into the appropriate Merkle tree, writing to disk at the appropriate times, increasing (e.g., guaranteeing) chain durability (i.e., tamper-resistance). Additionally, in some embodiments, there is a JobManager that manages concurrent operations on the datastructures to deliver operation times.

In some embodiments, DocuSocket is a software library that maintains connections to clients, e.g., remote computing devices seeking to access data stored in the database. Connections from clients may be relatively stateless (and in some cases, after a session is confirmed there is no further state). A connection, in some embodiments, can accept an arbitrary amount of requests in an arbitrary order and will return responses to the requests in arbitrary order. Example, the connection might receive write (A), write (B), read (C) operations, and in some embodiments, the Docusocket may respond to request C before A or B. However, once a transaction response comes for A or B, those operations in some embodiments are considered final and are committed to the chain and are instantly queryable. This "always-on" and highly-available connection is one differentiator that allows Docusocket to out-perform standard blockchains in comparable benchmarks. (That said, not all embodiments afford these benefits, as various independently useful inventions are described, and some of those inventions might be used to other ends.)

Write requests, in some embodiments, are accepted through Docusocket and passed off to BlockManager for writing into a MerkleTree object. In some cases, the result of this operation is a hash composed from the position in the MerkleTree, the hash from the previous block, and the contents of the data that is written; this is called the Transaction ID (TXID), which is an example of a node identifier or pointer (which is not to suggest that these or other categories are disjoint). In some embodiments, these TXIDs are stored in alternate data stores for later referencing and retrieval, e.g., in the lower-trust database 14 in place of the data to which they point, or in a lower-trust file system in place of documents referenced by the TXIDs. In some cases, the TXID's are segment pointers to a linked list of segment pointers and segments that encode the stored data.

As noted, earlier blockchain databases are capable of storing blobs, but the way in which the data is stored and accessed often imposes sever performance penalties when accessing larger collections of data (e.g., larger BLOBs). Such systems often rely on additional functionality originally intended to handle the transactive nature of bitcoins and other cryptocurrencies. This additional functionality is often provided by an "in-chain" scripting language which defines the transactions that enter the chain. For many use cases, this is a secure and efficient method of maintaining a ledger, however for larger chains, these features come at significant time complexity cost, particularly in write operations. As these chains grow, they become significantly slower. Blockchain document databases that store the documents in-chain are expected to grow very fast, thus putting significant limitations on what is practically possible with prior technology.

In contrast, because some embodiments of Docuchain store data in its exact representation (which should not be read to exclude various transformations and may include storing a compressed, encrypted copy of the data) directly in the Merkle Tree, those embodiments are expected to be able to circumvent the need to have the in-chain scripting language and are able to provide O(log(n)) get/put operations on a tree once it is loaded in memory. Further, storing the data being committed to the database, rather than just a hash digest, in the Merkle Tree is expected to impede (and in some cases defeat) hash collision attacks on the stored data. In such attacks, malicious content is selected and designed to produce the same hash as stored data, and that malicious data is substituted in the database for the authentic data. With traditional systems, the Merkle Tree will yield a hash value that validates the malicious content as authentic. In contrast, some embodiments circumvent this attack vector by storing the data committed to the database in the Merkle Tree. Further, some embodiments may detect changes without the need to continually verify each BLOB with its respective hash digest on a continual basis, unlike many systems that merely store a hash digest of the BLOB in the chain. That said, not all embodiments afford these benefits, e.g., some embodiments may avoid the use of traditional in-chain scripts to access hashed digests in the chain, without storing the entire document, thereby expediting operations.

Figure 2:
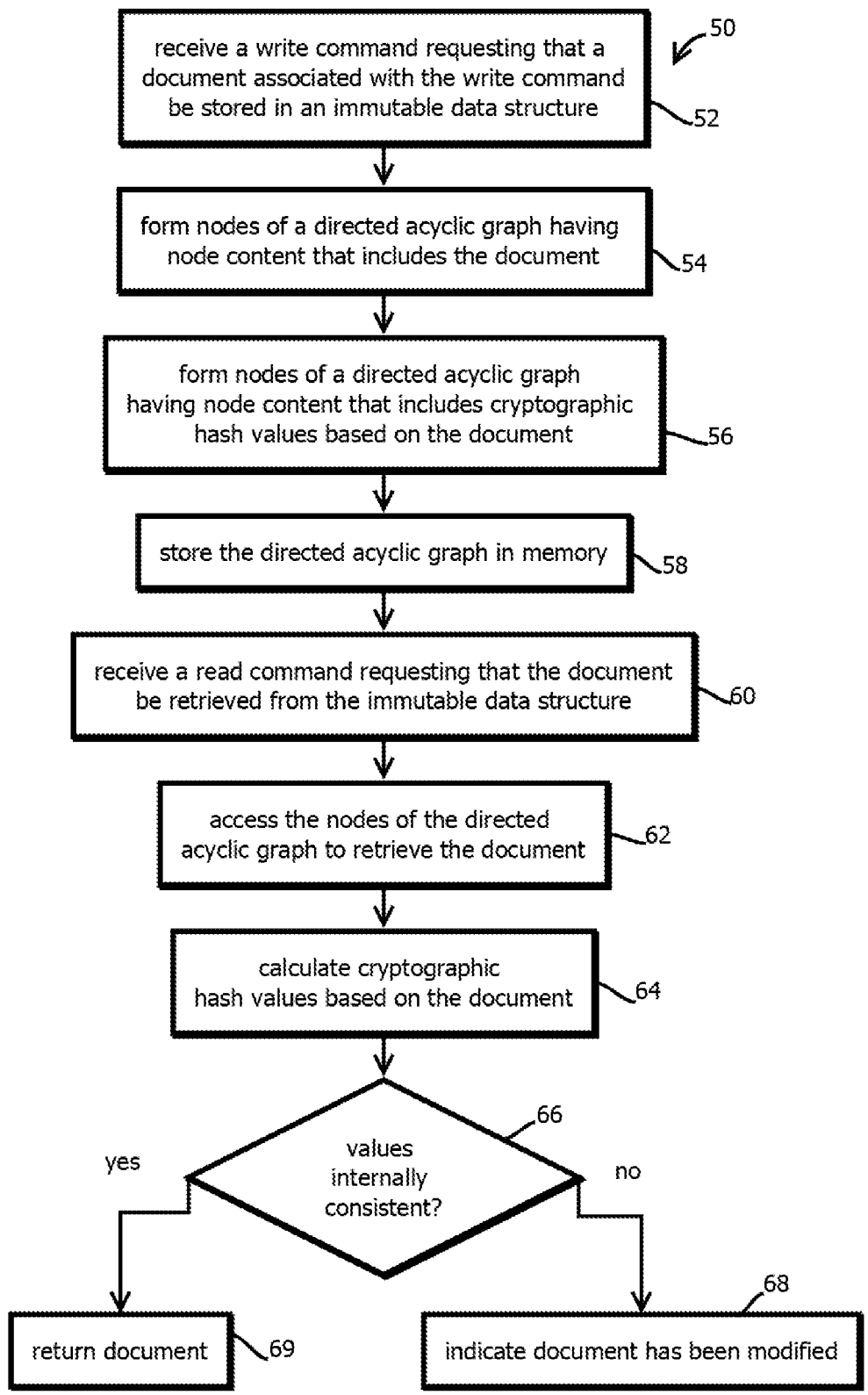
FIG. 2 is a flow chart that shows an example of a process to read and write a document to a tamper-evident, immutable data repository in accordance with some embodiments.
Figure 3:
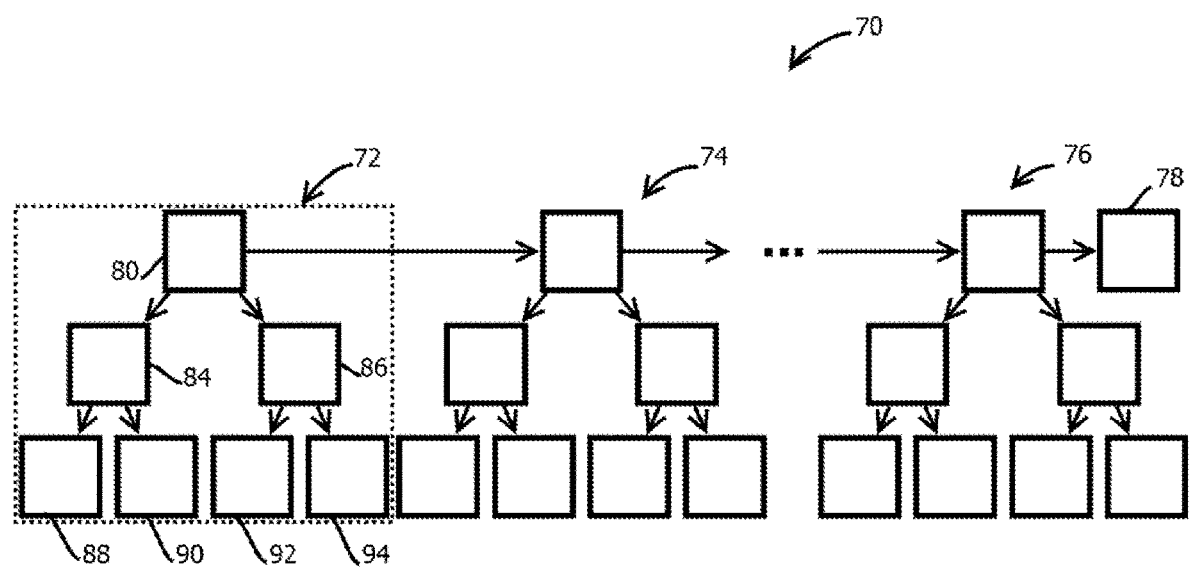
FIG. 3 is a data model block diagram that shows an example of a tamper-evident, immutable data repository that may be operated upon by the process of FIG. 2 in accordance with some embodiments.

These libraries may implement an example of a process shown in FIG. 2, which shows an example of a process 50 that may be implemented to store and access documents in a, immutable, tamper-evident data structure, an example of which is shown in FIG. 3. In some embodiments, the process 50 may be implemented in the computing environment 10 described above, but it should be emphasized that embodiments are not limited to that implementation, which is not to suggest that any other description is limiting. Indeed, some embodiments may implement versions of the process shown on a single computing device as part of a monolithic application, such as a file manager that stores documents locally in the described fashion.

In some embodiments, the operations of the process 50, and the other processes described herein, may be implemented in a different order from that described, may include steps that are repeated, may include steps that are executed concurrently, may include steps that are omitted, or may be otherwise differently arranged from the exemplary arrangements described, none of which is to suggest that other descriptions are limiting. Further, the operations of the process 50 and the other processes and functionality described herein may be implemented by executing instructions stored on a tangible, non-transitory, machine-readable medium with one or more processors, such that when the instructions are executed, the described functionality is effectuated. In some cases, notwithstanding the use of the singular medium, the operations may be stored on multiple media in a distributed fashion, for example, with different subsets of the instructions stored in memory of different computing devices that execute those different respective instructions, an arrangement which is consistent with the singular "medium" as that term is used herein. Further, storage of data need not be persistent in the absence of power and may be effectuated with either persistent data storage or dynamic data storage, such as dynamic random access memory that may dissipate stored data when power is removed.

In some embodiments, the process 50 includes receiving a write command requesting that a document associated with the write command be stored in an immutable data structure, as indicated by block 52, such as a tamper-evident immutable data structure. In some cases, the write command may be a SQL command to write to the above-described lower-trust data store 14 from the application 28 received by the security driver 30, or the command may be a command to store a file or other document in a file system. For instance, in some cases, the write command may be a request received by a file manager of an operating system to store a file in a repository presented as a network drive within a user interface of the operating system, where some or all of the network drive is hosted in the immutable data structure like that described below with reference to FIGS. 3 and 5. In some embodiments, the write command may be generated programmatically, or in some cases the write command may be generated responsive to a user input requesting that, for example, a document be stored. As noted above, the term "document" is used relatively expansively herein and may include storage of an individual bites of information, or larger binary large objects, such as files ranging up to multiple gigabits or larger. Files may include stored data associated with metadata, like author, file-size, creation date, modification date, a file-name, an extension, and the like. Such files may be consistent with the definitions of files in the Windows™, Android™, iOS™, Linux™, or Mac™ operating systems.

The term "immutable" in the phrase "immutable data structure" refers to an arrangement of data that the computing system and write the right command is configured to leave in place even after the information represented by the data changes. For example, the data might represent a user's telephone number, and embodiments using an immutable data structure may write a new record indicating a new telephone number, rather than overwrite an existing record. Thus, both the older version and the newer version are preserved (and may be labeled as the older or newer version) even after the value changes. Such embodiments may then reference a most recent representation of the value for that field to effectuate the change, rather than deleting the old instance. In some embodiments, the immutable data structure may be a tamper-evident data structure that is computationally infeasible to modify without the modification being detectable to a party auditing the data structure. Some embodiments may implement cryptographic hash pointers described below in a directed acyclic graph that make it computationally infeasible for a party to modify stored data without those modifications being evident in virtue of inconsistent hash values elsewhere in the data structure. Computational feasibility may depend on the use case, for example, whether economics and time available provide for certain amounts of competing resources to be brought to bear. In many cases, an operation requiring more than $10^{128}$ hashes on average to manufacture a collision with altered data may be said to be computationally infeasible.

In some embodiments, the process 50 may include forming nodes of a directed acyclic graph having node content that includes the document, as indicated by block 54. Forming nodes may include accessing existing nodes and inserting node content into those nodes or forming entire new data structures by which nodes are encoded. In some embodiments, each node may include node content with a collection of attributes, which in some cases may include a pointer to another node. In some embodiments, those node attributes may include a pointer that is an identifier of an adjacent node in the directed acyclic graph and a cryptographic hash value based upon one or more attributes of the adjacent node that is identified. In some embodiments, these last two pair of attributes (an identifier of another node and cryptographic hash value of at least some of that node's content) may correspond to a cryptographic hash pointer from one node to another. Cryptographic hash pointers may define edges of the graph in some embodiments. In some embodiments, an individual node may contain zero cryptographic hash pointers (such as a leaf node in a binary tree), a single cryptographic hash pointer (such as a link in a block chain or linked list), a pair of cryptographic hash pointers (such as in a non-leaf node of a binary tree directed acyclic graph), or various other amounts of cryptographic hash pointers, for example, in splay trees or skip lists.

In some embodiments, the node attributes include an identifier of the respective node. In some embodiments, the identifier may be a segment identifier of the type described below, or in some cases the identifier may be an identifier within a namespace of the directed acyclic graph, for example, a count that increments with the addition of each node. In some embodiments, the identifier may be arranged hierarchically, for example, indicating a block and a block chain and then a sequence of binary values that specify a path through a binary tree, as is used in prefix trees in some cases (e.g., the value 00101 may define a path from a root node to the left, left, right, left, and then right, with left expressed as 0 and right expressed as 1, in a binary tree). In some embodiments, the identifier of a node is content-based, for example, a cryptographic hash value or non-cryptographic hash value based on one or more or all of the attributes of the node, which may include hash pointers of that node.

In some embodiments, the document may be stored in a single node of the directed acyclic graph. Or in some cases, the document may be segmented and stored in multiple nodes, for example consistent with the techniques described below with reference to FIGS. 4 through 6. In some embodiments, some nodes of the graph may store other documents or portions of other documents. In some embodiments, nodes may be added to the graph over time, in some cases with groups of nodes added sequentially. In some embodiments, attributes of nodes or blocks of nodes (which may themselves be characterized as nodes in some cases) may further include a timestamp at which the node was formed, an identifier of a tenant account or data repository where data in the note is stored in the lower-trust data store 14, a date the node was created, and the like.

In some embodiments, groups of nodes may be added as a "block," for instance with each block corresponding to a binary tree having documents stored in leaf nodes. Or blocks may be linked lists, skip lists, splay trees, or combinations thereof, for example. In some embodiments, an individual node may store multiple documents as attributes of that node. In some embodiments, blocks have an integer index, a block capacity, a cryptographic hash value based on all of the nodes in the block (like a Merkle root), the nodes within the block, and a cryptographic hash based on content of a previous block (e.g., based on all values in the block, based on a Merkle root of that block, or the like).

In some embodiments, forming the nodes of the directed acyclic graph includes forming (e.g., updating or creating) a sequence of nodes along one or more paths through the directed acyclic graph. In some embodiments, this may include calculating one or more cryptographic hash values to form one or more cryptographic hash pointers along this path, which in some cases may include or terminate with a node in which the document is stored or a portion of the document is stored, such that each cryptographic hash pointer along the path is based on the document.

Cryptographic hash pointers may be based upon a cryptographic hash function which may take a plurality of inputs, such as one or more node attributes and produce an output of fixed size. These functions may have pre-image resistance, second pre-image resistance, and collision resistance. Examples include an SHA-256, BLAKE, BLAKE2, SHA-1, SHA-2, and SHA-3 hash function. In some embodiments, the cryptographic hash function may be a one way function in which a given string of input produces deterministically a string of output that is relatively difficult or impossible to reverse to determine the input from the output while being relatively easy to confirm that an input corresponds to the output. For example, it may be computationally infeasible to identify a hash collision in which different instances of the input produce a given output. In some embodiments, the cryptographic hash function may implement the Merkle-Damgård construction.

In some embodiments, the cryptographic hash function may be based upon a compression function that accepts a fixed size input and produces a fixed sized output with a one-way compression function. In some embodiments, because the input to the cryptographic hash function may be a variety of different sizes, the transformation may be performed in a variety of iteration and a plurality of iterations. Some embodiments may determine a length of input, such as a number of bytes, accepted by the one-way compression function, a length of output of the one-way compression function and determine a difference between these two lengths. Some embodiments may then parse an input to the cryptographic hash function into sequences of a size of this difference and iteratively input the parsed sequence into the one-way compression function and then combine the output of that iteration with a next portion parsed portion from the input, for example, incrementing from a beginning to an end of an input and iteratively concatenating, for example, prepending or appending or otherwise intermingling the output of the previous iteration of the one-way compression function with a next parsed portion of the input to the cryptographic hash function. Some embodiments may repeat this until an end of the input to the cryptographic hash function is reached (e.g., reaching a point within some threshold number of bytes or the last byte), as indicated by block 56. In some embodiments, for example, where a plurality of inputs are applied, some embodiments may combine these inputs in a variety of approaches, for example prepending or appending or otherwise intermingling these inputs to form a string upon which these operations may be performed to produce a fixed sized output that is based upon the entirety of the input. The resulting directed acyclic graph may be stored in memory.

Before completing discussion of FIG. 2, it is helpful to describe an example of a directed acyclic graph like that used in the process of FIG. 2. FIG. 3 shows an example of a directed acyclic graph 70 consistent with the present techniques. In some embodiments, the directed acyclic graph 70 may include a plurality of blocks in a sequence, such as blocks 72, 74, and 76, which may be arranged in a linked list, with links formed by cryptographic hash pointers corresponding to the illustrated arrows between the illustrated blocks. In some embodiments, the block 72, 74, and 76 may be added sequentially, over time, for example as each block is completed. In the illustrated example, the block 72 may be a most recent block, while a block 76 may be an earliest block. In some embodiments, the cryptographic hash pointers between each of the blocks may be based upon node content in the preceding block, and that node content may include a cryptographic hash pointer based on node content in the preceding block to that block. Thus, a cryptographic hash value of the cryptographic block 72 may be based upon each of the preceding blocks' cryptographic hash values and all content rendered tamper-evident by the data structure.

In some embodiments, each block may include a binary tree with a root node 80. In some embodiments, each of the arrows between blocks in the binary trees of each of the block 72, 74, and 76 may also be cryptographic hash pointers, for example, based on an identifier of the node to which the cryptographic hash pointer points and a cryptographic hash value based upon node content of that node, which may include an attribute of that node that is itself a cryptographic hash value of another hash pointer. Thus, in some cases, a cryptographic hash value of a root node 80 may be based upon node content of every node of the binary tree in each block 72, 74, or 76. In some embodiments, the node 80 may include three such hash pointers, corresponding to six node attributes, the six attributes including three pairs of node identifiers and cryptographic hash values based on node content of those nodes. In some embodiments, node content may further include a cryptographic hash value based upon each of these values, or such a cryptographic hash value may be stored in another node that points to that node. The illustrated graphs are acyclic. As that term is used herein, it may refer to an acyclic subset of a larger cyclic graph. Thus, claims to acyclic directed graphs may not be avoided simply by adding an un-used cycle.

In some embodiments, the binary tree structure may facilitate relatively fast access to records within a given binary tree once a given block 72, 74, or 76 is identified. In some embodiments, to expedite access to specific blocks, some embodiments may include a skip list data structure, for example, with another node or value within node 80 that includes a cryptographic hash pointer to some number of blocks earlier in the sequence, for example, to a block four positions earlier, another to a block eight positions earlier, another to a block 16 positions earlier, another to a block 32 positions earlier, and so on. Some embodiments may thus, skip over some portions of the sequence of blocks to access a specified block. Three blocks 72, 74, and 76, are shown, but is expected that commercial embodiments will include substantially more, for example more than 50, more than 100, more than 500, more than a thousand, or more than 10,000 blocks in a given directed acyclic graph 70. In some embodiments, an earliest block 76 may include a cryptographic hash pointer to a seed node 78, which may include a random value (e.g., a pseudo random value) longer than 64 bytes as node content as an attribute to provide a minimum level of entropy for each succeeding cryptographic hash value that points directly or indirectly to the node 78.

In the illustrated example, the blocks 72, 74, and 76 include binary trees with three levels of hierarchy, but embodiments are expected to include more, for example four levels, five levels, six levels, seven levels, eight levels, or more levels of hierarchy, each including twice as many blocks as a proceeding level in the hierarchy. In some embodiments, the binary trees may be balanced binary trees, or in some cases the binary trees may be unbalanced. In some embodiments, nodes in the binary trees below a lowest level, such as nodes 80, 84, and 86 that are non-leaf nodes, may include node content that is based on cryptographic hash pointers but not based on node attributes in those nodes that store content of documents, or in some cases documents may also be stored in these nodes. In some embodiments, content of documents, such as documents themselves or portions of documents may be stored in attributes of node content of leaf nodes 88, 90, 92, and 94, such as an individual one of these leaf nodes in some cases. Thus, for example a given document stored in leaf node 90 as an attribute in node content of leaf node 90 may cause a cryptographic hash value in a cryptographic hash pointer of nodes 84 and 80 to be based upon that document. As a result, a modification to the document stored in node 90 may cause the cryptographic hash pointers in nodes 80 and 84 to be inconsistent with that document, as cryptographically hashing the modified document is not expected to yield the same cryptographic hash value in the cryptographic hash pointers of these nodes 80 and 94. In some embodiments, this verification operation may be repeated along a sequence in a path of such nodes connected by cryptographic hash pointers, in some cases from or to any leaf node up to a most recent root node added to the directed acyclic graph 70, thereby relatively granularly identifying a node with data from a workload application that has been modified and relatively reliably making that data tamper evident due to the computational infeasibility of crafting hash collisions consistent with the modification to the data along the path. In some cases, leaf nodes may be arranged based on the content, e.g., with each leaf node from left to right storing a range of values, or each leaf node storing up to a threshold amount of data arranged alphabetically, temporally, or in some other arrangement.

In the illustrated directed acyclic graph 70, a sequence of binary trees are shown, but embodiments are consistent with other types of directed acyclic graphs. In some embodiments, the directed acyclic graph is a graph with no unconnected sub graphs. In some embodiments, the directed acyclic graph is a single binary tree, or in some cases the directed acyclic graph is a splay tree of binary trees or a binary tree of splay trees. In some embodiments, the directed acyclic graph includes a skip list of splay trees or binary trees. In some embodiments, the directed acyclic graph includes a binary tree of skip lists or splay trees or linked lists. (Some embodiments may facilitate re-arrangement of trees and other structures to facilitate faster access with abstract cryptographic hash functions described below, or hash pointers may be recalculated upon restructuring).

Thus, the directed acyclic graph 70 may include a plurality of nodes, some of which have node content that includes cryptographic hash pointers correspond to edges in the directed acyclic graph 70, and some of which includes node content that includes as attributes workload application data that is secured by the directed acyclic graph 70.

In some embodiments, the directed acyclic graph 70 may take the form of a distributed ledger, such as a block chain having a linked list of blocks, with each block including a Merkel tree having a Merkel root that serves as a node attribute of the respective block, and subsequent blocks having node attributes that include cryptographic hash values based on the Merkel root of each proceeding block.

In some embodiments, adding nodes or collections of nodes, such as blocks, to the directed acyclic graph 70 may be implemented in a un-trusted computing environment by un-trusted computing devices, in some cases based on a consensus protocol (like Paxos, Raft, or others) in which different computing devices perform or demonstrate some proof of something that is difficult to consolidate, such as proof of work or proof of storage, for instance, by calculating a hash collision to a threshold number of prefix or suffix digits of a cryptographic hash value. In some embodiments, a collection of untrusted computing devices may execute a consensus algorithm to determine whether blocks should be added or are valid, for example. Or to expedite operations, some embodiments may avoid the overhead associated with proof of work or storage techniques by executing within an environment in which more control is exercised over the hardware that performs the operations described herein.

It should be emphasized that a data structure need not be labeled as a graph or as having nodes or edges in program code to constitute a graph, as long as the data structure includes linking between data elements present in a graph. In some cases, graphs may be encoded as a list of links between data elements, for example, in a key-value pair, or in a hierarchical data structure, such as in a hierarchical data serialization format, like JOSN or XML. Graphs may also be encoded as relationships in a relational database. Further, multiple data structures, such as different graphs, may be overlaid on one another, for example in the manner described below, while still preserving the existence of the distinct graphs.

In some embodiments, each of the above-described storage compute nodes 26 may store one or more instances of a directed acyclic graph 70 like that shown in FIG. 3. In some embodiments, a given directed acyclic graph may be replicated in multiple instances on multiple storage compute nodes 26, for example, in multiple data centers 24. In some cases, an odd number of replicated instances may be stored. When reading data back, some embodiments may implement a consensus protocol to determine an authoritative copy, for example identifying a version of a document returned by a plurality or a majority of the replicated instances following a read operation like that described below.

In some embodiments, a given directed acyclic graph 70, which may be replicated in multiple instances, may store data from a single workload application from a single tenant, and in some cases a subset of data from a single workload application, or data may be mixed. In some embodiments, a given directed acyclic graph may store data from multiple applications of a given tenant. In some embodiments, a given directed acyclic graph may store data from multiple tenants, depending upon the implementation.

In some embodiments, as data is accumulated, when the directed acyclic graph 70 exceeds a threshold size, a new directed acyclic graph may be instantiated, for example, using a cryptographic hash value of a root node of a last block added to a previous directed acyclic graph as a seed value 78 in a seed node.

Thus, FIG. 3 shows an example of a directed acyclic graph in which documents stored with the process of FIG. 2 may be stored in a tamper-evident fashion in an immutable data structure. As the document is a revised, new records may be added with new versions of the document to the data structure 70, and pointers to a most recent version of the document may be updated, for example, in the lower-trust database 14 to reference those newer versions. In some embodiments, these pointers may implement techniques described below by which pointers are substituted for records in a data store. In some embodiments, those pointers may point to an individual node in an individual directed acyclic graph. In some embodiments, the pointers are node identifiers or the below described segment identifiers.

In some embodiments, the translator 20 described above may maintain in memory an index that maps pointers to uniform resource identifiers of storage compute nodes 26 and directed acyclic graphs maintained by the storage compute nodes, and in some cases, the DNS 18 may map those uniform resource identifiers to Internet Protocol addresses and port numbers of the corresponding storage compute nodes 26. Thus, after a document is written to the directed acyclic graph 70, a pointer, such as a node identifier that distinguishes that node from among all other nodes accessible to a given application, tenant, or all tenants, may be stored in the lower-trust database 14 or other data store in place of the document.

In some embodiments, the directed acyclic graph 70 may be periodically verified for internal consistency to detect instances of tampering with documents. Some embodiments may recalculate cryptographic pointers along various paths, for example, each time a new document or other record is added to the directed acyclic graph 70, for example, each time a new block is added. Upon detecting a path in which the cryptographic hash pointers do not correspond to a document or other node content in that path, some embodiments may designate that document or other values as having been modified. Some embodiments may further emit an alarm, e.g., send an email, send a text message, and suspend various user accounts, such as users that have access the document responsive to detecting tampering. To detect tampering, some embodiments may recalculate the cryptographic hash values for each cryptographic hash pointer along each path to each document and determine whether the recalculate cryptographic hash values match those stored as node attributes of nodes storing the respective cryptographic hash pointers. Thus, if a given document, for example in node 90 of block 72 is tampered with after storage, the cryptographic hash pointer from block 84 to block 90 will not match the stored cryptographic hash value in the node attribute of node 84, nor will the cryptographic hash pointer from block 80 to block 84 match the stored value in the node 80. Further, if additional blocks were added subsequent to block 72, the cryptographic hash pointers between blocks subsequent to block 72 will also fail to match, thereby providing a traceable path from a most current node back to a node in which the node content was tampered with by an attacker. In some embodiments, these verification operations may be performed each time a node is written, each time a block is written, periodically, like hourly, daily, or weekly, or each time a read operation is performed.

FIG. 2 further includes operations by which a document may be read back from the secure distributed storage 16. In some embodiments, the operations of process 50 may include receiving a read command requesting that the document be retrieved from the immutable data structure, as indicated by block 60. In some cases, the read command may be received after the write command, e.g., substantially later, for instance more than an hour, day, or week later. In some cases, the read command may be received after multiple write commands for the same document in which different versions are written to different nodes in different blocks, and in some cases to different directed acyclic graphs like those described above with reference to FIG. 3. In some embodiments, the read command may reference an identifier of a document that indicates a most current version of the document is to be retrieved, or in some cases the read command may reference a particular version of the document. In some cases, receiving the read command may cause the security driver 30 to access the lower-trust database 14 or other lower-trust data store and retrieve a pointer to a node or sequence of nodes in which the specified document is stored. As noted above, in some cases the pointer may be a value that maps to a uniform resource identifier that the DNS 18 maps to an Internet Protocol address and port number where the corresponding node is stored in a corresponding directed acyclic graph.

Next, some embodiments may access one or more nodes of the directed acyclic graph to retrieve the document, as indicated by block 62. In some cases, this may include sending a pointer to a node at which at least part of the document is stored to the translator 20, accessing a uniform resource identifier of a directed acyclic graph in which the node resides in an index stored by the translator 20, converting the uniform resource identifier to an Internet Protocol address and port number pair with the DNS 18, requesting the corresponding node from the storage compute node 26 hosting the specified directed acyclic graph at the Internet Protocol address and port number, and returning the requested document to the requesting application 28.

Further in some cases, accessed documents may be verified. For example, some embodiments may recalculate cryptographic hash values based on the document along a path from a most current node of the directed acyclic graph back to the document (or a subset thereof) and determine whether any calculated cryptographic hash values do not match those stored in the respective nodes of the directed acyclic graph, as indicated by block 64.

For clarity of terminology, it should be noted that the storage compute nodes 26 refer to computing entities (e.g., a service topology), while the nodes of the directed acyclic graph 70 refer to elements of a data structure.

Embodiments may determine whether these calculated values are internally consistent, as indicated by block 66. This may include determining whether calculated values match those stored in the node pointers of the directed acyclic graph 70. Upon determining that the values match, some embodiments may return the requested document, as indicated by block 69. Upon determining that the values do not match, some embodiments may indicate that the document has been modified, as indicated by block 68. Thus, an entity retrieving the document may have some confidence that the document has not been tampered with. Further, because some embodiments store the document in the nodes, the document may be retrieved relatively quickly (e.g., within 200 ms, 100 ms, or 50 ms), even when storing relatively large amounts of data, e.g., more than 100 GB or more than 10 TB. Though embodiments are not limited to systems affording these benefits, as independently useful techniques are described, which is not to suggest that any other description is limiting.

In some embodiments, documents or other values written to the secure distributed storage 16 in nodes of directed acyclic graphs 70 may be subject to various types of encoding prior to write operations. In some embodiments, data may be encoded with redundant information such that if some of the data is modified before writing or after writing, the encoding reveals errors and in some cases provides enough redundant information that data may be recovered. For example, some embodiments may encode the data with Hamming codes or Turbo codes such that if a subset of the data is lost, the document may be reconstructed based on redundant information in another part of the document. In another example, data may be compressed, for example, with entropy coding to facilitate reduced use of bandwidth and faster retrieval. In some embodiments, sequences of values in a document may be analyzed to identify frequencies with which sequences occur, and those sequences may be mapped to a dictionary in which relatively frequent characters are represented with relatively short values, while longer less frequent sequences are mapped to longer values. The mapping and dictionary may then be stored in the secure distributed storage in a compressed format. In some embodiments, after compression, some embodiments may encrypt the data as well, for example, with a symmetric encryption algorithm in which keys are maintained by the client computing device 12, for instance, by XOR'ing the document with a random string that serves as the symmetric key. In some cases, the symmetric key may be stored in the distributed storage 16 in the manner described above.

Fragmenting Data for the Purposes of Persistent Storage Across Multiple Immutable Data Structures As noted above, traditional databases do not adequately protect against threat actors or internal resources (employees, information-technology staff, etc.) tampering with the data. Data residing in singular logical spaces presents an easy target for threat actors. Once the computing device upon which the data is stored is compromised, the entirety of the data is potentially at risk. Similar problems arise when a single computing device controls access to all other computing devices in distributed master-slave architectures, as once the master-device is compromised, data on other devices is potentially exposed.

Techniques exist for storing data in a distributed form in a peer-to-peer network, but such systems often present other problems. Examples include various systems built around the BitTorrent protocol. These systems often operate without a central authority to be compromised. But in these systems, when or if the data is altered (potentially for the purposes of hiding or obfuscating changes), there is no recourse or method to detect these changes. Further, many distributed peer-to-peer storage networks, like many implementing the BitTorrent protocol, maintain full copies of files (or other BLOBs) at each peer, potentially leaving the full file open to inspection by an untrusted party.

To mitigate these issues and others, in some embodiments, when writing data, a component referred to as an "arbiter" (which may be a piece of middleware and may be implemented in the translator 20) may be capable of taking as an input a fully formed datum (e.g., a unit of content, like a document or value in a database), starting from the last byte of the data, fragmenting that data into N pieces (where Nis an integer larger than 1, and in many commercially relevant cases larger than 5 or 10, and in some cases can be relative to the size of the initial data), and placing each piece on a physically (or virtually) separate blockchain-backed storage data structures, with each piece containing pointers to the next storage location of the fragmented data. In some embodiments, the arbiter (or other middleware) then returns the TXID (or other node identifier) of the last written fragment (the first byte) to the application which requested the fragmenting of the data.

When an application or resource requests the reassembly of fragmented data, an arbiter (or other piece of middleware) is supplied with the TXID (or other node identifier) of the first byte of the data, in some embodiments. After reading the first byte, in some embodiments, the arbiter or middleware then reads the subsequent pointers until a null character or end of sequence character is read. Once all of the pieces have been read into memory, the arbiter or middleware respond to the application with the resultant unfragmented datum.

In some embodiments, other data structures, such as files or databases can be used to store the fragments. Additionally, some embodiments pre-process the data and count the number of pieces that are required from the beginning before fragmenting the data.

An additional enhancement in some embodiments is the fragmenting of the data into tree-like structures instead of list-like structures, which, during read operations, are expected to accommodate concurrency and reduce operation time.

In some embodiments, when reading or writing scattered data, the execution operation along with other meta-meta data such as user credentials may be written to an 'auxiliary' chain for the purposes of auditing access to scattered data.

Advantageously, the blockchain data structures may impede or prevent modification of the stored data fragments. Further, some embodiments may store the data with some redundancy across fragments, e.g., with Hamming codes or Turbo codes, such that even if one blockchain is compromised, fragments from other changes would be inconsistent with modified data and signal the compromise. Fragmenting the data is expected to facilitation concurrent data validation on the different chains, thereby expediting read operations in some embodiments. Further, fragmenting the data is expected to make the data more robust to attacks on individual peer machines, as even if a peer machine is compromised, only a relatively small fragment is at risk. That said, not all embodiments provide these benefits, as multiple independently useful inventions are described, and various engineering and cost tradeoffs may result in performance advantages in one aspect being deployed to improve another aspect, e.g., using faster algorithms to accommodate slower, cheaper hardware.

Figure 4:
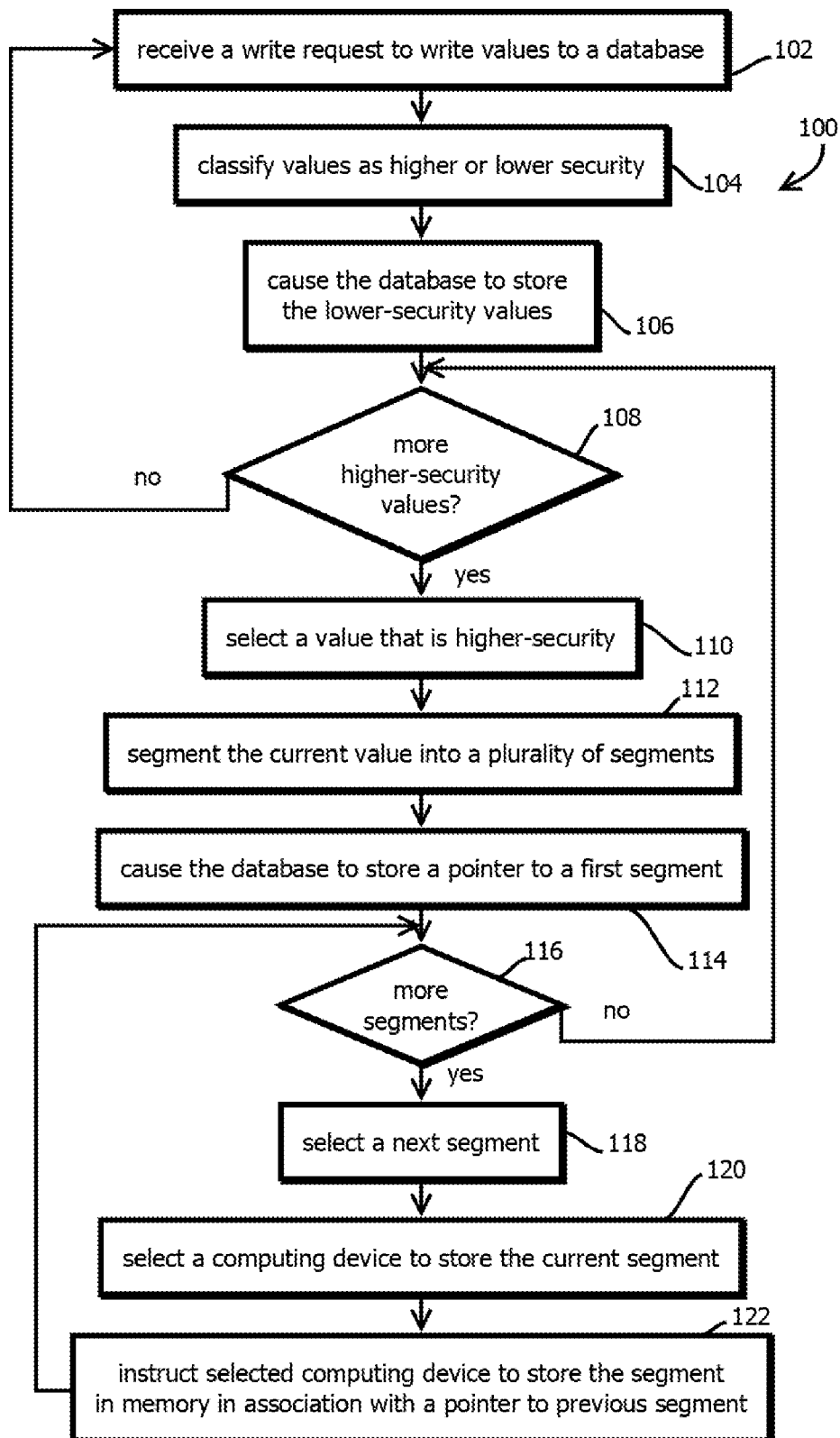
FIG. 4 is a flow chart that shows an example of a process by which stored values may be fragmented and stored among a plurality of different tamper-evident, immutable directed acyclic graphs, such as those shown in FIG. 3, in accordance with some embodiments.

To implement these techniques and others, some embodiments may execute a process 100 shown in FIG. 4 to fragment documents and distribute the fragments across multiple storage compute nodes 26 having multiple, different directed acyclic graphs, in some cases with each of those directed acyclic graphs being replicated on multiple storage compute nodes. In some embodiments, the data being stored may be individual values and individual fields having individual portions of records of a database, such as a value at a given row and column position in a given table. In some cases, the data being stored as a unit may include metadata, like a primary key, table identifier, database identifier, and tenant identifier. In some embodiments, the data being stored may be a document like those described above that is larger than an individual value.

In some embodiments, the process 100 may include receiving a write request to write values to a database, as indicated by block 102. In some embodiments, this operation may be performed by the security driver 30 described above. In some embodiments, the write request may be a request to write a value with a structured query language statement to the low-trust database 14, or a request to write to a file in a file system. Or in some cases, the values subject to subsequent operations may be values already stored in a lower-trust database 14 or file system, for example, values processed during an installation process by which a lower-trust database 14 is secured by moving data into the secure distributed storage 16 described above.

Next, some embodiments may classify values as higher or lower security, as indicated by block 104. For example, a write request may specify that a given record is to be added to a new row in a table, and that record may specify a tuple in which values are assigned to each of several fields, each corresponding to different columns in the table. In some cases, some of those fields may be lower-security, while other fields may be higher-security. In some embodiments, the security driver 30 may include a table that maps table/field combinations to security designations, for example, binary values indicating whether the values are lower or higher security values. Or some embodiments may use the other types of data security policies described below. For example, a Social Security number field may be a higher-security value, while a username in a public-facing account may be a lower-security value. In another example, credit card information like a credit card number may be a higher-security value, while a ZIP Code in a mailing address may be a lower-security value.

Next, some embodiments may cause the database to store the lower-security values, as indicated by block 106. In some cases, this operation may include modifying a SQL statement or other database command received by the security driver 30 from the application 28 and providing the modified command to the database driver 32. For example, some embodiments may modify portions of the received command that would otherwise specify that the higher-security values are to be written to the lower-trust database 14. In some cases, the modification takes the form of modifying the values themselves rather than reserved terms in the command, such that modified values are written to the lower-trust database 14 in the positions that the corresponding higher-security values were going to otherwise be written by the application 28 (thereby maintaining relationships stored in the database). Or pointers may be written to directories in a file system in place of files or other documents. For example, some embodiments may cause node identifiers or other pointers to nodes to be written, for example, identifiers of segments of the data to be written that are formed in operations described below, like a first segment.

Next, some embodiments may determine whether there are more higher-security values that were identified to process, as indicated by block 108. In some cases, some embodiments may iterate through each of the higher-security values, or process some or all of the higher-security values concurrently, and operation 108 may determine whether the full set has been processed. Upon determining that all of the higher-security values that were classified have been processed, some embodiments may return to block 102 and wait for a next write request. Alternatively, some embodiments may select a next value that is higher security, as indicated by block 110, for subsequent operations.

Next, some embodiments may segment the current value into a plurality of segments, as indicated by block 112. As noted above, the current value in some cases may be an individual value for an individual field of an individual row of a database, or in some cases the value may include additional information, such as an entire row, or a value that associates a value in the database with a table and primary key for that row. Or in some cases, the value may be a document like that described above that may include additional data.

Next, some embodiments may segment the current value into a plurality of segments, as indicated by block 112. In some cases, the value may be segmented by character position in the sequence or byte position in a sequence of bytes, for example, segmenting each sequential byte in a serialized representation of the value or each sequential four bytes. In some embodiments, segmenting may include segmenting with the entropy coding techniques described above. For example, some embodiments may segment according to a dictionary coding in an entropy coding of the value, for example, with each dictionary entry corresponding to a different segment. In another example, segmenting may include an operation that breaks up the value into multiple segments that each contain nonconsecutive portions of the value, for example, placing every fifth byte into a first segment starting with a first byte, placing every fifth byte in a second segment starting with a second byte, placing every fifth byte in a third segment starting with a third byte, and so on. In some embodiments, values may be segmented into a specified number of segments, for example, dividing the value into fourths, such that one fourth of the bytes by which the value is encoded go into a first segment, one fourth into a second segment, one fourth into a third segment, and one fourth into the fourth segment.

In some embodiments, values may be segmented with techniques from network coding (e.g., linear network coding) such that resulting segments are combined in a bit-wise operation to reconstruct the value. For instance, a given value 64 bytes long may be segmented into two 64 byte segments that when combined in a bit-wise XOR operation produce the original value. In some embodiments, some of the segments may contain redundant information relative to other segments. For example, some embodiments may encode data before segmenting or during segmenting with Hamming codes or Turbo codes, such that if two of three consecutive segments are available, the information and the other segment can be re-created, or such coding may be applied with less redundant information such that errors in one segment render that segment inconsistent with the redundant information in an adjacent consecutive segment. In some embodiments, the segments may be represented as a sequence or in some cases, the segments may be represented in other data structures. For example in some cases, the segments may be represented as a collection of paths through a prefix tree.

Next, some embodiments may cause the database, such as the lower-trust database 14, to store a pointer to a first segment, as indicated by block 114. In some cases, this operation may further include causing a record to be added to an index maintained by the translator 20 that associates that pointer, which may be a unique segment identifier, which in some cases may be an identifier of an individual node in a data structure like that directed acyclic graphs 70 described above, or an individual attribute of a node in that data structure, with an address of the directed acyclic graph. In some cases, the association may be with a plurality of addresses each corresponding to a different replicated instance of the directed acyclic graph, such as a plurality of different uniform resource identifiers that are mapped by the DNS 18 to Internet protocol addresses and port numbers of the corresponding storage compute nodes 26 storing those different instances of the directed acyclic graph and in some cases performing the above-described operations by which nodes are formed and data is verified. In some embodiments, causing the database to store a pointer to the first segment may include performing the above-described operations by which a write command received from the application 28 is modified to replace the higher higher-security values with the pointers before providing that command to the database driver 32.

Some embodiments may iterate through each of the segments, causing each of the segments to be stored and determining in each iteration whether there are more segments to process, as indicated by block 116. Upon determining that there are more segments for a given value to be processed, some embodiments may select a next segment, as indicated by block 118. Some embodiments may then select a computing device, such as a computing device executing one of the above-described storage compute nodes 26, to store the current segment, as indicated by block 120. In some cases, a list of the storage compute nodes 26 may be maintained in a circular linked list, and some embodiments may maintain a pointer that is advanced with each storage operation, causing the pointer to cycle through the list, and using the pointed-to storage node to store the current segment. Or some embodiments may select storage compute nodes 26, for example, with a random number or with a pseudorandom value generator, such as a linear shift register. In some embodiments, storage compute nodes to store a given segment may be selected based on a unique identifier assigned to the segment. In some embodiments, the unique identifier may be a hash value based on content of the segment, and a prefix or suffix of the hash may uniquely identify one of the storage compute nodes 26. In some embodiments, such a prefix or suffix may uniquely identify a directed acyclic graph 70, which may be replicated on multiple stores compute nodes. In some embodiments, the content of the segment itself may be hashed, and a prefix or suffix may specify one of the above-describe storage compute nodes 26 or an instance of a directed acyclic graph that may be replicated on multiple stores compute nodes 26. For example, 64 different directed acyclic graphs may be maintained, each replicated three times, and a trailing six digits of a binary representation of a hash of the content of the segment may specify a value that ranges between zero and 63, and that value may serve as an identifier of one of the directed acyclic graphs to which that segment is to be stored. In some embodiments, selecting a directed acyclic graph may cause one or more, such as three, computing devices to be selected, those being the computing devices that store and maintain the corresponding directed acyclic graph.

Next, some embodiments may instruct the selected computing device to store the segment in memory in association with a pointer to a previous segment, as indicated by block 122 (except for a first-segment, which may not have a pointer to a previous segment). In some embodiments, this may include the above-described translator 20 sending instruction to each of an odd numbered set of storage compute nodes 26 replicating one of the directed acyclic graphs 70 to form a node in which the segment content and the pointer serve as one or more attributes of that node, such as one of the above-described leaf nodes 88 through 94. In some embodiments, forming this node may further include forming cryptographic hash pointers to that node through the above-described types of data structures by which different directed acyclic graphs may be formed, for example, through higher levels of a hierarchy in a binary tree, in some cases adding additional blocks to a linked list of blocks, each block having a different binary tree and link to previous blocks according to cryptographic hash pointers like described above.

Next, some embodiments may return to determine whether there are more segments in association with the current value. Upon determining that there are no more segments, some embodiments may return to block 108 and determine whether there are more higher-security values to process. In some embodiments, multiple values may be processed concurrently. In some embodiments, values may be segmented from front-to-back or vice versa.

Figure 5:
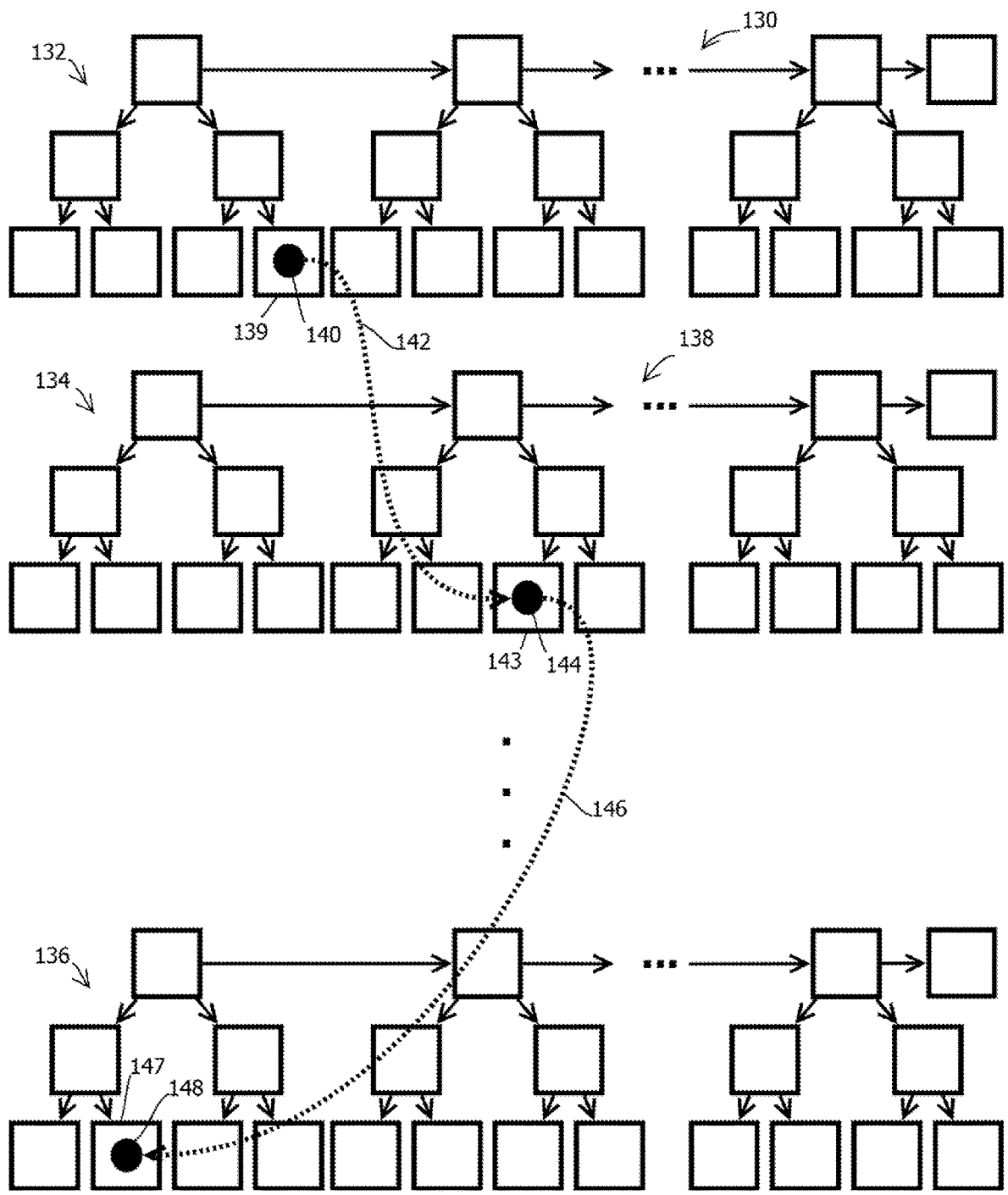
FIG. 5 is a data model block diagram that shows an example of a tamper-evident, immutable data repository storing fragments of data distributed among multiple directed acyclic graphs that may be operated upon by the processes of FIGS. 4 and 6 in accordance with some embodiments.

FIG. 5 shows an example of a resulting data structure 130 in which a plurality of segments are stored in different directed acyclic graphs 132, 134, and 136, which in some cases may each have the features of the directed acyclic graphs described with reference to FIG. 3. In some embodiments, the segments of a given value may be stored in a content graph overlaid on each of these directed acyclic graphs 132, 134, and 136, which may be characterized as a verification graphs to distinguish an overlaid content graph (and as they serve as an immutable tamper-evident log of the values of the segments in some embodiments).

In this example, the segments in the content graph 138 form a linked list, with a first node of the segment content graph 138 being stored in a leaf node 139 of verification graph 132, that first segment being designated as node 140 in the content graph. The node 140 in the content graph may be stored as an attribute in node content in the node 138 of the verification graph, and the content node 140 may include a pointer 142 to a next node in the content graph 138, which may be stored on a different verification graph 134. In some cases, the pointer 142 may be characterized as an edge in the content graph 138 and may be expressed as an identifier of a node 143 in the verification graph 134 or in some cases as an identifier of an attribute in that node where multiple segments are stored in different attributes of a given node of a verification graph. In some embodiments, in the content graph 138, node 140 points to another segment 144, which may then the point to another segment with pointer 146 in verification node 147 of verification graph 136. Verification node 147 may include as node content one or more attributes that specify a final segment in content graph 138 designated with element number 148. In some cases, node 148 may specify that there are no additional nodes in the value.

As a result, even if a given malicious actor somehow compromises one of the verification graphs 132, 134, or 136, that attacker will only be able to access a set of segments of values and will not have access to other segments needed to complete the full value stored in the distributed storage 16. Further, because the segments are stored in a tamper-evident directed acyclic graph with the above-described hash point cryptographic hash pointers, evidence of tampering will not be computationally feasible to conceal.

Thus, FIG. 5 shows a plurality of verification directed acyclic graphs 132, 134, and 136, each of which may be replicated, and each of which has nodes that may store as node content data that encodes a content graph 138, which in this case is a linked list of segments, where each segment in sequence points to the next segment and its corresponding address, and in some cases attribute identifier in the underlying verification graphs.

In this example, segments are arranged in a one-dimensional linked list, but embodiments are consistent with other arrangements of content graphs. For example, some segments may include pointers to multiple subsequent segments, for example, in a skip list to facilitate concurrent retrieval, and in some cases segments may be stored in association with a segment position identifier, for example, an order in which the segments are to be sequenced to reconstitute the segmented value by the translator 20 in a read operation. In another example, segments in a content graph encoding a plurality of segments of an individual value may be stored in a binary tree content graph, a skip list content graph, or a combination of binary trees, linked lists, skip lists, and the like.

Three segments for a given value are shown, but embodiments are expected to include substantially more in some cases. In some cases, binary data encoding a single text character may be segmented, for example with a given Unicode character being segmented into two or more segments, and a given value yielding 10 or more or 20 or more segments, which in some cases may each be stored in different distributed acyclic graphs, which in some cases may each be replicated multiple times, for example 3 or more times. Thus, a given value may be stored in part on 30 different storage compute nodes 26. In some cases, different instances may be compared to determine an authoritative copy, e.g., selecting a stored and returned value according to a majority rule approach among the replicated instances. In some cases, e.g., where the replicated instances of the graphs are on permissioned computing devices, embodiments may vote for a given value without performing a proof of work or proof of storage operation, or where devices storing the graphs are untrusted, some embodiments may determine consensus with a proof of work, storage, or stake, e.g., according to a consensus protocol, like Paxos, Raft, or the like. In some embodiments, e.g., in untrusted systems, instances may be addressed according to Interplanetary File System (IPFS) or with various distributed hash table approaches.

In the example of FIG. 5, each of the directed acyclic graphs 132, 134, and 136 is the same type of directed acyclic graph, in this case a linked list of binary trees, where edges are formed by cryptographic hash pointers. In other embodiments, a heterogeneous set of directed acyclic graphs may be combined, for example with different segments stored in different types of graphs. For example, an initial segment may be stored in a binary tree, while other segments may be stored in directed acyclic graphs like those shown in FIG. 5, for example, in linked lists of binary trees.

Figure 6:
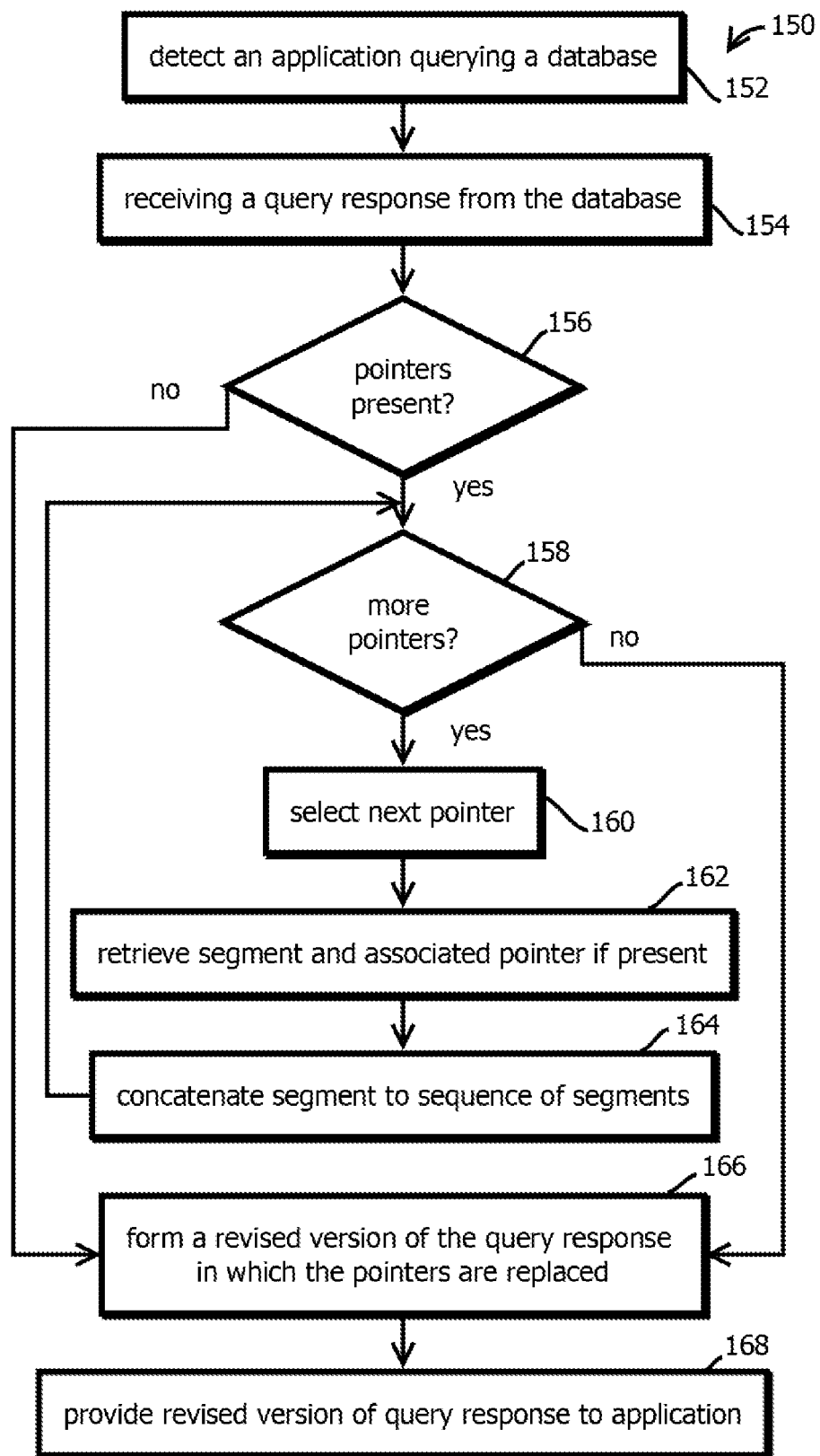
FIG. 6 is a flow chart that shows an example of a process by which data may be read from the data structure of FIG. 5 in accordance with some embodiments.
Figure 7:
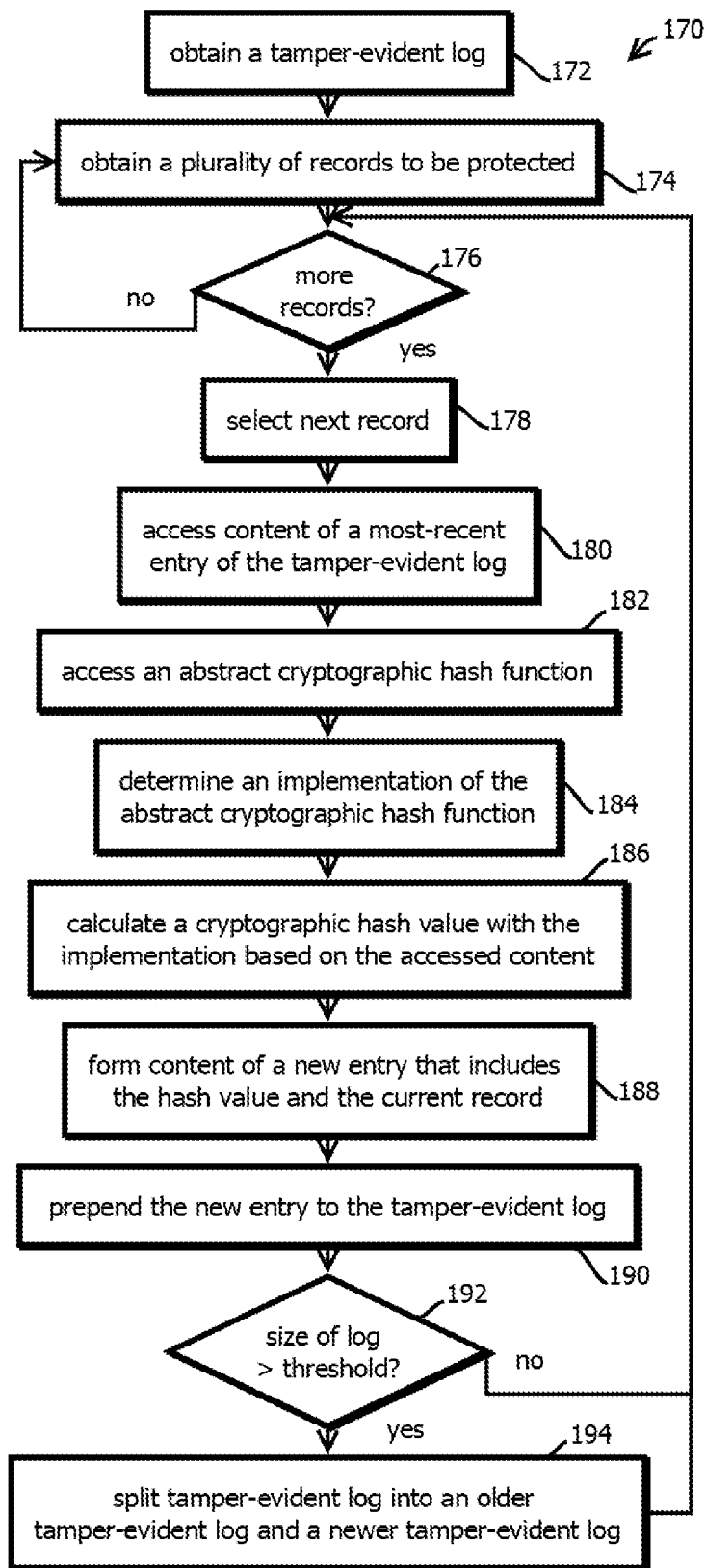
FIG. 7 is a flow chart that shows an example of a process by which cryptographic hash pointers in tamper-evident data repositories may be formed to render the data repositories modular in accordance with some embodiments.

FIG. 6 shows an example of a process 150 by which data may be retrieved from the data structure 130 of FIG. 5 or other data structures written to with the process of FIG. 4. In some embodiments, the process 150 includes detecting an application querying a database, as indicated by block 152. In some cases, this includes executing the security driver 30 shown in FIG. 1 and receiving a read request sent to the database driver 32 by the application 28 in FIG. 1. Some embodiments further include receiving a query response from the database, as indicated by block 154. In some embodiments, receiving the query response may occur after the database driver 32 in FIG. 1 sends a query to the lower-trust database 14, which may return a query response, for example, a response to a SQL statement selecting certain records that satisfy certain criteria. Or the response may be a document accessed in a file system. In some embodiments, the query response may be received by the database driver 32, which may then send the query response to the application 28. This response may be intercepted by the security driver 30 and modified by the security driver 30 before it is provided to the application 28. In some embodiments, the security driver 30 may detect pointers to segments stored in the process of FIG. 4, for example, in a data structure of FIG. 5, and send those pointers to the translator 22 be translated back into the values that were sent to the data structure in the suit secure distributed storage 16, for example in a plurality of segments. Thus, a given query response may include a lower-security portion of the query response corresponding to values in fields that, in the process of FIG. 4, are not classified as higher-security values, and higher-security values that are classified as such in the process of FIG. 4, or at least pointers to those values in the secure distributed storage 16. In some embodiments, these pointers may be detected with a regular expression configured to detect a prefix or suffix labeling the pointers as such, for example, with a sequence of reserved characters.

Thus, some embodiments may include an operation of determining whether any pointers formed in the process of FIG. 4 are present, as indicated by block 156, in the received query response. Upon determining that at least some pointers are present, some embodiments may determine whether there are more pointers to process in the query response, as indicated by block 158. Some embodiments may iteratively or concurrently process each of the pointers present in the query response from the lower-trust database 14 to replace those pointers with corresponding value stored in the secure distributed storage 16, for example, in the data structure of FIG. 5 with the process of FIG. 4.

Upon determining that there are more pointers to process, some embodiments may select a next pointer, as indicated by block 160, and retrieve a segment and associated pointer if and associated pointer is stored in association with that segment, as indicated by block 162. Segments may be retrieved in reverse order or vice versa relative to the order in the value that is segmented, depending on how the content graph is structured, e.g., based on the order in which the segments are written. In some embodiments, retrieving the segments and associated pointers may include causing the translator 20 to access an index that associates pointers, for example, segment identifiers, with one or more URLs of one or more computing devices storing a replicated instance of one of the directed acyclic graphs 132, 134, or 136 storing the segment to which the pointer points. In some embodiments, the index may further identify, in association with the pointer, a node identifier, for example, a block and path through a binary tree, to a specific node storing as node content in an attribute of that node the segment at issue and an associated pointer of present, for example if it is not the last segment to be retrieved. In some embodiments, the translator 20 may access the DNS 18 to identify an Internet Protocol address and port number of the secure compute node 26 maintaining the identified directed acyclic graph, or each secure storage compute node 26 storing one of a replicated instance of that directed acyclic graph. Some embodiments of the translator 20 may send a request to those storage compute nodes to return the identified segment, and the receiving storage compute nodes 26 may traverse the edges specified by the cryptographic hash pointers in the corresponding directed acyclic graph along a path specified by the request to the specified node storing the segment. Or some embodiments may navigate directly to the segment, for example, based on a node identifier that identifies an address in memory of the segment without requiring traversal. In some embodiments, to expedite access, locations of nodes in memory may be stored in a binary tree corresponding to note identifier, or in a sorted list, to facilitate relatively fast access to content of nodes.

In some embodiments, the storage compute node 26 or set of storage compute nodes 26 replicating the directed acyclic graph, may return the specified segment to the translator 20. In some embodiments, the translator 20 may receive multiple instances of the requested segment, and some embodiments may determine whether each of the segments match one another or determine a content of the segment based on a content returned by a plurality or majority of the responses, thereby preventing a modification of one of the instances from affecting the authoritative content of the segment determined by the system. That said, not all embodiments provide this benefit, which is not to suggest that any other feature described herein is limiting.

Some embodiments may maintain in memory a partially or fully formed encoding of the value to which the segments belong, and some embodiments may concatenate the retrieved segment to a sequence of segments accumulated in this value, as indicated by block 164. For example, some embodiments may prepend or append each successive retrieved segment to this sequence of segments. Or in some big cases, the segments may come be combined with other techniques. For example, some embodiments may combine the segments by XOR'ing the segments to re-create the value. The term "concatenate" is used broadly herein to refer to each of these different operations by which information in different segments is combined to produce the value from which the segments were taken. In some embodiments, segments may be retrieved out of order, for example, with segments labeled with a value indicating a position in a sequence, and some embodiments may sort the segments according to this value to re-create the value from which the segments were taken.

Next, some embodiments may return to determine whether there are more pointers to process in block 158. Upon determining that there are no more pointers to process, some embodiments may proceed to form a revised version of the query response, as indicated in block 166, in which the pointers are replaced with the higher-security values segmented and stored in the secure distributed storage 16, for example, in the data structure of FIG. 5 with the process of FIG. 4. In some embodiments, the replacement operation may be performed by the above-described translator 20 or within the security driver 30. In some embodiments, the revised version of the query response may include the replacement values in the same position, in the same formatting as the pointers within the query response, thereby maintaining associations between different values and metadata in the query response, for example, associations in which records are distinguished and associations in which values are indicated as applying to particular fields in those records. In some cases, where no pointers are present, the revised version of the query response may be an unaltered version of the query response, upon determining that no pointers are present in block 156.

Next, some embodiments may provide the revised version of the query response to the requesting application, as indicated by block 168. In some cases, the revised version of the query response may be advanced by the security driver 30 to the application 28 in FIG. 1 according to an application program interface of the database driver 32, such that an application 28 configured to interface with the database driver 32, but not designed with the security driver 30 in mind, will transparently receive the query data without needing to be reengineered to interface with the secure distributed storage 16.

In some embodiments, the write operations of FIG. 4 or the read operations of FIG. 6, or both, may be performed in different portions of the system of FIG. 1 (or other systems) than those described. For example, in some cases, these operations may be performed by a database management system or a database gateway by which client devices communicate with the database. In some embodiments, these operations may be performed by a dedicated appliance on a network through which client computing devices access a database. In some embodiments, these operations may be performed entirely within a single computing device, for example, as part of a monolithic application in which the features of the secure distributed storage are operated within a single computing device, or on a single device in which the different components execute in different containers or virtualized operating systems accessed via a loopback Internet protocol address.

Generation of Hash Values within a Blockchain

As noted above, blockchains generally allow for small bits of information to be stored in an immutable data structure; the moment data in the chain is altered, the chain is broken and generally can no longer function. The most common blockchain implementation is the publicly accessible Bitcoin ledger (for which blockchains were designed).

However, many extant blockchain systems are not well suited for certain use cases. Blockchains are typically immutable, and therefore once data is committed to the chain, under most circumstances it is considered permanent. This can lead to scalability challenges as the chain can grow to be very large with no ability to reduce the size of the chain (none of which is to suggest that systems with immutable blockchain are disclaimed for all embodiments or are inconsistent with some implementations).

These, and other problems, are mitigated by some embodiments of the system introduced above referred to below as "Docuchain." Docuchain, in some embodiments, is a blockchain software suite for low-latency put and get operations of BLOBs. Docuchain, in some embodiments, uses an improved version of a hash function for a blockchain.

Docuchain, in some embodiments, makes use of abstract functions (a term which is used generically to also refer to methods and other routines) to define which properties of individual blocks are used in creating the block hash (sometimes referred to as Merkle root). By variating the properties that are used to construct this hash, some embodiments increase or decrease the ambiguity of the hash output. In some embodiments, a lambda function can be passed in to the constructor of BlockManager, which receives a block entry as a parameter and returns the values to be passed into the hash function, as defined by 'H' in the expression BlockManager<H,T>.

For example, if only the block's data is used in the generation of its Merkle Root, it would be possible to remove the head of the chain without consequence of breaking the chain itself. Alternatively, if systems use the data, the position, and potentially even more specific properties such as read/write times, the chain becomes completely immutable and must (in some implementations) stay intact in its entirety in order to be functional.

Some embodiments add this degree of control by removing the in-chain scripting language component and adding the ability for the hashed value to be controlled as part of configuration rather than part of source code. In some embodiments, the hash function accepts data that is not contingent on a block's position within a chain. In some embodiments, the hash function accepts as input only values that can be re-created in another chain.

In other embodiments, a similar output as a result of this functionality could be produced by conducting a sort of refactoring on a chain. This operation may include writing all of the data intended to be kept to a new chain, and then updating all referential TXIDs (or other pointers like those described above) in any external data stores that exist.

To implement these approaches and others, some embodiments may execute a process 170 by which a cryptographic hash function is configured to make it is feasible to recompose portions of directed acyclic graphs having edges specified by cryptographic hash pointers formed with the cryptographic hash function, for example, to accommodate directed acyclic graphs that have grown larger than a threshold size and break those graphs into smaller portions or spawn new directed acyclic graphs that link back to those directed acyclic graphs.

In some embodiments, the process 170 may be performed by the storage compute nodes 26 of FIG. 1, but is not limited to that implementation, which is not to suggest that any other description herein is limiting. Indeed, the operations of process 170 may be applied to other types of directed acyclic graphs having cryptographic hash pointers as edges, for example, in block chains used for cryptocurrencies and in distributed tamper-evident ledgers used for other purposes.

In some embodiments, the process 170 includes obtaining a tamper-evident log, as indicated by block 172. In some embodiments, the tamper-evident log is one of the directed acyclic graphs discussed with reference to FIGS. 3 and 5 and may take a variety of different forms. In some embodiments, the tamper-evident log includes a sequence of nodes, or blocks that are collections of nodes, for example, each block being a binary tree of nodes. In some embodiments, the tamper-evident log may indicate through the topology of a directed acyclic graph a sequence with which entries in the log are added. In some embodiments, each entry may be characterized as a node or as a block in the tamper-evident log.

Next, some embodiments may obtain a plurality of records to be protected, as indicated by block 174. In some cases, the records may be the segments or documents (which is not to suggest that a document cannot be a segment) discussed above. In some cases, the records to be protected may be obtained by the storage compute nodes 26, for example, upon being received from a translator 20 like that described with reference to FIG. 1.

Some embodiments may iteratively or concurrently process the records and determine whether there are more records to process, as indicated by block 176. Upon determining that there are no more records to process, some embodiments may return to block 174 and wait for additional records to process. Upon determining that there are more records to process, some embodiments may proceed to select a next record, as indicated by block 178, among the unprocessed records.

Some embodiments may then access content of a most-recent entry of the tamper-evident log, as indicated by block 180. In some cases, the most-recent entry may be a last block written to the log or a last node within a component of a block, like a leaf node or higher-level node in a binary tree in a block. In some cases, the accessed content may be one or more attributes of the most recent entry, such as one or more attributes of node content. In some embodiments, those attributes may include those like which are described above with reference to nodes in the directed acyclic graphs described with reference to FIGS. 3 and 5.

Next, some embodiments may access an abstract cryptographic hash function, as indicated by block 182. The term "abstract" refers to a programming construct by which the specific implementation of a function or method is defined by other code than that having a placeholder designating the function as abstract (e.g., an object, class, subroutine, or function), and in some cases certain aspects of the abstract function are defined in other code, for example in a class definition in an object-oriented programming language, where a non-abstract implementation of the abstract function is defined upon implementing an object in the class. In another example, the abstract function may be specified as abstract by code configured to receive a lambda function from a calling body of code or from a body of code that calls that is called by the body of code that receives the lambda function. In some cases, the implementation may have access to the scope of the body of code having the reference to the abstract function, e.g., an instance of an object in an abstract class or a method that receives the lambda function as a parameter.

Some embodiments may determine that an abstract cryptographic hash function has been accessed, for example, upon detecting the presence of a reserved term indicating that this type of function or method has been accessed.

Some embodiments may then determine an implementation of the abstract cryptographic hash function, as indicated by block 184. In some cases, the implementation may be determined as part of instantiating an object within an abstract class, and in some cases, the implementation may be determined by receiving a lambda function defined by calling code or called code. In some embodiments, the implementation may specify a cryptographic hash algorithm, such as SHA-256 or the other examples described above, or in some cases the type of cryptographic hash function may be specified in the specification of the abstract cryptographic hash function, leaving other aspects of the algorithm to be configured in the implementation. In some embodiments, the implementation may specify which inputs are processed by the cryptographic hash function to determine an output, while the abstract representation of the cryptographic hash function may not specify which inputs are used in the implementation. Thus, a single abstract cryptographic hash function may be implemented a variety of different ways within a given body of code, for example, calling those different ways at different times in different scenarios based on different criteria.

In some embodiments, the implementation of the abstract cryptographic hash function that is determined in block 184 may specify that certain types of inputs are to be used in calculating the cryptographic hash value output. In some embodiments, those types of inputs may be selected among a subset of attributes in node content accessed in block 180, such as attributes and node content of an adjacent node of a node that is to be added to the tamper-evident log. In some embodiments, the types of inputs may be position-agnostic inputs, such as node attributes that do not indicate a position of the node accessed in block 180 within the tamper-evident log obtained in block 172. For example, the selected types of inputs may exclude timestamps, dates, counter values that indicate a position in a sequence that is specific to a graph, like an array index, or the like. In some embodiments, the position-agnostic inputs that are selected may include items like attributes that specify a segments content or document content stored in the most-recent entry. In another example, the attributes of the access node content used as the position-agnostic input to the implemented cryptographic hash function may include a cryptographic hash value of a cryptographic hash pointer to another node that is pointed to by the node accessed in block 180, thereby preserving the benefit of chaining cryptographic hash pointers.

In some embodiments, the same implementation of the cryptographic hash function may be applied to calculate each cryptographic hash value in each cryptographic hash pointer of a directed acyclic graph encoding the tamper-evident log obtained in block 172. Or in some cases, different implementations may be accessed at different times for different directed hash pointers. For example, each directed edge encoded by a cryptographic hash pointer may also include a value that identifies the implementation, for example, a value that indicates whether the edge is specified with a position-agnostic implementation of the abstract cryptographic hash function or a position-dependent implementation, the position-implement dependent implementation including as inputs the types of values described above as non-position-agnostic, for example, timestamps dates, position indices, and the like. In some embodiments, the position-agnostic implementation may be selected upon determining that the tamper-evident log in a given directed-acyclic graph, or portion thereof, has reached a threshold size and that a new directed acyclic graph storing subsequent entries to the tamper-evident log is to be created, while the other cryptographic hash function implementations that are not that are position dependent may be used at other times. Or to simplify the code, the same position-agnostic implementation may be used for each cryptographic hash pointer.

Next, some embodiments may calculate a cryptographic hash value with the implementation determined in block 184 based on the accessed content from block 180, as indicated by block 186. In some embodiments, the process 170 further includes forming content of a new entry to the camper-evident log that includes the hash value calculated in block 186 and the current record selected in block 178, as indicated by block 188. In some cases, forming new content may include modifying an existing entry or creating a new entry. In some embodiments, forming content may include adding values to attributes in the content of the new entry, such as attributes in the above-described nodes in the graphs of FIGS. 3 and 5. In some embodiments, the hash value in the current record may be separately labeled as distinct attributes in the formed content, or in some cases these values may be combined, for example, with a single cryptographic hash value based on both the accessed content from block 180 and the current record. In some embodiments, the current record may be stored remotely, while a hash digest, such as a cryptographic hash value based on that content may be stored in the tamper-evident log obtained in block 172. Or some embodiments may store the current record in the log itself to expedite access in accordance with some of the techniques described above, for example, with reference to FIGS. 2 and 3.

Next, some embodiments may prepend the new entries to the tamper-evident log, as indicated by block 190. In some embodiments, this may include adding a new entry to a sequence of entries, such as to the sequence of blocks 172, 174, and 176 in a data structure 70 of FIG. 3. The term "prepend" does not require any particular array index or position in some programming construct, as long as the new entry is designated implicitly or explicitly in the tamper-evident log as being newer than existing entries in the tamper-evident log or otherwise older-entries.

Some embodiments may then determine whether a size of the log is greater than a threshold, as indicated by block 182. In some embodiments, this may include determining whether the size of the log is greater than or equal to the threshold, a configuration also consistent with the designation greater than, which is used generically herein. Upon determining that a size of the log is not greater than the threshold, some embodiments, may return to determine whether there are more records to process in block 176. In some embodiments, the size may be measured by an amount of blocks, an amount of nodes, or an amount of data stored within the directed acyclic graph, for example, measured in megabytes.

Upon determining that a size of the log does exceed the threshold, some embodiments may proceed to split the tamper-evident log into an older tamper-evident log and a newer tamper-evident log, as indicated by block 194. In some embodiments, the split tamper-evident logs may each be of the same types of directed acyclic graphs, in some cases with the older tamper-evident log being larger at the time of the split. In some embodiments, splitting may be performed by determining to not prepend the new entry or the next entry after the new entry to the tamper-evident log and instead instantiating a new directed acyclic graph to receive a subsequent entry. In some embodiments, the older and newer tamper-evident logs may each be of the same type (e.g., class of topologies) and have the attributes of the directed acyclic graphs described with reference to FIGS. 3 and 5. In some embodiments, the system may cease adding new entries to the older tamper-evident log and continue adding new entries to the newer tamper-evident log until that log exceeds the threshold, in which case some embodiments may then split that newer tamper-evident log into a yet newer tamper-evident log, continuing indefinitely to grow the number of tamper-evident logs.

In some embodiments, an initial node or block in those tamper-evident logs may include a cryptographic hash pointer to the older tamper-evident log, for example, a cryptographic hash value based on a root node of a newest block of a consecutively older tamper-evident log. In some embodiments, this referenced content may be used to generate a seed value like in block 78 of FIG. 3 and may be associated with an identifier of the older tamper-evident log. In some embodiments, the newer tamper-evident log may be instantiated on a different storage compute node 26 in FIG. 1 from that of the older tamper-evident log, or it may be instantiated on the same storage compute node 26.

Thus, some embodiments may reconfigure directed acyclic graphs while maintaining provable tamper resistance, thereby accommodating arbitrarily large data sets.

Transparent Client Application to Arbitrate Data Storage Between Mutable and Immutable Data Repositories As noted, in many cases, traditional databases are not sufficiently secure. Many mainstream databases provide some level of permissioning, but oftentimes these permissions are broad and difficult to manage, which leads to the opportunity for attack and misuse. Further, most widely adopted databases implement transactional SQL (T-SQL) or a similar variant. In most implementations, poor design practices and legacy code can present vulnerabilities such as SQL injection attacks, which trick the database into returning potentially sensitive and unintended data. Additionally, there is very little auditability and permissioning for individual cells within a table other types of individual table values. Moreover, most database management systems rely on a driver that lives on the database client's machine. Oftentimes, these clients are open source and easily available, making exploitation easier. (None of this is to suggest that some embodiments may not also be afflicted with subsets of these problems, as several inventions are described and those inventions can be used independently without addressing every problem described herein.)

To address such concerns, various approaches have been implemented to secure stored data. Examples include air-gapping the database or carefully managing permission to access the database. Many approaches, however, are difficult to administer (e.g., using baroque permission schemas), are slow (e.g., air-gapping), or break backward compatibility with expensive enterprise applications that expect a particular database driver interface, none of which is to suggest that any of these approaches are disclaimed in all embodiments.

Some embodiments mitigate some of the problems described above with a specialized client application that is able to identify sensitive data (by column type, predefined column name, or other predefined methods). Some embodiments may capture the data as it is being transmitted to the database and route sensitive data to more secure storage mechanisms, like those mentioned above. Thus, more secure, though potentially slightly slower, storage techniques may be reserved for the most sensitive data, while less sensitive data may be processed with faster and cheaper less secure storage solutions, like traditional relational databases. Further, in some embodiments, the client application may abstract away from other applications this differential routing and variation in query formats between systems.

In some embodiments, a subset of more sensitive data may be stored by scattering the data among multiple blockchains, as described above. Similarly, when the client application detects that sensitive data is being queried (using the same method), the client application, in some embodiments, may take a TXID (or other pointer) as it is coming from the database, send it to an arbiter instance for reassembly, confirm that the request has valid permissioning and if so, place the reassembled data in place of the TXID.

Because some embodiments intercept the data in the data path, some embodiments are able to produce an additional audit log which shows all attempts to access the data, as described in greater detail below. In some cases, these access logs can be notated with request-specific information such as: username, geolocation, client machine IP address, etc.

Through this approach, it is expected that other applications that implement traditional database drivers will require little or no scatter or blockchain-specific configuration. In some cases, the process is completely transparent to other legacy applications. Further, permissioning complexity may be relaxed with secure data routed to distinct, immutable, secure data structures, as access to, and modification of, data may be readily detected.

Certain types of data are expected to be particularly amenable to use with the present techniques. Often system-access credentials, like user names and passwords, are particularly sensitive, as entire accounts may be compromised if such information is subject to unauthorized access. Storing passwords on a local machine or in a database where the entire password is accessible in one location provides an easy target for threat actors looking to manipulate, steal, or otherwise misuse authentication credentials. Other examples include credit card numbers, social security numbers, or health-related data.

Some embodiments interface with blockchains as a storage data structure with an arbiter or other piece of middleware that is capable of taking as an input the full text representation of a user credential, starting from the last byte of that credential, fragmenting that credential into N pieces, and placing each piece on a physically (or virtually) separate blockchain backed storage data structure, with each piece containing pointers to the next storage locations of the fragmented credential. When an application or resource requests the reassembly of a fragmented credential, in some embodiments, an arbiter or piece of middleware is supplied with the location of the first byte of the credential. After reading the first byte, in some embodiments, the arbiter or middleware then reads the subsequent pointers until a null character or end of sequence character is read. Once all of the pieces have been read into memory, the arbiter or other middleware may respond to the application with the resultant unfragmented credential. Some embodiments may pre-process the credential and count the number of pieces that are required from the beginning before fragmenting the credential. Some embodiments may require that credentials yield a threshold number of fragments. Some embodiments may salt fragments or credentials before fragmentation to defeat or impair rainbow table attacks.

Figure 8:
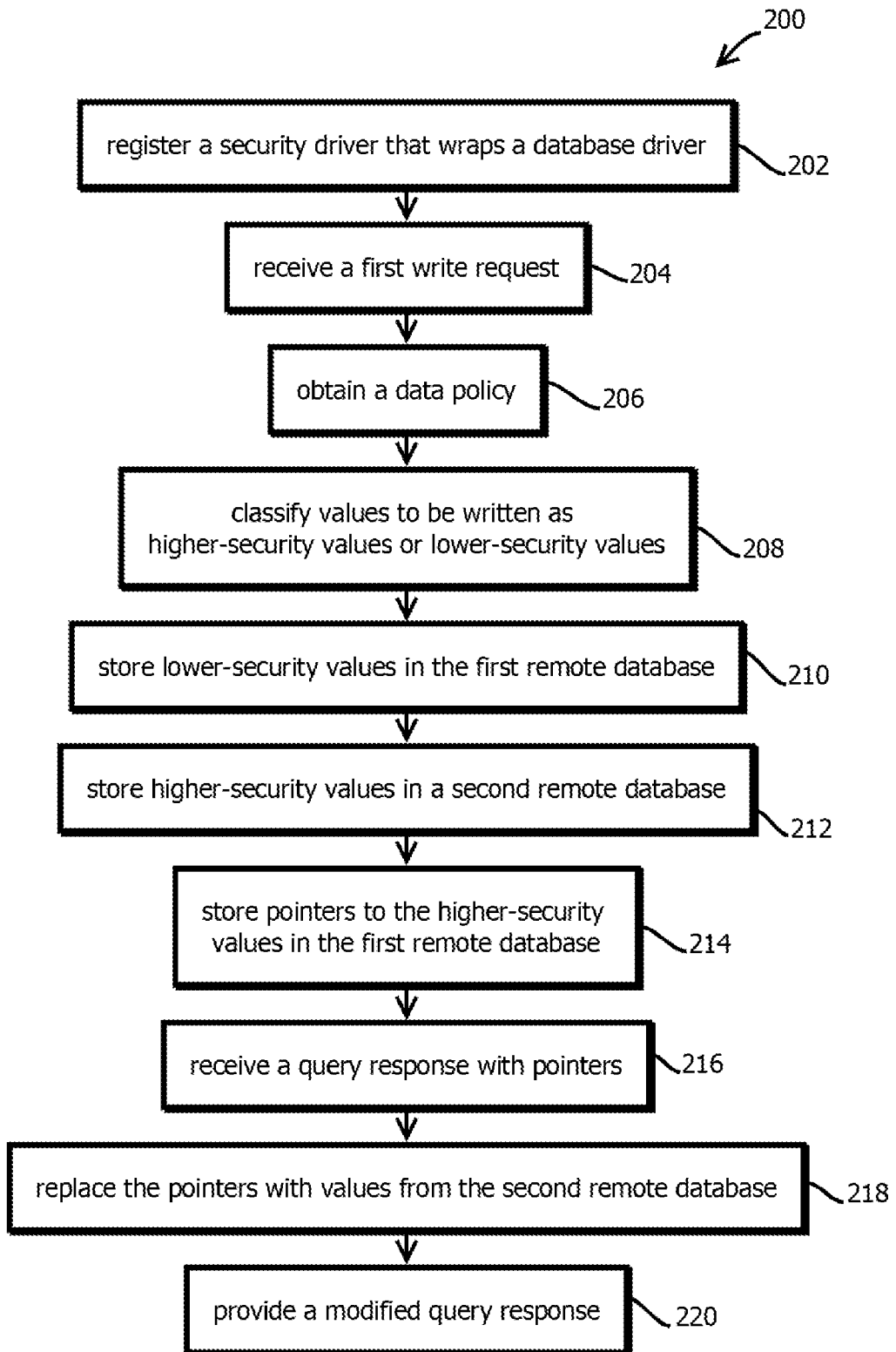
FIG. 8 is a flow chart that shows an example of a process by which existing workload applications and user interfaces may be retrofit to securely store and access relatively high-security data in a transparent fashion in accordance with some embodiments.

These and other techniques may be implemented with a process in FIG. 8, which shows an example of a process 200 that may be executed by a client computing device to transparently retrofit an existing workload application to interface with a heterogeneous mix of databases and, in particular, with a combination of databases that includes a higher-security database than that which the application is configured to interface with as originally written, such as databases like those described above. It should be emphasized, though, that the present techniques are not limited to embodiments drawing upon the above-types of more secure databases and, and some cases, may be used in conjunction with other types of databases, such as another relational database or other type of datastore, such as one that is deemed to be higher-security or lower latency than that which the application accessing data is configured to interface with. In some embodiments, the process 200 may be executed by the above-describe security driver 30, though it should be noted that in some cases, some or all of the functionality may be executed in the translator 20 in a database gateway, in a database management system, or in some other computing device.

Executing the process 200 in a client computing device, before data leaves the client computing device, or upon data arriving into the client computing device, is expected to yield certain security benefits in some use cases, where for example, the database that the workload application executing on the client computing device is configured to access has been compromised. In such scenarios, it is likely that an adversary may have compromised other computing devices on a network, and merging or splitting data at the client computing device, immediately before or after writing or reading respectively, is expected to reduce the attack surface of a network. That said, embodiments are not limited to systems providing these benefits, and in some cases, these operations may be performed in another computing device believed to be relatively secure on a network, which is not to suggest that any other feature described herein is limiting.

In some embodiments, the process 200 may be made transparent to a workload application executing on a client computing device, such as a service on one host of a plurality of hosts executing different services in a microservices architecture, or an application executing as a monolithic application on a single computing device. In some embodiments, the process 200 may be made transparent to that application by registering the process in the operating system of the client computing device to appear to be the database driver that the workload application is configured to access and then wrapping an application program interface of the original database driver with the operations described below. Thus, some embodiments may be responsive to the same set of application program interface requests that a database driver is responsive to, while providing additional functionality. Further, some embodiments may then pass modified or unmodified application program interface exchanges between the workload application and the database driver. In many cases, source code of the workload application is unavailable or is expensive to modify. Thus, retrofitting existing workload applications in a manner that does not require changes to code of that application is expected to be particularly desirable. That said, the present techniques are also applicable in use cases in which the source code is available for the workload application and is modified to implement the present techniques, which again is not to suggest that any other description is limiting.

In some embodiments, the process 200 includes registering a security driver that wraps a database driver, as indicated by block 202. In some embodiments, the security driver may be registered in an operating system in which a workload application (e.g., application 28 above) making database access request described in subsequent operations of process 200 is executed, and this operating system may also be an environment in which a database driver (e.g., driver 34 above) described below operates. In some embodiments, as a result of the registration operation, when an application sends an application program interface request to the database driver, that request may be received by the security driver instead, and the security driver may be configured to then communicate with the database driver as an intermediary between the database driver and the application within a single operating system on a client computing device.

In some embodiments, other types of access may be handled in a similar fashion. For instance, some embodiments may wrap a filesystem driver to obtain exchanges between filesystem drivers and workload applications, e.g., operating on documents. In some cases, a file system filter driver may be instantiated that emits events indicative of application program interface exchanges with the filesystem driver and some embodiments may classify these events as pertaining to higher-security documents (or not) and, in some cases, modify the driver behavior in response, e.g., substituting a document stored in the secure distributed storage 16 for an access request that pertains to, e.g., a locally stored text file with a pointer to such a document.

Some embodiments may then include receiving a first write request, as indicated by block 204. In some cases, this operation may be performed sometime after registering the security driver and may occur with relative frequency. In some embodiments, the write request is like those described above. In some embodiments, the write request is an application program interface request to the database driver from the workload application executing on the computing device. In some embodiments, the request may be to a first remote database, such as the lower-trust database 14 described above or some other data store. In some embodiments, the first write request may specify that a set of values are to be written to a set of fields in a set of records in a database, which may include adding new values to new fields to new records or modifying existing data. The first write request may be formatted in a schema specified by an application program interface of the database driver and may be operative to cause the database driver to respond regardless of whether the registration step of block 202 has occurred, though the application may then proceed to operate in a less secure fashion in some cases as a result of omitting operations from the security driver.

Next, some embodiments may obtain a data policy, as indicated by block 206. In some cases, the security driver 30 may maintain in memory a set of one or more policies that each include a set of rules, such as a policy for each application or each lower-trust database 14.

Some embodiments may include classifying values to be written as higher-security values or lower-security values, as indicated by block 208. In some cases, this operation may include selecting one or more rules from one or more data policies, for example, based on an application writing data, a lower-trust database receiving the data or intended to receive the data, or other criteria. Some embodiments may include applying one or more of the above-described rules to each value in the write request to classify that value as higher-security or lower-security.

In some embodiments, the rules may each include one or more criteria by which data being written to a database is classified as lower-security data or higher-security data. In some cases, these rules may include rules that designate certain types of fields as lower-security or higher-security, such as text fields versus integer fields, or fields within a specified pattern. In some embodiments, the criteria may explicitly list higher-security fields and lower-security fields, and data may be classified as higher-security or lower-security in virtue of a write request attempting to place data into these fields. In some embodiments, the criteria may apply a regular expression to a field identifier, such as a field name to determine whether values within that field are higher-security or lower-security. In some embodiments, the rules may apply to the content of values being written, such that some values in a given field may be higher-security, while other values within that given field may be lower-security. For example, some criteria may include a regular expression that pattern matches against the content of values to determine whether those values are higher-security or lower-security, for instance, designating values that have a format consistent with a phone number, credit card number, or Social Security number, regardless of the field in which they belong, as higher security.

Next, some embodiments may store the lower-security values in the first remote database, as indicated by block 210. In some cases, the first remote database may be the database that the workload application is configured to interface with when initially installed or off the shelf. Thus, the workload application may be configured to interface with the first remote data face without retrofitting. In some cases, this may include writing values to the lower-trust database 14, for instance, consistent with the operations described above with reference to block 106 of FIG. 4.

Some embodiments may then store the higher-security values in a second remote database, as indicated by block 212. In some cases, the second remote database may be one of the above-described higher-security databases, such as those hosted within the secure distributed storage 16 of FIG. 1, implementing the data structures of FIGS. 3 and 5. Or in some cases, the secure second remote database may be another relational database or other type of database, for instance, one implementing additional security features relative to the first remote database or simply being isolated from the first remote database. In some cases, storing the higher-security values may include the operations described above with reference to FIGS. 2 and 4.

Next, some embodiments of the security driver may cause pointers to be stored, for example, storing pointers to the higher-security values in the first remote database, as indicated by block 214. For example, this may include modifying the application program interface request from the workload application to the database driver to replace higher-security values with node identifiers, segment identifiers, document identifiers, or other types of identifiers like those described above, before advancing the modified application program interface request to the database driver. In some cases, the database driver may then translate the application program interface request into commands and a data stream appropriate to cause the first remote database to store the pointers that identify where the corresponding values are stored in the second remote database.

Next, embodiments may later read data back. In some cases, this may include receiving a query and then receiving a query response with the pointers included in the query response, as indicated by block 216. In some embodiments, the query itself may be modified, for example, where a criterion in the query depends upon the content of higher-security values. For example, some embodiments may select all values with a modified query; then within the security driver or the translator described above, replace pointers with the corresponding values retrieved from the second remote database; and then apply criteria of the original query to those values to determine which values are responsive to the query issued by the workload application.

Some embodiments may interface with databases with the techniques described in U.S. Provisional Patent Application 62/527,330, titled REPLACING DISTINCT DATA IN A RELATIONAL DATABASE WITH A DISTINCT REFERENCE TO THAT DATA AND DISTINCT DE-REFERENCING OF DATABASE DATA, filed 30 Jun. 2017, the contents of which are hereby incorporated by reference.

In some cases, a single query from a workload application may spawn a cascade of iterative, subsequent queries, for example, where join operations are performed, and in which data is merged from the first and second remote databases to determine intermediate query responses. For example, a workload application may request mailing addresses of all users with a credit card number that begins with the specified sequence, and the mailing addresses and credit card numbers may be maintained in different tables, with the credit card numbers designated as higher-security values, and the mailing addresses designated as lower-security values. In some cases, these two different tables may be linked by a primary key in one table that is referenced as a foreign key in another table, and a query from a workload application may specify a join. Some embodiments may retrieve, for example, every record in the first database having pointers to values in the second database that reflect the credit card numbers, merge those values, determine which foreign keys in the table having mailing addresses are responsive to the query criteria, and then issue a subsequent query to the first remote database for those records. In some cases, to expedite these operations, an index may be maintained in which the pointers are associated with values that indicate whether the values are responsive to certain criteria (e.g., a threshold number of prefix characters or suffix characters), and embodiments may access this index to identify a subset of pointers for which values are retrieved from the secure datastore.

In some embodiments, these operations may be expedited by assigning pointers or other types of unique identifiers that are based on the content of the values to which the pointers point, for example, based on cryptographic hash values based solely on the content of the values to which the pointers point. As a result, different instances, of the same value, for example, in different rows or other tuples of a database may correspond to the same pointer. These pointers may be said to be unique identifiers in the sense that they uniquely identify content, in some cases without revealing the semantic information in that content, for instance, with the cryptographic hash identifier, while still having the same unique identifier replicated for multiple instances of that value appearing at multiple rows and a database, for example.

In some cases, values may be cryptographically hashed in conjunction with a tenant identifier (e.g., by concatenating the values with a delimiter before inputting to a hash function), such as a random string of a certain amount of entropy, like longer than 64 bytes, so that the same value for a given tenant consistently hashes to the same pointer, while the same value for different tenants hash to different pointers. Or in some cases, the unique identifiers may be unique between instances as well. Thus, the same value appearing in two different rows may have a different unique identifier in each instance, though some embodiments may operate more slowly as a result. In some embodiments, the security driver may detect duplicate instances of a pointer when reading back data, and cause a single request from the second remote database for a single value to populate each of these positions held by the different instances of the same pointer. Thus, fields with a relatively low cardinality may still facilitate relatively fast joints even when those fields are designated as relatively high security, and a relatively small number of values may populate a relatively large number of rows.

Similar operations may be performed when writing, for example, by grouping data classified as high security according to the value, for example, by sorting the data and then detecting groups of instances in which the values are the same, or storing the data in a hash table and detecting duplicates with hash collisions where the same values are written to the same index of the hash table. In these examples, some embodiments may then assign the same unique identifier to each instance in the group where this value is the same, and cause that unique identifier, which may serve as a pointer, to be stored in place of those higher-security values in the first remote database.

Upon replacing pointers with the values from the second remote database, as indicated in block 218, some embodiments may provide a modified query response to the querying application, as indicated by block 220. In some embodiments, the querying application may be a different workload application from that which wrote the data, and in some cases, may be on a different computing device. In some cases, data be read multiple times for a given write, or data may be written multiple times before a most recent version of the value is read.

Immutable Logging of Access Requests to
Distributed File Systems

It is becoming increasingly common to use third party off-site data storage platforms (e.g., Dropbox™ or Google Drive™) as well as on-site platforms (e.g., SharePoint™, Confluence™, OwnCloud™, etc.), but in these systems, auditing changes to these files becomes a difficult and often impractical task. In some cases, files are stored in large contiguous chunks that pose easy access for threat-actors, and in many cases, changes to the data do not yield a reliable record by which such changes may be detected. For instance, upon penetrating such a system, and making a change, a threat actor may also doctor log records or other records by which a change would otherwise be detectable. (Again, none of which is to suggest that such approaches are disclaimed.)

As noted above, traditional databases do not adequately protect against threat actors or internal resources (employees, information-technology staff, etc.) tampering the data. To the extent such systems have audit logs, those logs are often only as secure as the data for which access is logged, meaning that if the data is compromised, often so is the audit log. Some products offer "secure storage" through the use of password protected folders or data storage areas, however such products generally do not provide immutable and distributed properties and often-times their audit logs can be modified, particularly by employees with elevated-access credentials.

As noted above, by scattering (e.g., breaking up into segments and distributing) files into one or more blockchains, some embodiments are able to provide immutable and distributed properties to files. Further, since the files are distributed, in some embodiments, there is an application that reassembles the files. By making that reassembly process necessary, some embodiments form a control point by which the embodiment is able to produce a blockchain-backed audit trail of every access to the files (or database values or log entries) stored using this method.

As noted above, in some embodiments, data access is implemented in an application (e.g., a client-side application) that is capable of listening to events generated by an operating system's filesystem, reading in the changes that caused the notification and reporting them to an application referred to as "an arbiter" instance for scattering and storage in blockchains. In some embodiments, the scatter operation's resultant TXID is what is stored in place of the actual data on the client's filesystem, or similar approaches like those described above may be implemented with the security driver above.

When a read operation is requested by the filesystem, in some embodiments, the stored TXID (or other pointer) is sent to an arbiter instance for reassembly, loaded in place and then that file's default application handler is opened with that file (e.g., in some cases, a PDF file would generally be opened with Adobe Reader™). If the user does not desire to have a filesystem reader placed on an entire filesystem or subset of a filesystem (a directory), in some embodiments, a user could scatter a file by accessing a context menu and directing the file to be placed in ScatterFS.

Finally, in some embodiments, an application program interface (API) may be exposed so that any third party application can pass a file-handle, buffer or other datastream for scattering and storage.

Thus, some embodiments may distribute data among multiple computing devices, in some cases in a peer-to-peer network hosting an immutable distributed data structure, like a blockchain, and those embodiments may log and store access records in another (or the same) blockchain, thereby monitoring a necessary control point to access the data and creating an immutable record of such access attempts. It should be appreciated that the present techniques are not limited to blockchain-based distributed databases, and similar techniques are contemplated for other distributed file systems, e.g., Network File System, Self-certifying File System, Server Message Block, MapR FS, Amazon S3, and Starfish distributed file systems.

Figure 9:
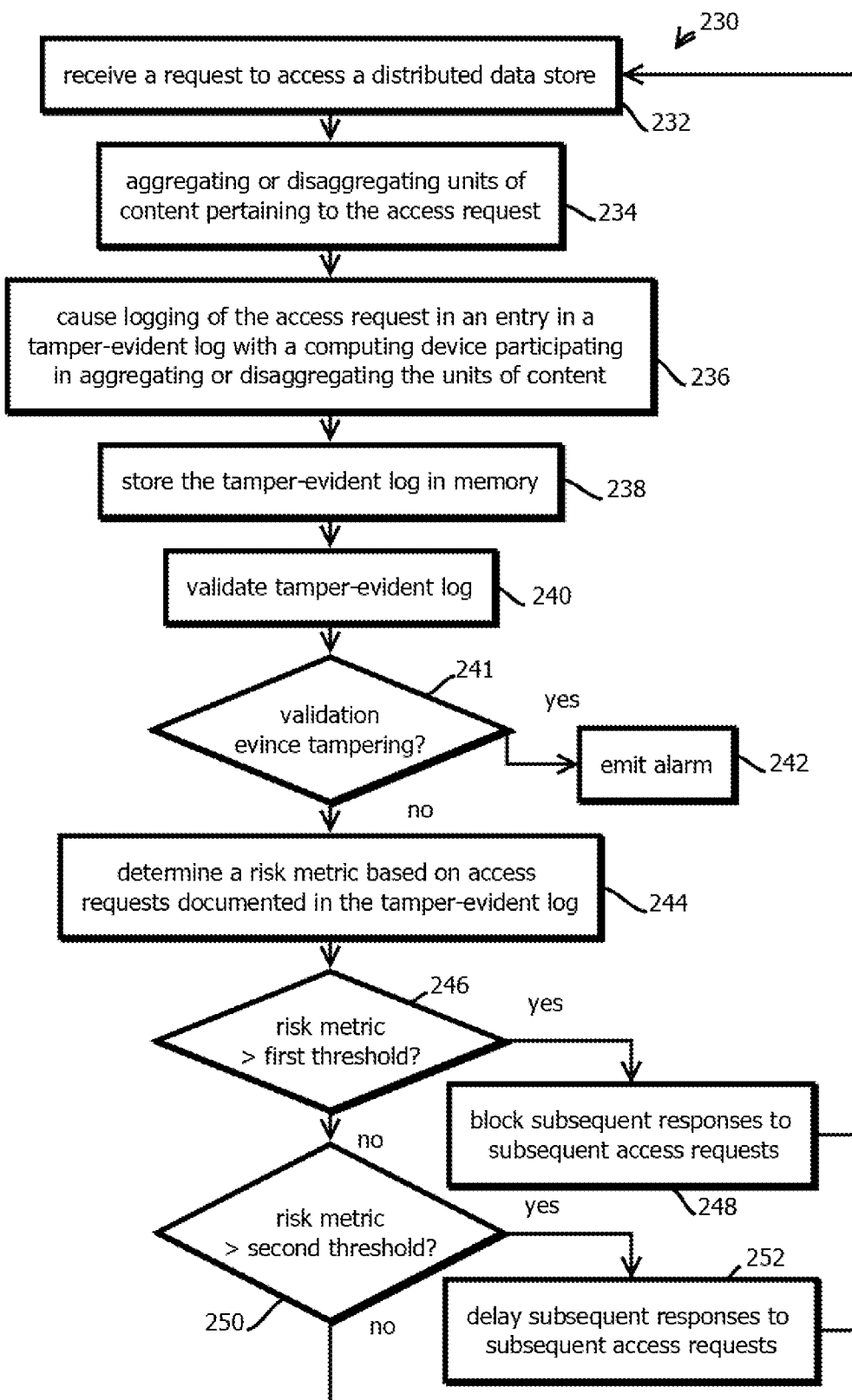
FIG. 9 is a flow chart that shows an example of a process by which access requests to scattered data may be logged to a tamper-evident, immutable data repository in accordance with some embodiments.

In some embodiments, logging and log analysis may be implemented with a process 230 shown in FIG. 9. In some embodiments, the process 230 may be executed at least in part by a system implementing one or more of the above-described techniques. In some embodiments, logging may be implemented on a computing device that serves as a chokepoint in the aggregation or disaggregation of information being stored into or read from a distributed data store like that described above or other types of distributed data stores. In some embodiments, the information may be distributed in such a way that each unit of content requires information from different computing devices to be accessed (e.g., in virtue of segmenting or separation of encryption keys from cyphertexts), and that information from different computing devices may be aggregated by a computing device that causes logging in a tamper-evident log. Similarly, write operations may be logged by a computing device that causes the information to be broken up and distributed among the different computing devices (e.g. with segmenting or separation of cyphertexts from encryption keys, or combinations thereof). Thus, in some cases, logging occurs during each access operation in virtue of logging being effectuated by a computing device necessary to read or write information that is otherwise inaccessible unless the information passes through that computing device that causes logging. In some embodiments, the information may be logged in a tamper-evident, immutable log like that described above, in some cases in the same data structures that store the information being accessed, such as workload content like database entries and various types of documents in a file system. In some cases, logging may be effectuated, for example, caused by the above-described translator 20 of FIG. 1, but embodiments are not limited to that implementation, which is not to suggest that any other description is limiting.

In some embodiments, the process 230 includes receiving a request to access a distributed data store, as indicated by block 230. In some embodiments, the request may be a read request or write request. In some embodiments, the right request is accompanied with a unit of content, such as a value being displaced with a pointer in the lower-trust database 14 in accordance with the above-described techniques, or a document being replaced by a pointer in a lower-trust file system in accordance with the above techniques, which is not to suggest that documents cannot be stored in a database as values in that database or the any other description herein is limiting. Similarly, and some cases, a read request may be accompanied with a pointer stored in a lower-trust data store in place of the unit of content and read in accordance with the above techniques. In some cases, the unit of content to be accessed is referenced with a pointer to a segment that serves in a first segment in a content graft like that described above, such as a linked list of segments where different segments of the unit of content are distributed among different tamper-evident directed acyclic graphs.

In some embodiments, the process 230 may include aggregating or disaggregating units of content pertaining to the access request, as indicated by block 234. In some embodiments, this may include the segmentation operations described above with reference to block 112 or the joining of segments described above with reference to block 164. In FIGS. 4 and 4, respectively. Alternatively, or additionally, this may include encryption and separation for storage of cyphertexts from encryption keys or bringing separately stored encryption keys and cyphertexts together to effectual decryption.

Before or after aggregating or disaggregating (which is not to suggest that any other step herein is limited to the sequence described in the present example) some embodiments may cause logging of the access request in an entry in a tamper-evident log, and logging may be caused with a computing device participating in aggregating or disaggregating the units of content, as indicated by block 236. In some embodiments, logging may be caused by a computing device necessary to make the units of content accessible through the aggregating or disaggregating. In some embodiments, logging may be caused by the above-described translator 20, which is not to suggest that the translator 20 is required in all embodiments consistent with all of the present techniques, or that any other description herein is limiting.

In some cases, causing logging includes selecting one or more of the above-described directed acyclic graphs, like those discussed with reference to FIG. 5 and stored in the storage compute nodes 26 of FIG. 1. In some cases, causing logging includes sending an instruction to one or more of those directed acyclic graphs (e.g., to a service monitoring a network socket and managing the graph responsive to such instructions) to store a record describing a logged event in the directed acyclic graphs, for example, storing the record as a document in accordance with the techniques described above with reference to FIGS. 2 and 3, and in some cases fragmenting the record into multiple segments in accordance with the techniques described above with reference to FIGS. 4 and 5. Or in some cases, the record may be stored outside of the tamper-evident log, and a cryptographic hash of the record and a timestamp of the record may be stored as node content of one of the above-described tamper-evident directed acyclic graphs having cryptographic hash pointers as edges. In some embodiments, in virtue of these graphs, modifications to records describing log entries may be computationally infeasible to conceal, as the chain sequence of cryptographic hash values in the directed acyclic graphs based upon those records may create an insurmountable computational challenge to calculate hash collisions along the entire sequence of a path through the directed acyclic graph that collides with the values produced by the original unaltered record. (It should be noted that attributes of nodes may be stored in edges or vice versa.)

In some embodiments, the process 230 includes logging entries that describe a variety of different aspects of the access request. In some embodiments, the entry is documented with a record that includes an identifier of a user account making the access request, an identifier of an application, such as a workload application through which the access request was submitted, a content of the access request, such as a command including content to be written or identifying units of content to be read. Such records may further include a timestamp, such as a date or date and time indicating when the access request was received. The records in some cases may include a geolocation of a computing device submitting the request. In some embodiments, such records documenting entries in the tamper-evident log may further include identifiers of computing devices through which the access requests were submitted to the above-describe system, such as MAC addresses, Internet Protocol addresses, browser fingerprints, hardware fingerprints, or the like.

Some embodiments may store the tamper-evident log in memory, as indicated by block 238, which in some cases may include adding a new entry or modifying an entry in a tamper-evident log already stored in memory, which may be replicated in multiple instances in accordance with the techniques described above. This may include forming part of a block to be added at a later time to such a log, e.g., a blockchain.

Some embodiments of the process 230 may include validating the tamper-evident log, as indicated by 240. Validation may include determining whether the tamper-evident log indicates that logged entries have been modified after being logged. In some embodiments, this operation may include accessing a current log version of an entry and then calculating a cryptographic hash value based on that current log entry. Some embodiments may then compare that current cryptographic hash value to one or more other cryptographic hash values in the tamper-evident log, for example, some embodiments may compare that cryptographic hash value to a cryptographic hash value stored in an adjacent node in one of the above-described directed acyclic graphs to determine whether the cryptographic hash values match or, if they do not match, indicate that the record was modified. In some embodiments, a sequence of cryptographic hash values based upon one another may be calculated to determine which match and identify a path through a directed acyclic graph to a node where the cause of a discrepancy resides. In some embodiments, validation may occur upon each write operation, periodically, upon each read operation, or according to some other schedule or event.

Detectability of tampering may deter threat actors from modifying log entries or maliciously accessing data in virtue of the difficulty of modifying log entries in a concealable manner. Further, some embodiments may fragment log entries in accordance with some of the above-describe techniques, further making modifications difficult, as a heterogeneous set of different computing devices on different networks may need to be compromised to modify each segment even if a threat actor somehow was able to compromise the mechanisms by which tampering is indicated.

In some embodiments, the process 230 includes determining whether the validation operation evinces tampering, as indicated by block 241, for example indicating a mismatch between cryptographic hash values within a directed acyclic graph. Upon detecting tampering, some embodiments may emit an alarm, as indicated by 242. In some embodiments, the alarm may be emitted by sending an email, text message, or chat message. Some embodiments may further proceed to take certain operations to locked down portions of a system, for example, disabling credentials, reducing levels of access associated with credentials, adjusting some of the below-described thresholds to decrease an amount of data that may be accessed before subsequent access is slowed or blocked, or limiting access to lower-security data.

In some embodiments, upon determining that there is no evidence of tampering, or after emitting the alarm, some embodiments may proceed to determine a risk metric based on access requests documented in the tamper-evident log, as indicated by block 244. Risk metrics may take a variety of different forms, and in some cases risk metrics may be calculated for a variety of different entities. For example, different risk metrics may be calculated for different users, workload applications, computing devices, or combinations thereof. In some embodiments, the risk metric may be an amount of access requests received within a trailing duration of time, a total amount of access requests, or combination thereof. In some embodiments, the risk metric is based on deviation from previous patterns of behavior. For example, some embodiments may train a machine learning algorithm, such as a hidden Markov model, recurrent neural network, or the like, based on historical log events, to predict the likelihood of various types of access requests (or sequences of such requests), such as to particular units of content, types of unit of content, amounts of access requests, frequencies of access requests, or the like, for a given user, workload application, computing device, portion of a network, or combination thereof. Some embodiments may then compare these predictions based on a current trailing sequence of logged events with later received access requests and determine a risk metric based on the likelihood, for example, a probability of the given access requests given previous behavior. Failures of such predictive models may be evidence of anomalous, malicious behavior. Some embodiments may use this probability is a risk metric or determine an aggregate of these probabilities over a plurality of risk metrics, such as a measure of central tendency, like a mean, median, or mode of these probabilities over a trailing duration or number of access requests.

In another example, the risk metric may be based on the content of units of content being written. For example, some embodiments may calculate an entropy of units of content being written and compare that entropy to measures of entropy associated with other units of content historically written to the distributed data store, for example, previous database entries or documents. In some embodiments, this difference may be indicative of a ransomware attack in which relatively high entropy encrypted versions of data are being written as a current version. (Though it should be noted that some implementations may use an immutable data store in which earlier values remain in place and systems may be rolled back to earlier values in the event of such an attack in some embodiments by replacing pointers in lower-trust storage to current versions to be pointers to last-known good versions.)

Next, some embodiments may determine whether the risk metric exceeds or otherwise satisfies a first threshold, as indicated by block 246. Comparisons to thresholds described herein should not be limited to a comparison that depends upon the sign of the values applied, which is not to suggest that any other description is limiting. The term "satisfies" is used generally to refer to scenarios in which one threshold may be satisfied by exceeding (or being equal to in some cases) that threshold and an equivalent threshold in which values are was multiplied by −1 may be satisfied by being less than (or being equal to in some cases) that threshold, or vice versa. Upon determining that the risk metric satisfies the first threshold, some embodiments may block subsequent responses to subsequent access requests, as indicated by block 248. In some cases, blocking may be implemented by the computing device participating in aggregating or disaggregating the units of content discussed above with reference to block 236.

If access is not blocked, some embodiments may compare the risk metric to a second threshold, as indicated by block 250. In some embodiments, the second threshold may be less stringent than the first threshold, for example, corresponding to lower levels of risk. In some embodiments, upon determining that the risk metric satisfies the second threshold, some embodiments may delay subsequent responses to subsequent access requests, as indicated by block 252. In some embodiments, this may include starting a countdown timer and determining when a designated duration of time has elapsed before aggregating or returning units of content or disaggregating and writing units of content, in some cases for each unit of content in an access request pertaining to a plurality of units of content. Thus, some embodiments may implement a soft blocking mechanism by which functionality is provided at a certain level, while delaying in providing time for a human response in the event that a scripted attack is occurring. In some embodiments, upon satisfying the first or second thresholds in block 246 and 250, some embodiments may emit an alarm using techniques like those described above to facilitate investigation and, if needed human intervention. Embodiments may then return to wait for the next request to access the distributed data store in block 232.

Storing Differentials of Files in a Distributed Blockchain

Often, blockchain-based databases are not well suited for storage of large, frequently modified collections of data, like files or other binary blobs of data. Because of the immutable nature of blockchains, previous entries in a chain (which may represent files or values in a database) generally cannot be deleted or overwritten. Thus, each version of a file can add to the size of a blockchain ledger, and where the file is stored in the ledger and modified frequently, the size of a blockchain ledger can become too expansive to be efficiently accessed.

To combat the above-noted negative consequences of the immutable property of blockchains, some embodiments store only changes (differentials) of files over time, rather than entire copies of a file at each change.

Some embodiments may receive a write request for a modified file (or other blob of data) and determine whether the data has changed from a previous version. In some embodiments, upon reading the data initially, hash digest (e.g., a MD5 hash) of the data may be calculated and held in memory. Upon a write, a new hash may be calculated based on the data to be re-written to memory, and that hash may be compared to the earlier hash to determine whether the file has changed.

Upon detecting a change, some embodiments may determine a delta between an earlier version (e.g., a most recent version) and a current version. In some cases, the database may store a delta of an earlier change, and some embodiments may iterate through a sequence of deltas to re-create a previous version of a document or other file. Upon obtaining the most recent version, some embodiments may determine a delta with the new version, e.g., by determining a set of longest common subsequences between the versions and store the resultant diff, e.g., in unified format.

In most cases, it is expected that the resultant diff will be much smaller than the new version of the file (or other blob). As such, storing the diff in the blockchain is expected to be less computationally expensive than storing the entire new version. Further, because the file itself is ultimately stored in the blockchain (rather than just a hash digest), the system is expected to be more robust to various attacks, such as a hash collision attack. In such attacks, malicious content is selected and designed to produce the same hash as stored data, and that malicious data is substituted in the database for the authentic data. With traditional systems, the blockchain will yield a hash value that validates the malicious content as authentic. In contrast, some embodiments circumvent this attack vector by storing the data committed to the database in the blockchain. Further, in contrast to systems that merely store a hash digest of a document in the chain, some embodiments offer increased control of the file (or other BLOB). In these older systems that only store a hash digest, the system does not have no control of the file. Such systems could delete the file from the external datastore, and all that would be left with in a chain is the hash digest. That is, such systems can authenticate a file, but they cannot reproduce the file. That said, not all embodiments afford these benefits, as various engineering and cost tradeoffs are envisioned, and multiple independently useful inventions are described, which is not to suggest that any other description is limiting.

In some embodiments, the above techniques may be implemented with processes described below with reference to FIGS. 10 and 11 that operate upon a data structure described below with reference to FIG. 12.

Figure 10:
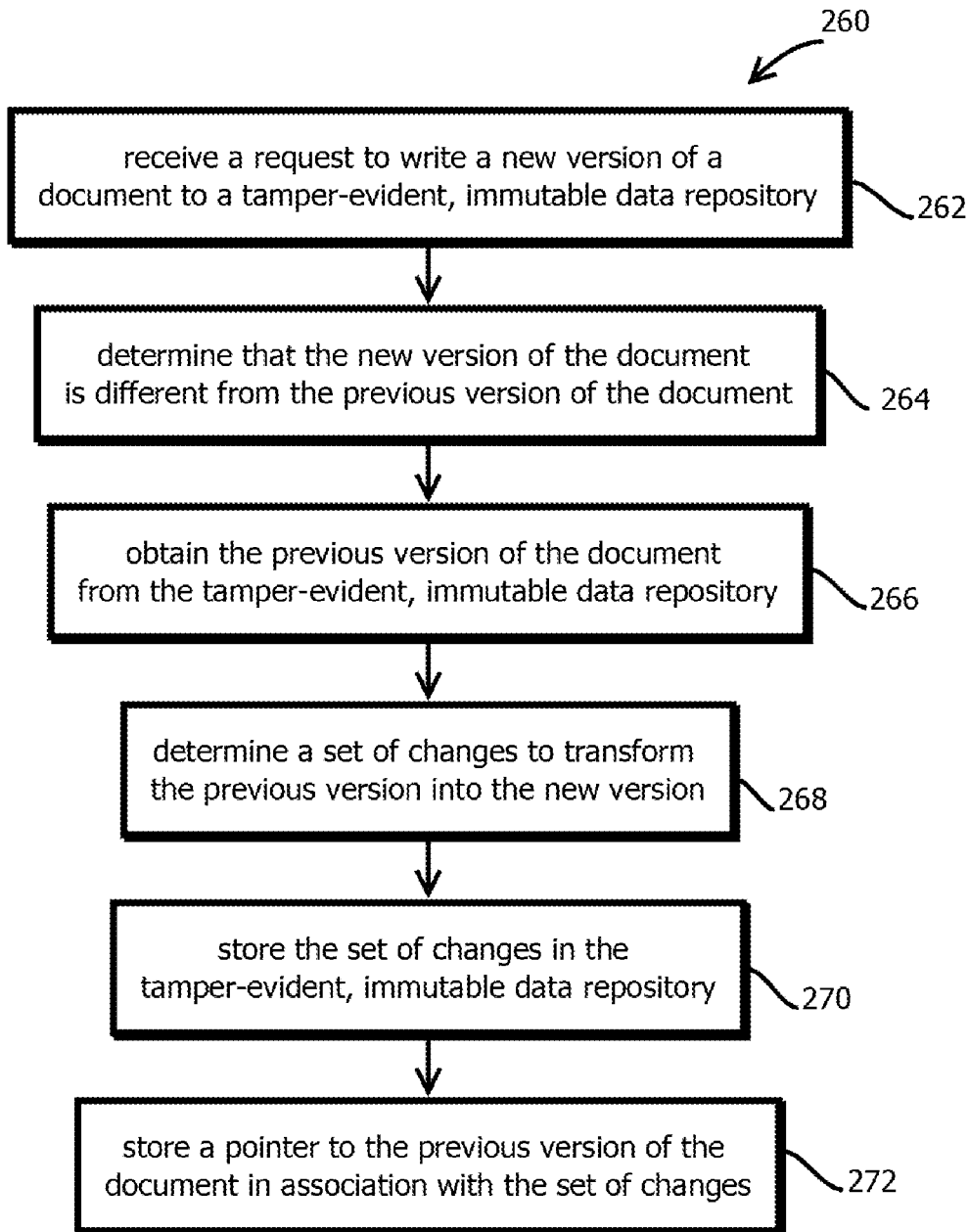
FIG. 10 is a flow chart that shows an example of a process by which data in tamper-evident, immutable data repositories may be compressed by storing differences between versions of documents or other units of content in accordance with some embodiments.

As shown in FIG. 10, some embodiments may include a process 260 that writes a difference between a new version of a document and previously stored versions of a document to a tamper-evident, immutable data repository, such as a block chain or one of the above-described examples of directed acyclic graphs having cryptographic hash pointers. In some embodiments, the process 260 may be executed by the above-described security driver 30 in conjunction with the above-described translators 20 or by other components, for example, based on a gateway on a network residing between network storage or a database and a client computing device. In some embodiments, the process 260 may be executed by a client-side application that wraps or otherwise interfaces between a client-side workload application and a database driver or a filesystem driver, for example, a file system driver executing in the same operating system as the workload application and the process performing the operations of FIGS. 10 and 11.

In some embodiments, a filesystem of a local computing device includes a hierarchy of directories having files arranged therein, for example, binary large objects with various examples of metadata, like file names, creation dates, modification dates, authors, permissions to access, and the like. In some embodiments, these directories may be local directories stored on the computing device executing a workload application or on a remote network attached storage device. In some embodiments, some of the files in the directories may be replaced with text files having computer readable pointers to, for example, documents stored with techniques like those described above, and some embodiments may intercept (e.g., receive directly, pass through, observe upon filtering, etc.) read or write access requests by a filesystem explorer application to a filesystem driver and detect these pointers disposed in the directories in place of the documents. Some embodiments may then, in response, effectuate the corresponding operations on documents stored in a tamper-evident, immutable data repository, like those described above or other types of remote storage. In some cases, this may include creating new versions, updating pointers stored in the directory, and various other operations. Further, these techniques may similarly be applied to database read and write operations, for example, storing differences between previously stored values and databases that are relatively large and new versions of those values in databases.

In some embodiments, the process 260 includes receiving a request to write a new version of a document to a tamper-evident, immutable data repository, as indicated by block 262. In some embodiments, this operation may be performed by the above-described security driver or other client-site arbiters, for example, with the process of FIG. 8. In some embodiments, the request may include a designation of the document as higher security and a pointer to a previous version of the document stored in the client-side computer accessible directory or database. For example, the user may have previously read the previous version into local memory of the client computing device workload application, transformed the previous version, and then requested to store the new version, causing the request to be received in the operation of block 162.

Next, some embodiments may determine that the new version of the document is different from the previous version of the document, as indicated by block 264. In some embodiments, this may be performed by retrieving the previous versions from the tamper-evident, immutable data repository, for example, with a read process like that described below with reference to FIG. 11. Or some embodiments may expedite this determination by storing outside of the tamper-evident, immutable data repository, an index that associates pointers to documents with hash digests of those documents. In some embodiments, the hash digest is a cryptographic hash value based upon the content of the document, or a non-cryptographic hash value based upon the content of the document. It should be noted, that not all hash functions are cryptographic hash functions having the attributes described above is being exhibited by such functions. In some cases, non-cryptographic hash functions may be faster to compute than cryptographic hash functions, or embodiments may use cryptographic hash functions to enhance security. Accordingly, some embodiments may make the determination of block 264 without retrieving the previous version of the document from the tamper-evident, immutable data repository, for example, by calculating a new hash digest based on the new version and comparing that new hash digest to a previously calculated hash digest of the previous version stored outside the tamper-evident, immutable data repository, for example, in association with a pointer to that previous version in an index. Upon determining that the hash values match, some embodiments, may terminate the process 260, as the previous version may be determined to be the same as the new version.

Alternatively, upon determining that the new version of the document is different from the previous version of the document, some embodiments may proceed to obtain the previous version of the document from the tamper-evident, immutable data repository, as indicated by block 266. In some embodiments, this may include retrieving the previous version with read operations, for example, like those described with reference to FIG. 11, which in some cases may engage the processes described above with reference to FIGS. 2, 5, 6, and 7.

Next, some embodiments may determine a set of changes required to transform the previous version into the new version of the document, as indicated by block 268. In some embodiments, this operation may be relatively computationally expensive and include determining a longest matching substring between the two documents in the course of determining a minimum set of changes required to transform the previous version into the new version. In some cases, these changes may be limited to deletions, appending text (e.g., prepending or postpending), and changing values of existing text. In some embodiments, the determination may be made with a diff operation in which the previous version and the new version are input into a diff function, which may return the set of changes. In some embodiments, the changes may be implemented with the Hunt-McIlroy algorithm, as described in a paper titled AN ALGORITHM FOR DIFFERENTIAL FILE COMPARISON by Hunt and McIlroy, Bell Laboratories Computing science technical report, 1976, the contents of which are hereby incorporated by reference.

In some cases, to expedite comparisons, each line of the two documents may be transformed into a hash digest of that line that is relatively fast to operate upon, for example, converting each line with a hash function into a 64 bit or shorter, such as a 32 bit or shorter or 16 bit or shorter hash digest of the content of that respective line. Thus, each of the two documents may be transformed into an ordered list of hash digests, and some embodiments may then compare the two ordered list of hash digest to identify sequences of text that are likely to have not changed between the two versions. For example, some embodiments may identify a number of lines at a beginning and an end of the list where there are no changes. Upon detecting a line at which changes begin, some embodiments may then search forward in one list until a match is found, thereby potentially detecting insertions.

Some embodiments may then store the set of changes in the tamper-evident, immutable data repository, as indicated by block 270. In some cases, this may include performing the operations of FIG. 2 on the data structure of FIG. 3 to store a document, or segmenting the document in accordance with the techniques described above with reference to FIGS. 5 and 6 and storing the document in that manner.

Some embodiments may further include storing a pointer to the previous version of the document in association with the set of changes, as indicated by block 272. In some embodiments, the pointer to the previous version of the document may be stored in the tamper-evident immutable data repository as metadata to the set of changes, thereby forming a node and edge of a version graph, like that described below with reference to FIG. 12. In some embodiments, documents may be encoded as a linked list of sets of changes with pointers between the sets of changes tracing back to an initial version of the document, for example, in the above-described data structures, and documents may be retrieved by retrieving each of the sets of changes and then iteratively applying them, as described in greater detail below with reference to FIG. 11.

In some embodiments, an updated pointer to the newly stored set of changes from block 270 may be stored in the file system (or database cell) in place of the previous pointer submitted with the request to write the new version in block 262. Thus, a subsequent read request for that file may identify that new pointer and retrieve the new set of changes and then trace back to the initial version through the previous version, as described in greater detail below with reference to FIG. 11. Similar operations, like those described above, may be performed on a value stored in a database, replacing a pointer in a database cell to reference the new version.

In some embodiments, version graphs may branch. For example a user may request to write to a previous version of a document or to write to new versions to a previous version of the document, thereby forming parallel change of a version graph that share a subset of their version history with one another but then branch a part later in the version graph. This is expected to further compress data and increase the amount of documents that can be stored in a given amount of storage in a tamper-evident, immutable data repository.

Figure 11:
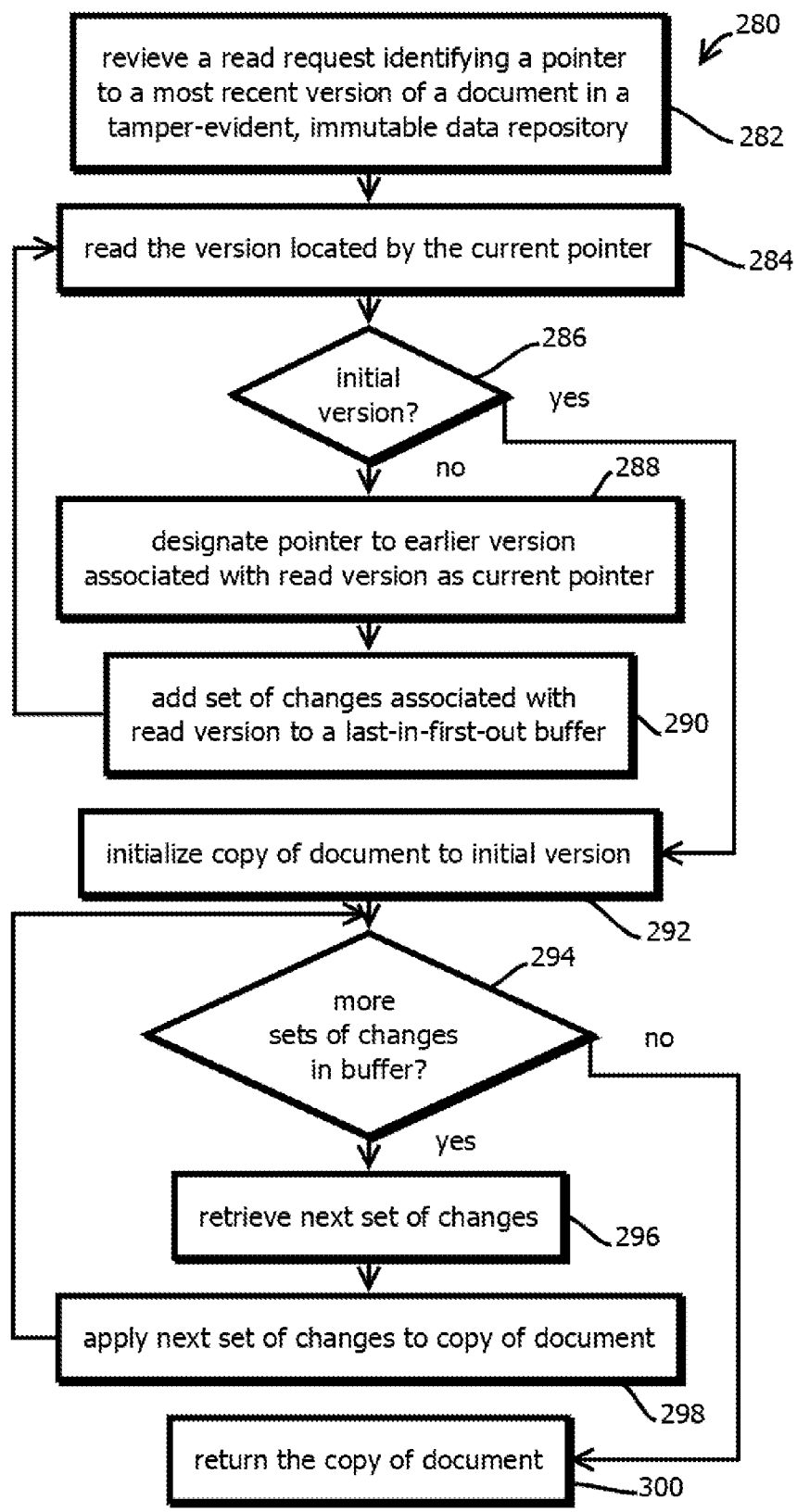
FIG. 11 is a flow chart that shows an example of a process by which version graphs storing sequences of changes between versions of documents may be traversed to read current versions of documents in accordance with some embodiments.

FIG. 11 shows an example of a process 280 to read a document, or other unit of content, from a tamper-evident, immutable data repository storing version graphs of documents as sequences of differences between versions of documents tracing back to initial version. In some embodiments, the process 280 may be performed in the course of obtaining the previous version of the document in block 266 of FIG. 10, or upon receiving a request by workload application to access a stored document, for example, upon intercepting a request to a file system driver to access a document replaced with a pointer to a document stored in one of the above-describe data structures.

In some embodiments, the process 280 includes receiving a read request identifying a pointer to a most recent version of a document in a tamper-evident, immutable data repository, as indicated by block 282. In some cases, the pointer may be to a previous version, for example, upon a user requesting to roll back to a previous version. In some embodiments, the read request may be intercepted with the techniques described above by which write requests are intercepted.

Next, some embodiments may read the version located by the current pointer, as indicated by block 284, for example by performing the read operations described above by which documents are retrieved in the data structures of FIG. 3 or FIG. 5, or other database entries are received.

Some embodiments may then determine whether the red version is the initial version of the document or other unit of content, as indicated by block 286. In some cases, an initial versions may be explicitly flagged as such when stored, or initial versions may be implicitly designated as such in virtue of lacking a pointer to an earlier version. As noted above, pointers may be stored in association with subsequent versions, as discussed in reference to block 272.

Upon determining that the version retrieved was not the initial version, some embodiments may designate a pointer associated with the retrieved version, for example, stored as metadata of the retrieved version in the tamper-evident, immutable data repository, as the current pointer, as indicated by block 288.

Next, some embodiments may add a set of changes associated with the retrieved version, for example, stored at a location or sequence of locations in the tamper-evident, immutable data repository identified by the current pointer, to a last in first out buffer, as indicated by block 290. In some cases, the buffer may be characterized as a stack. Some embodiments may then return to block 284 to read the next earlier version located by the updated current pointer in block 284.

Upon encountering an initial version in block 286, some embodiments may proceed to block 292 and initialize a copy of the document to the initial version, for example, setting a working copy of the document to be equal to the initial version that was retrieved. Some embodiments may then determine whether there are more changes in the buffer to process, indicated as indicated by block 294. In some cases, some embodiments may determine whether the buffer is empty or there are more values, that is sets of changes, stacked in the buffer.

Some embodiments may, upon determining that there are more changes, retrieve a next set of changes from the buffer, as indicated by block 296, in some cases this may include deleting that next set of changes from the buffer to update the buffer to reflect the next set of changes are to be applied. In some cases, this may be characterized as popping a set of changes from a stack.

Next, some embodiments may apply the next set of changes to the current working copy of the document, as indicated by block 298. In some cases, this may include accessing a set of deletion operations, change operations, and append operations. In some embodiments, these changes may each be associated with a line number to which the change is to be applied, a sequence with which the change is to be applied, and a content in some cases to be applied, for example indicating replacement text or appended text (or bits).

Some embodiments may then return to block 294 to determine whether there more changes in the buffer. Upon reaching the end of the buffer, for example, the bottom of the stack, some embodiments may proceed to block 300 and return the copy of the document. In some cases, the copy of the document may be returned to a workload application configured to access the document, for example, based on a file system extension mapped in the operating system to a particular workload application. In some embodiments, the read operation may be transparent to a user, and may appear to the user as if the user is operating on a locally stored or network stored copy of a document, with the user experience being identical or substantially identical to that experienced by a user who is not interfacing with the above-described secure distributed storage 16, thereby providing higher security without imposing on users or in some cases requiring retrofits of workload applications that can be expensive. (That said, embodiments are not limited to systems affording these benefits, which is not to suggest that other descriptions are limiting.)

Figure 12:
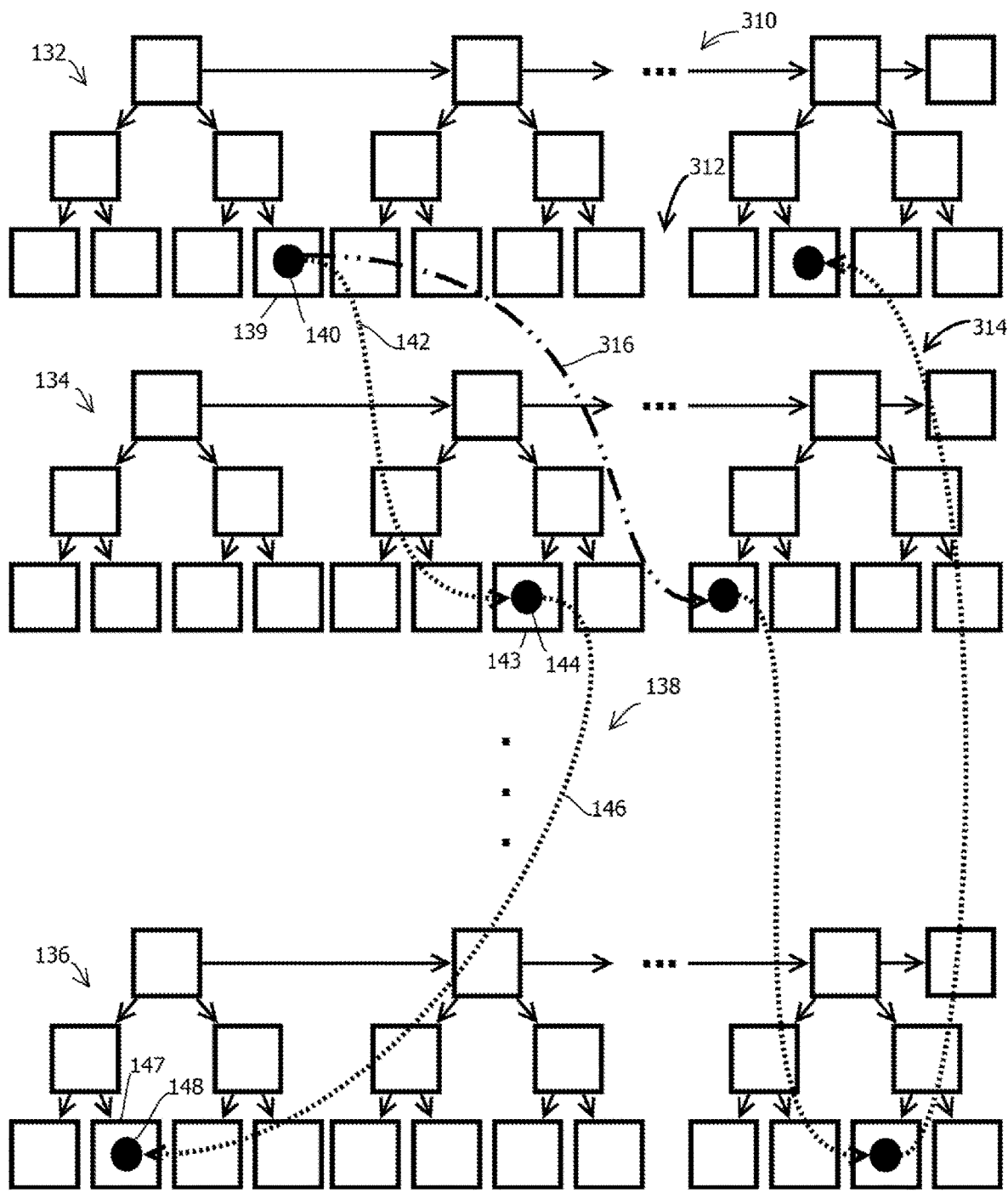
FIG. 12 is a data model block diagram that shows an example of a data structure by which a version graph may be stored as a sequence of content graphs on a collection of verification graphs or other tamper-evident, immutable data repositories in accordance with some embodiments.

In some embodiments, the processes of FIGS. 10 and 11 may produce a data structure 310 like that shown in FIG. 12. In some embodiments, the data structure 310 may include the verification graphs described above with reference the data structure 130 of FIG. 5, along with the content graph 138 described above with reference to FIG. 5. In this example, the content graph 138 may be a most recent stored version of a document, which may be a set of changes from an earlier version. In some embodiments, the earlier version may, for example, be an initial version of a document, stored in another content graph 314 shown in FIG. 12. Content graph 314 may, like content graph 138 include a sequence of content nodes, such as segments, connected by pointers between the segments, by which an initial version of a document or a set of changes associated with a given version may be assembled during a read operation. In some embodiments, thus, the data structure 310 may store a third overlaid graph, which may be a version graph 312. In this example, version graph 312 includes an edge 316, which may be a pointer from the most current version stored in content graph 238 to an earlier, initial version stored in content graph 314. In some embodiments, the pointer to may be to an initial segment of the content graph storing the earlier version.

Communicating Fine-Grained Application Database Access to a Third-Party Agent

The techniques above may be augmented with approaches described below related to communicating fine-grained application database access to a third-party agent, an approach which may be implemented with the systems and data models above. As noted previously, in many cases, traditional databases are not sufficiently secure. For example, many enterprise applications access sensitive data in databases. In many cases, different (such as many or all) instances of an application (or sessions with an application) may access a database using the same database user (from the perspective of a database management system), and as a result, in some cases, no components between the application and the database are aware of the application-level user accessing data. For instance, a web application may present to the database as a single user despite being invoked by hundreds or thousands of different users in different sessions to access different subsets of the database.

Some databases provide some level of permissioning, but oftentimes these permissions are broad and difficult to manage, which leads to the opportunity for attack and misuse. Further, some databases implement transactional SQL (T-SQL) or a similar variant. In many implementations, poor design practices and legacy code can present vulnerabilities such as SQL injection attacks, which trick the database into returning potentially sensitive and unintended data. The lack of an adequate permissions system for such databases can, in some implementations, afford threat actors the opportunity to obtain sensitive or proprietary data from databases. Successful attacks are oftentimes undetected for some time due to the lack of robust permissions systems and even where a breach is detected, the lack of per-user auditability makes it difficult to determine which user account or system was compromised and how it was compromised. Additionally, there is often very little auditability and permissioning for individual entries or fields within those entries within a table or other types of individual table values. Moreover, many database management systems rely on a driver that executes (in some cases exclusively) on the database client's machine (e.g., a web server acting as an intermediary between end user browsers and a backend database of a web application, like a website). None of this is to suggest that some embodiments may not also be afflicted with subsets of these problems or that any subject matter is disclaimed, as several inventions are described, and those inventions can be used independently without addressing every problem described herein.

To address such concerns, various approaches have been implemented to secure stored data. Examples include air-gapping the database or carefully managing permission to access the database. Many approaches, however, are difficult to administer (e.g., using baroque permission schemas), are slow (e.g., air-gapping), or break backward compatibility with expensive enterprise applications that expect a particular database driver interface, none of which is to suggest that any of these approaches are disclaimed in disclosed embodiments.

Moreover, personnel responsible for the governance of company (or customer) data often prefer finer grained approaches to managing database access than those that presently exist in many scenarios. Additionally, those finer grained approaches oftentimes are preferably compatible with one or more legacy applications, database drivers, or databases due to the cost of porting or purchasing new software or hardware, if that option even exists. Indeed, in many cases, source code of the application accessing the database is not available to the entity executing that code and seeking to enhance security. Accordingly, even where some of the aforementioned approaches can be implemented, they oftentimes fail to provide desired forms of monitoring and access controls. For example, the aforementioned approaches involve significant coordination between executives, application developers, and database developers, which can be expensive and error prone, again none of which is to suggest that any subject matter is disclaimed.

Some embodiments may mitigate these or other issues. Some embodiments may permit administrators, executives, or other personnel responsible for data access to record and govern data access by individual application users representative of physical human beings. Some embodiments provide configurations by which application-level users of applications accessing databases may be determined. In some cases, those applications, databases, and database drivers are unaltered relative to those in place prior to a retrofit designed to afford such benefits. In some cases, certain configurations may log and permission database access on a per-user level (e.g., an end user) for applications with modifications that are transparent to some or all existing components within a given deployment. In some embodiments, these techniques include processes by which a third-party agent is informed of which application-level user is accessing data within a database (and which data the user is accessing). Further, in some cases, governance and monitoring of data access via a third-party agent (such as a database driver sending a message to a server) may be implemented based on received information indicative of a given application-level user or by which a given application-level user may be determined (e.g., by the server), such as responsive to permissions associated with the given user.

Some disclosed embodiments permit implementation of fine-grained access controls or permissions and monitoring of data access. For example, embodiments may implement fine-grained access controls to permission data access at the application-level user and monitor data access at the application-level user within example databases disclosed herein. Examples of application-level users may include user accounts or other user (or session) identifiers associated with individual users and their user sessions that (in some example uses cases) may correspond to utilization of an application (or instance thereof) by the respective users. As noted above, an application may access data from example databases, and in at least some use cases it may be desirable to govern which data from a database the application (or instance thereof) may access based on which user is utilizing the application (or instance thereof). Accordingly, example embodiment may govern which data from a database an application (or instance thereof) may access based on a user account or other identifier associated with a session of a user with an application or application instance. In some embodiments, permissions may be specified with varying degrees of precision to control access to data within example databases and access monitoring may log instances of data access with a high-degree of precision.

In some example embodiments, permissions are specified for different users or groups of users, and those permissions may be specified in relation to data stored within a database. In various example databases, permissions may be specified with a high-degree of precision, such as down to column-by-column or row-by-row basis within a table, or other data structures by which data may be returned as, or based on, a table that may be constructed from data stored within those data structures, and other data structures. For example, example permissions may be specified by field (e.g., which may correspond to a row, or column, within a table), field value (e.g., like certain values within a columns or rows or given column or row field type, within a table), value type or format or other identifier, and the like (e.g., values satisfying a regex or Xpath query), or one or more thereof (e.g., such as for a particular cell within a table or a particular field or a particular value and the like) to the desired degree of granularity. In some additional examples, one or more of the above-described permissions, may correspond to a type of object, specific instance of an object, or one or more properties of an object within examples of object-oriented databases. Thus, more generally, example permissions may target, within example databases, within a given data structure utilized by a respective database, the different records, fields, data types, etc. by which data is stored within the given data structure and values, and even portions of values, of those records, fields, data types, etc. to govern (e.g., restrict or permit a given user, group of users, or type of user) access to that data. Access monitoring may indicate (e.g., with a similar degree of granularity) which data (e.g., records, files, values, fields, column, row, etc.) a user accesses within a database, such as by an application-level user identifier corresponding to the user. Thus, some example embodiments may provide the above and other benefits for governance and monitoring at an application-level user (e.g., at the level of users that utilize applications, such as on a per-user basis) without the need for significant development at the application, network, or database levels (which is not to suggest that example embodiments are not consistent with more expansive refactoring). Embodiments of disclosed access control permissions and monitoring techniques may be implemented by a third-party component inserted between an application and a database, such as a database driver (which in some cases may, as a third-party component, wrap an existing database driver). In some example embodiments, one or more of an application and a database (or existing database driver that is wrapped) may be agnostic to the insertion of the third-party component providing functionality like that disclosed herein. In some embodiments, a third-party component obtains application-level user information. In some examples, an application is modified to indicate application-level user information in messages, like database requests-such as SQL queries-directed from the application to a database, or otherwise provide application-level user information. In some cases, application-level user information is associated with the application, such as by application instance, which may be appended to or otherwise indicated in association with messages directed to the database. The third-party component may obtain the database requests generated by the application as described below and elsewhere herein, such as by registration within the request path to receive the requests, intercepting requests within the request path between the application and the database or application and database driver and the like.

FIG. 1 depicts an application 28 that may communicate with a driver of a database, like a database driver 32. For example, the application may communicate one or more requests to the database driver 32, such as via an application programming interface of the driver 32. Based on the request, the driver 32 may communicate with a database, such as database 14, to access data within the database. Examples of accessing data within the database may include the reading (e.g., retrieval) of data from or the writing of data to the database. For example, the database 14 may return data (e.g., in response to a request to read the data) or store data (e.g., received in response to a request to write the data). In turn, such as after receiving data or other response from the database 14, the driver 32 may provide returned data or other responses to the application 28. In various example embodiments, the driver 32, natively, is aware of (e.g., holds in memory values indicative of) one or more of (1) the query string to be sent to the database, (2) the OS-level process asking for the query, (3) expected parameters bound to the query, and (4) information concerning the connection to the database; but is not aware of at least application-level user information (e.g., information about the user using the application 28). In some cases, the information concerning the connection to the database may include information like a database user or host, but, as described above, many applications and systems utilize the same database user or host information, and even if different database user accounts were used, those types of accounts do not provide system administrators with fine-grained access controls and monitoring in many instances (e.g., like in various ones of the example use cases of the techniques disclosed herein).

In some embodiments, one or more fields or statements are added (e.g., appended) to, included in, or otherwise configured in an SQL query (or other query statement in various other query languages, like those tuned for NoSQL databases, like JSONPath) as an informational component. Such an informational component, referred to herein as a comment field, even when populated for a query, may be ignored within example deployment environments when executing the query prior to a retrofit (and the comment field may similarly be ignored by that same body of (e.g., legacy) code after a retrofit). For example, in some embodiments, a database may ignore (e.g., not process or act on) the comment field in a query or as an argument with instructions for accessing or storing data within the database, such as in communications received from a database driver to access or store the data. Similarly, in some embodiments, a database driver 32 may ignore (e.g., not process or act on) the comment field in a received query or as an argument in a request to access data within a database. Thus, for example, retrofit of an application to include a request modifier (e.g., to append and populate a comment field) a request need not break a legacy database access flow (e.g., prior to deployment of one or more third-party components for processing the comment field). In some example embodiments, a third-party component, like a security driver 30, may wrap (or include the functionality of) an existing database driver, and expose a similar command set, such as via an application programing interface consistent with that of the database driver, to an application 28, but may also include one or more additional API commands by which application level-user information may be conveyed to the security driver (e.g., within a comment field or otherwise in association with a request generated by an application). Moreover, in accordance with configuration of a comment field consistent with examples like those that outlined above, communications modified to include such a comment field and received by a database driver or database from an application 28 or third-party component, like a security driver 30, need not be stripped of such comment fields. Thus, for example, monitoring operations to support application-level user audits (e.g., to determine what data was accessed or stored by the user within one or more databases) may be performed based on communication logs formed by one or more components along the communication path of the application and the database, regardless of whether that component is application-level user access aware.

Figure 13A:
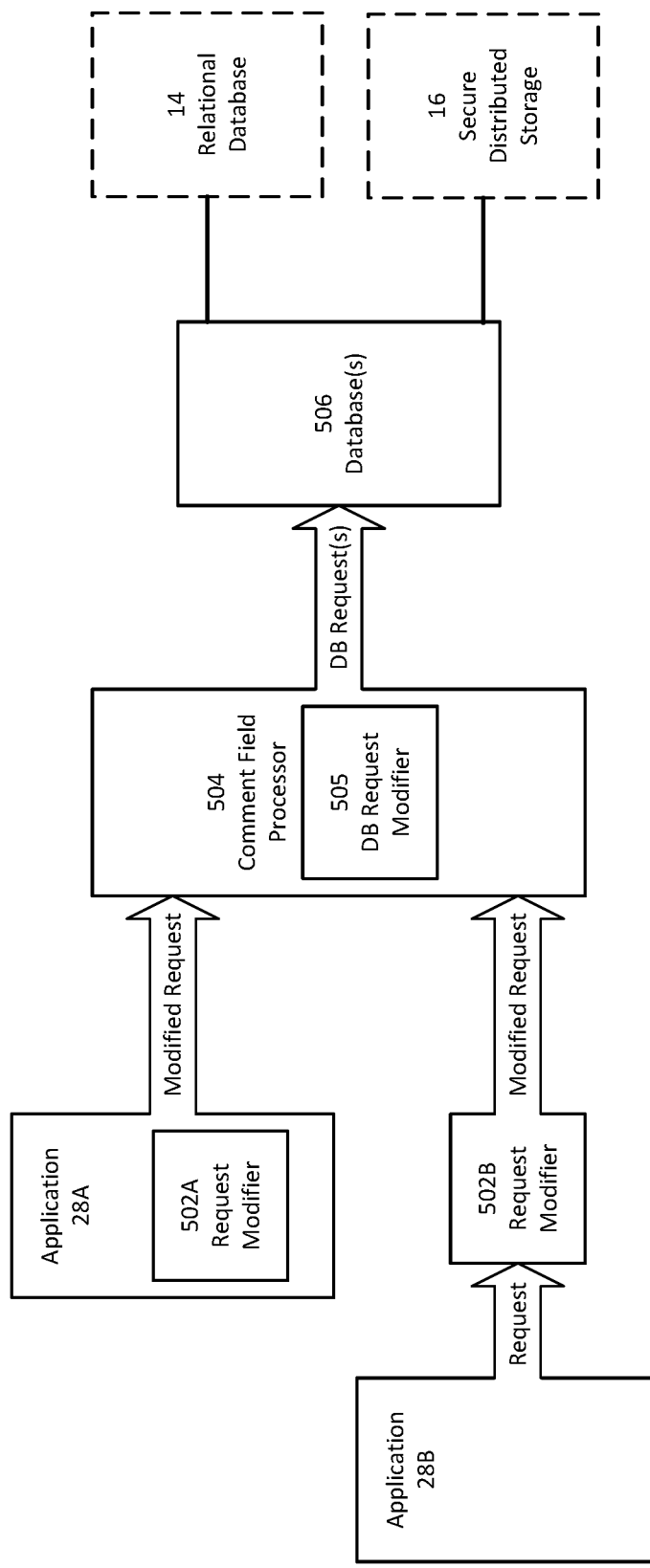
FIG. 13A and FIG. 13B depict examples of components consistent with disclosed configurations for communicating application-level user information in association with database requests generated by applications and implementing permissions and monitoring at the application-level user for databases in accordance with some embodiments.
Figure 13B:
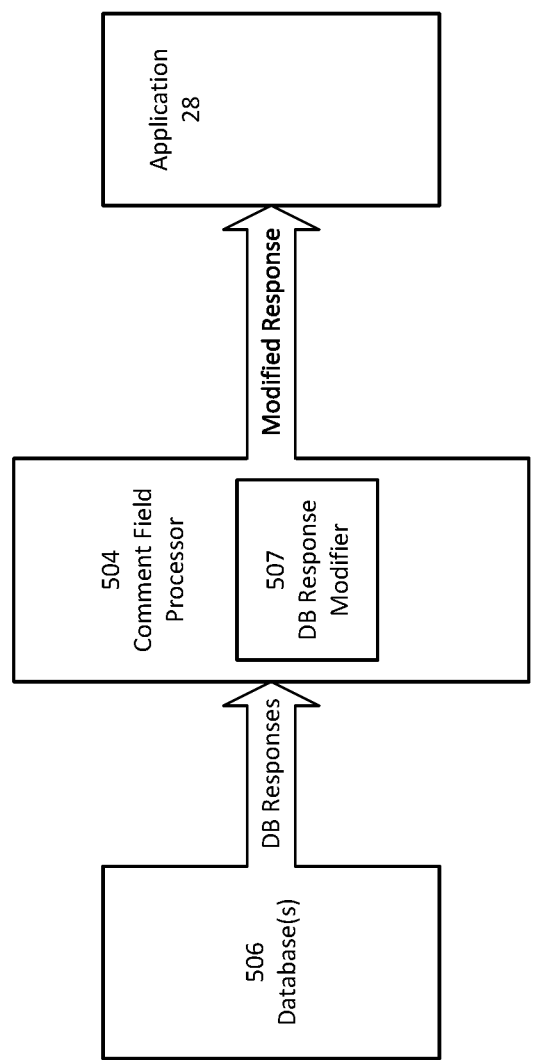

FIGS. 13A and 13B depict examples of components consistent with disclosed configurations for communicating application-level user information in association with database requests generated by applications and implementing permissions and monitoring at the application-level user for databases. Example components may be implemented in a variety of ways, as described below, some of which may retrofit prior configurations disclosed herein, and otherwise, to provide fine-grained permissioning and monitoring of database utilization at the per-user level.

FIG. 13A depicts examples of components consistent with at least some disclosed embodiments along a request path from an application to a database (or databases). As shown, some example embodiments include a request modifier 502 and comment field processor 504. Examples of a request modifier 502 may obtain application-level user information, like a user identifier, for modification of a request to include such user information within a comment field. Examples of a comment field processor 504 may perform one or more operations on a modified request based on (e.g., user) information included in a comment field of the modified request, and those operations may include, but are not limited to, modification of database query instructions within the modified request to structure one or more database requests directed to database(s) 506 based the user information and modification of one or more database responses to the one or more database requests to structure a modified database response directed to an application 28 (e.g., responsive to the database query information).

In at least some example embodiments, a request modifier 502 may obtain the application-level user information and modify generated requests to include a comment field populated with the application-level user information. Some example embodiments may implement a request modifier 502A within an application 28A. An example of such a request modifier 502A may be included within an application 28A by modification of computer program code of the application for generating requests to access or store data within a database. Another example of such a request modifier 502A may be included within an application 28A by installation of a plug-in, or script, or other body of computer program code executed in connection with the application 28A, such as within the runtime environment of the application when the application is executed.

Some embodiments may include an application, like an application 28A (or application 28B), configured to generate requests to access data from a database arrangement that includes ones or more databases 506. In some example embodiments, an arrangement of databases 506 may include a relational database 14 and a secure distributed storage 16.

A security driver (or other component) may be configured to modify requests received from such an application 28, which may be in a schema corresponding to a database, like a relational database, or database driver therefore expected by the application, into one or more requests configured to query the database arrangement. While application 28B may include a request modifier 502A for appending application-level user information to database requests generated by the application, the application may be otherwise unmodified with respect to structuring requests to an expected database or database driver. Examples of such requests may be an SQL query or other database request. The request modifier 502A may modify a generated request, such as to include a comment field (which a database or database driver may ignore or which may be parsed from the request by another component), but may not otherwise modify one or more statements, queries, or other request arguments or data. Thus, in some embodiments, the application 28A may be modified to include application-level user information in generated requests to access data from a database. For example, the application may be configured to include application-level user information in a request to a database driver (but which may be obtained by a security driver) by encoding user information, like a user identifier, into the query string, such as by including a user agent string including one or more user or client device identifiers. For example, the application may be configured to populate a comment field (which may be added to the query statement string by the application, such as appended to the query string and populated, or otherwise designated to the application within the query string structure and populated) in such a way as to not impede database functionality.

Some example embodiments may implement a request modifier 502B external to an application 28B. An example of such a request modifier 502B may be included within a security driver (not shown), such as a security driver that executes within the client runtime environment along with the application 28B and registers to receive or otherwise receives requests that are generated by the application to access or store data within a database. In turn, the request modifier 502B may determine information about the client runtime environment or application 28B, like application-level user information. Another example of such a request modifier 502B may be implemented as a service that generates information for modifying requests, but may not modify requests directly. Rather, another component, like a security driver, may obtain information for processing a request based on application-level user information by querying the request modifier 502B (e.g., like a service) for application-level user information in response to receiving a request from the application 28B. In such examples, the application 28B itself may not be modified by code injection, plug-in, script, or other body of code executed within the application runtime environment (e.g., like application 28A), but application-level user information may be obtained in accordance with those examples by a third-party component (e.g., like a security driver) configured to process such information (e.g., within a comment field). In some of those examples, the third-party component may append the application-level user information (although there exists no such requirement to do so) for monitoring processes, such as where request logging is performed further along the request path (e.g., in addition to, or instead of, by the security driver) or to otherwise communicate application-level user information along the request path. Indeed, in many cases, logging of requests may be performed by one or more different components for requests that flow through them and those logs may later be processed (e.g., by identifying a set of requests based on an application-level user identifier included in a comment field) to evaluate user request activities, even at components that do not process the comment field but may retain the comment field in conveyed requests.

Some embodiments may implement multiple databases 506, such as a lower security database, like a relational database 14 storing lower security values and another, more secure database within which high-security values are stored, such as a secure distributed storage 16. However, various disclosed embodiments for application-level user permissioning and monitoring may be applicable to a single database, which may be a lower security database, like a relational database 14 or other database, like an object oriented database, or other example database that an administrator or other entity wishes to control and monitor data access by disclosed techniques. Examples of a secure distributed storage 16 may be accessed (e.g., to read, analyze, or write values) via an application program interface (API). In some cases, this API may be exposed via a translator 20 (e.g., as illustrated in FIG. 1). In some embodiments, the API may be exposed via a different component of a database arrangement or system, for example, the API may be exposed by an API server. In some cases, API requests may be sent over a network, such as a public or private network, and some API requests may be conveyed between processes executing on the same computing device, for instance, via a loopback IP address or a system call. In some cases, the API be implemented as an interface within a given process, such as an API of a framework or library. In some embodiments, the API may be a representational state transfer (REST) API and entities may be configured to convey API requests (or commands) via hypertext transport protocol secure (HTTPS) to which responses may be provided by the API (e.g., in a response over HTTPS). In some embodiments, such API requests (or commands) may include an API base URI corresponding to the API server, one or more paths appended to the base URI corresponding to different resources accessed via the API server, and corresponding API endpoint URLs may be responsive to one or more of a discrete set of commands, or methods, corresponding to operations to be performed on those resources at those endpoints, such as POST, GET, PATCH, and the like. In some cases, these operations may correspond to read or write operations, for instance in the case of POST and GET. In some cases, API commands may further include API parameters, which in some cases, may be appended to the URL as part of a query string, e.g., as a set of key-value pairs delimited from the URL prefix with a "$" and delimited from one another with an ampersand. In some cases, query parameters may include an authentication credential, and embodiments may selectively grant access to corresponding portions of a database arrangement or within a database in response to verifying the authentication credential. Various processes, drivers, applications, or other aspects of database arrangements and systems like those described herein may convey requests to the API, implement the API, or provide data backing responses returned by the API in response to requests. Accordingly, FIG. 13A illustrates an example environment within which at least some example configurations of a secure distributed storage 16 may be implemented in connection with a relational database 14, such as where higher-security values are stored within the secure storage and references to those values are stored within the relational database 14, and those high-secure values may be obtained in connection with disclosed operations for application-level user permissioning. Accordingly, illustrate examples discussed below with respect to relational databases 14 should not be read as limited to returning values from only the relational database, as implementations of application-level user permissioning may be consistent with database arrangement configurations including a secure distributed storage 16 in addition to a relational database 14 (or other lower-security database). However, various example embodiments may be implemented without requirement of a secure distributed storage 16.

As outlined above, a request modifier 502 may be configured to append or otherwise modify a request generated by an application 28 to include a comment field. The comment field may be populated with information that another component (or other components), such as embodiments of a third-party component described herein, may process without interfering with database 506 operation. For example, a third-party component, like a security driver (which may be a software driver, a hardware driver, or both and may run in kernel mode of an operating system within which a database driver executes), may include a comment field processor 504 configured to process at least the comment field of a request, such as by reading one or more values (which may be numeric or alphanumeric values, statements, or arguments) and performing operations like those discussed below based on or responsive to the values. In some cases, a comment field processor 504, which may be implemented by a security driver, may identify the comment field to perform one or more operations based on application-level user information included within the comment field and optionally parse the comment field from the request (e.g., by modifying the request), or also convey requests that include the comment field for logging of requests along the request path.

In some embodiments, a security driver obtains requests to access data within database 506 along the request path. For example, the security driver may obtain requests from an application 28 and pass requests on to a database driver, or process obtained requests and communicate with a database 506, or obtain communications from a database driver and pass the communications on to the database. Additionally, as previously described, in some embodiments, the security driver may modify communications, such as obtained requests or request information within the request path. For example, the security driver may parse an SQL request or other request and modify the request. Accordingly, some example embodiments of a security driver disclosed herein may include a comment field processor 504, and implement a database request modifier 505 for request modifications like those discussed above, which may be based on information determined by the comment field processor 504.

Example embodiments of a comment field processor 504 may analyze requests received (e.g., by a security driver) from an application to identify, or detect, a comment field within a request. If a comment field is not detected, the comment field processor 504 may reject the request or cause a security driver to reject the request. The comment field processor 504 may obtain, from the comment field of a request, application-level user information. The application-level user information may be a user agent string, which may contain one or more identifiers corresponding to the user, the client device, application instance, or other identifying information. The comment field processor 504 may obtain a policy, or policy information, that includes permissions, like application-level user permissions, for accessing data. In some examples, the policy information may include keys and corresponding values by which user permissions may be identified. Example keys may correspond to one or more of the identifiers obtained by the comment field processor from a comment field, or data based on one or more identifiers (e.g., like a hash of one or more identifiers). Example values corresponding to keys may include user permission information, like an access level designation, or the value may be a user group or class of user or client device by which an access level designation may be determined. The policy information may also include keys and corresponding values by which data access permissions may be identified. Example keys may include identifiers of fields, value types, specific values, or other identifiers of records or information in records stored within a database arrangement. Thus, for example, a request received from the application 28 may analyzed to detect identifiers corresponding to data implicated by the request-whether for storage or retrieval. An identifier corresponding to data implicated by the request may, in turn, be utilized to obtain data access permissions for the identifier, like an access level designation.

One or more rules specified within the policy information may take as input data access permissions and user access permissions, like respective access level designations, and parameters of the request (e.g., how that data is implicated by a statement or query) to determine whether the request received from the application should proceed, be denied, or be modified for the given application-level user. The comment field processor 504 may execute one or more rules based on access level designations of identifiers of implicated data by requests, access level designations of information of users or client devices associated with the application requesting the data, or other policy information, like request rate limits, and other factors discussed herein.

Results of the execution of the one or more rules may indicate whether a request destined for the database 506 should be modified, and how to modify the request (e.g., where the request is not denied). For example, one or more identifiers implicated by the received request may be removed from statements or queries such as prevent access to that data within the database for the application. For example, a request, or a portion of a request, indicating a write of a data value in associated with an identifier to which write access is restricted for the user or the client may be denied. However, if another portion of the request indicates a write of a data value in association with an identifier to which write access is not restricted for the user or the client, a database request may be passed with information for the database to execute that portion of the request. Thus, in some cases, modification of a request may include modifying statements or arguments of the request.

A database request modifier 505, which may be included as a component of the comment field processor 504 or security driver may receive instructions from the comment field processor for modification of the request, such as based on results of the processing of rules. The database request modifier 505 may also implement request modification operations ascribed herein to examples of security driver request modification (e.g., for certain database arrangements), which may be implemented before or after, or in connection with request modification based on application-level user information indicative of whether the user or client is permitted to access (e.g., read or modify) certain data within a database of a database arrangement. The database request modifier 505 may modify a read request by parsing the read request into two or more read requests, such as to request some data from a first database with a first read request and request some other data from a second database with a second read request (and the first and second requests may have different schemas, such as respective schemas corresponding to different databases for reading data). The request modifier 505 may modify a read request to exclude data which the user or client is not permitted to access. In some cases, such as where other portions of a statement or argument of the read request are dependent on the portion of data to be excluded, the data to exclude may be identified and scrubbed or masked after receipt as a result of passing the request to a database. In another example, the database request modifier 505 may parse a write request into two or more requests, such as to store some data in a first database with a first write request and store some other data in a second database with a second write request (and the first and second requests may have different schemas, such as respective schemas corresponding to different databases for writing data). The database request modifier 505 may remove portions of statements or arguments that implicate writes in association with identifiers that the user or client is excluded from modifying. In come cases, such as where other portions of a statement or argument are dependent on the portion of data that the user is excluded from modifying, but do not implicate a write to a value associated with the identifier, the request may be conveyed to effect the write of values associated with other identifiers corresponding to those other portions, or restructured to omit or scrub one or more data values for write with respect to some identifiers but not others. In some cases, modification of a request may include parsing a comment field from the request (e.g., for processing) and passing the modified request (or parsing the modified request into multiple modified requests) to a database driver.

In some cases, the comment field processor 504 may parameterize and sanitize application-level user information included in the comment field to impede or prevent SQL injection attacks. In some cases, the security driver may incorporate database driver functionality by which database requests may be received and processed without passing modified requests to another database driver (e.g., of a same client computing device, or virtual instance thereof, executing the application which generated the database requests).

FIG. 13B depicts examples of components consistent with at least some disclosed embodiments along a response path from a database (or databases) to an application 28. As shown, some example embodiments include a database response modifier 507 and comment field processor 504. As outlined above, a comment field processor 504 may obtain application-level user information, like a user identifier or client identifier, from a comment field within a database request generated by an application.

In many cases, it may desirable to convey a request to a database (modified or unmodified) and perform a modification on the returned data. Examples of a comment field processor 504 may perform one or more operations on a database response based on (e.g., user) information included in a comment field of a request by which that data was obtained from the database 506. Those operations may include, but are not limited to, modification of returned data to structure a modified database response without data that was returned but which the application is not permitted to access (e.g., based on application-level user information). The comment field processor 504 may obtain identifiers associated with returned data values, such as to detect restricted data, and then apply policy information based on the application-level user information and the identifiers to determine returned data values that the application is not permitted (e.g., restricted from accessing for the user) to access. The results of the application of the policy information to database response to detect restricted data values returned by the database(s) 506 based the user information may be utilized to determine to structure a modified database response destined for the application 28 that requested the data. In some cases a security driver, such as by a database response modifier 507 may modify one or more database responses based on the application of policy to the one or more database requests to structure a modified database response directed to an application 28 (e.g., responsive to the database query information but sanitized for restricted data values). Various examples embodiments of security drivers may include functionality of the comment field processor 504 or database response modifier 507, and application of policy information may be applied to database responses in a similar fashion to requests to identify returned data, like certain data values, to exclude in database responses provided to applications.

Thus, in some cases, modification may include modifying accessed data-which may be the data to be written to the database or data read from the database to be returned to the application, and modification of returned data by a database response modifier 507. For example, a security driver may receive read data returned by the database (either from the database or via the database driver) and the DB response modifier 507 may modify values in the read data (e.g., by replacing a pointer to a value within another database with the value, deterministically obfuscating a value by cryptographic hash, or replacing a value with some other value (e.g., random or specified), such as based on a policy specifying one or more rules governing access to or security of fields or records to which the values pertain, e.g., as determined by the comment field processor 504 by application of policy information in accordance with restricted data in the returned data for the application-level user that was identified in association with the application request for the returned data). These modifications performed on data received from a database may be performed in addition to, or instead of, outbound modifications of data to write, like those that modify values in the data to write to the database (e.g., by replacing a value to be stored or stored in another database by a pointer or other reference to the value, such as based on a policy specifying one or more rules governing access to or security of fields or records to which the values pertain).

Various illustrative examples of request modifications are disclosed below. It is stressed that the disclosed techniques are limited to the specific examples (which is not to suggest that other descriptions are limiting), but rather serve to illustrate some ways in which the techniques may be implemented. Further, the techniques may be applied to other requests discussed within the disclosure.

As described above, some embodiments may modify database requests. Some embodiments may include multiple modifications. For example, an application may modify a database request, such as by populating or appending and populating a comment field of a request. In some cases, an application generates database requests according to a schema of an API, such as that of a database driver or database which the application accesses. In some embodiments, the application is modified to append a comments field to a request in the schema of the API. In some cases, the schema of the API does not act on the appended comment field. In some cases, the application determines a value and populates a comment field with the value.

The appended comment field may have a schema of thirty-party component, like a security driver, which may include a comment field processor, and the security deriver may obtain database requests generated by the application.

In turn, the security driver may parse a received database request to identify a comment field (or other fields and values as disclosed herein) obtain the value of the comment field for processing. In some cases, the value of the comment field may include an argument or a statement which the security driver processes. Examples are discussed in greater detail below.

An example query follows, which an application (and other applications within an environment) may generate to submit to a database driver to access a database using the database user APPLICATION_USER.

SELECT SSN FROM CLIENTS WHERE CLIENT_ID=12321321

Here, the database may not have any concept of an application-level user (e.g., an end-user, as distinct from another service in a service oriented architecture that may serve many users), such as Accounting.Jerry or Marketing.Tom, for which access should be distinguished between. Specifically, in many cases, company policy, or even law, may specify restrictions on Marketing.Tom from accessing at least some data which Accounting.Jerry is permitted to access. To expand upon the example, a Admin.Sally may similarly have different restrictions (or none), but none the less, each user may access the database with different instances of an application under a same database user. In many cases, restrictions may be only practically enforced by unsophisticated measures that can be easily circumvented or even unintentionally broken.

Some embodiments may modify a query like that of the above example without otherwise affecting database functionality. For example, in some embodiments, application instances may append a comment field to the end of a query and populate the comment field with application-level user data. An illustrative example is provided below.

SELECT SSN FROM CLIENTS WHERE CLIENT_ID=12321321—
APPLICATION_USER=Accounting.Jerry Or, more generally:

SELECT [value(s)] FROM [records] WHERE [specified record or set of records] [comment field marker] [application-level user information]

A security driver or other third-party component (which may or may not include database driver functionality) may be employed to read incoming SQL queries and extract application-level user information from queries by searching SQL query comment fields for strings of pre-specified location or format (e.g., a schema of communicating application-level user information). In some cases, a security driver or third-party component inserted within the request path between an application and a database driver may obtain requests, like the above query, parse the query to extract the comment field. The query (either unmodified or modified, such as by extraction of the comment field or other modification), may in turn, be passed to the database driver. In other cases, a security driver or third-party component may include database driver functionality and communicate with a database based on the query (e.g., either unmodified or modified, such as by extraction of the comment field or other modification). The security driver may also determine the columns being accessed (in the example above, CLIENTS.SSN) in the query (or rows in a column-oriented database).

In some embodiments, the security driver may communicate with a third-party agent, like a server or other service, maintaining access rules to the data requested. In this example, the security driver may send a request to the third-party access agent for access to CLIENT.SSN for user Accounting.Jerry. The third-party agent may respond by evaluating the request and returning instructions to the driver for allowing, masking, or disallowing the data (or a subset thereof) to pass from the database to the application. If a query only requests data to which the user is disallowed, the request may not be passed to the database. If a request only requests data to which the user is allowed, the request may be passed to the database and the data returned to the application. If a request requests some data to which the user is allowed and some data to which the user is disallowed, the request may be modified to request only the allowed data from the database, or the request may be passed unmodified and a subset of data to which the user is disallowed is filtered from returned data, and in either instance, a mask value or values may be returned for data to which the user is disallowed. In some cases, a mask value may be a selected reserved value, like PRIVATE, DENIED, etc., or a deterministic value (e.g., such that the information may be distinctly referenced but without user access to the underlying value), like a cryptographic hash of the value, or a pointer to a location of the value (which may be a more secure storage location), or an encrypted version of the value. For example, the driver, like a security driver, may modify a portion returned data based on the rules.

Some examples of access rules include:
(1) Allow Account.Jerry to access CLIENTS.SSN 10 times per minute, and then cause the application to throw an Exception.
(2) Allow Account.Jerry to access CLIENTS.SSN 10 times per minute, and then cause the CLIENTS.SSN string to be replaced with the text "BLOCKED" when returned to the application.

The security driver may be configured to parse a query to govern access to different users in a single result set on a column-by-column basis (or row-by-row basis in column-oriented databases):

SELECT
LAST_NAME/
*APPLICATION_USER=Accounting.Jerry*/,
SSN/
*APPLICATION_USER=HumanResources.Bob*/
FROM CLIENTS WHERE CLIENT_ID=12321321

Furthermore, database objects such as views, functions, and stored procedures may be written such that query strings, even without APPLICATION_USER specifiers, could still be governed. An example is the following query:

SELECT *FROM HR_CLIENTS_VIEW WHERE CLIENT_ID=12321321 where HR_CLIENTS_VIEW is defined as:

CREATE VIEW HR_CLIENTS_VIEW AS
SELECT *FROM CLIENTS/*APPLICATION_USER=HumanResources*/

When the example query above is encountered by the security driver of some embodiments, the security driver may send a request to the database or database driver to acquire the definition of HR_CLIENTS_VIEW. For example, as noted previously, the security driver may include database driver functionality, wrap a database driver, or receive requests/responses in the communication path between an application and database driver or database driver and database. Based on the definition, the security driver may determine that any access (or a certain type of access, e.g., read or write) to that object should be applied to application-level user HumanResources, even though that is not explicitly specified in the actual SQL query submitted by the application to the driver. In some cases, the security driver may communicate with an agent, such as by submitting the obtained definition, or retrieving a policy or policy update from the agent, which specifies application-level user rules that may be applied based on application-level user information.

Note that disclosed techniques are not limited to structured databases and may apply to other data stores, such as other data stores which accept queries that may be modified in a way that does not affect the behavior of the data stored (which is not to suggest that other descriptions are limiting). CassandraDB, for instance, is an example of a NoSQL database, but accepts query strings in the SQL format. MongoDB is a NoSQL datastore that accepts queries in the form of JSON objects. An example of MongoDB query implementing techniques like those disclosed herein may include:

db.records.find({
  x: {$mod: [2, 0]},
  $comment:
    "APPLICATION_USER=HumanResources.Anna"
});

Here, as with other types of database, the database may not have any concept of an application-level user for which access to different subsets of data should be distinguished between and embodiments may modify a query like that of the above example without affecting database functionality. For example, in some embodiments, application instances may append a comment field within a query (e.g., which may be in an object-oriented format) and populate the field with a value. Additionally, as can be seen, the schema of a comment field, and where it may be appended, may be depend on the query structure. For example, here, the commend field is delimited by "$comment:" whereas in the SQL example query the comment filed may be delimited by "—" and applicants stress that delimiters may have alternative formatting. Similarly, schema for values populated within the field (or starting thereof) indicated by the delimiter may differ, e.g., APPLICATION_USER=Accounting. Jerry vs "APPLICATION_USER=HumanResources.Anna" without departing from the spirit of disclosed techniques.

Various other techniques may be used to communicate application-level user information for processing in accordance with the disclosed techniques such that access to requested data may be governed by which application-level user is attempting to access data.

(1) Bound parameters: It is often considered good practice to parameterize and "prepare" queries for execution so that the database may calculate the query execution plan once. For instance, a query accessing CLIENTS above may be generalized to:
SELECT SSN FROM CLIENTS WHERE CLIENT_ID=?

Here, "?" may be a bound parameter marker indicating any possible user ID. These parameters may be specified in various ways by database drivers of respective databases or database structures. For instance, ODBC drivers may allow parameters to be bound by both position (indicated by a positive integer) and name (communicated via string). JDBC drivers typically do not have named parameters but may allow parameters with non-positive position markers. Drivers often ignore parameters bound using an index or name not relevant to the query to which they are bound.

In some embodiments, a security driver, which may include database driver functionality, may detect (e.g., configured to identify) bound parameters outside the domain specified by the query or based on a pre-determined specifier and use the value of those parameters to specify the application-level user. An example is illustrated by the following pseudo-code:
StatementHandle hstmt=PrepareStatement ("SELECT SSN FROM CLIENTS WHERE CLIENT_ID=?");
BindParameter(hstmt, 1, 121321321);
BindParameter(hstmt, 2, "Accounting.Jerry");

When the statement is executed below, in some embodiments, the driver may determine that the second bound parameter is not relevant to the prepared query and assume it indicates the application-level user, so the result set will be governed accordingly.
ResultSet rs1=ExecuteStatement(hstmt);//Accounting.Jerry is accessing this data The next result set may be governed in the context of a different application-level user by changing the value of the second bound parameter, even though the query will be executed in the context of the same database-level user as when it was previously executed:
BindParameter(hstmt, 2, "Accounting. Sally");//Accounting. Sally is accessing this data
ResultSet rs1=ExecuteStatement(hstmt);

The application-level user may also be specified by a named parameter in various embodiments:
BindParameter(hstmt, "APPLICATION_USER", "Accounting.Jerry");

(2) Shared memory: In some embodiments, rather than explicitly setting application-level user information on each object (or request), application-level user information may be inserted into memory or stored on disk at a pre-determined (or obtained) location such as a hard-coded location, configuration file, or configuration parameter at various levels of execution from driver instance, to connection, to statement, etc. A security driver or other component may read that location when executing a query to obtain and apply application-level user information found at the specified location to govern access to the data. The data stored in that location may be updated by any entity, including a third party, such as by a third-party agent or server which may push updated configuration files (e.g., including policy information) to clients or from which a component processing a request (e.g., for modification or for communication along a request path) may obtain the configuration files. In some embodiments, a security driver may be configured to verify a signature of an authorized party which signs configuration files.

(3) Statement, connection, and connection-string parameters: Database drivers, such as ODBC drivers, are compatible with facilities for applications to specify parameters specific to software objects, themselves, as opposed to query parameterization. The parameter is often specified using an integer. A custom parameter may be introduced orthogonal to database-recognized parameters to indicate an application-level user. For example:
define APPLICATION_USER_PARAMETER_MARKER 65535
StatementHandle hstmt=PrepareStatement ("SELECT SSN FROM CLIENTS WHERE CLIENT_ID=?");
SetStatementParameter(hstmt, APPLICATION_USER_PARAMETER_MARKER, "Accounting.Sally");
BindParameter(hstmt, 1, 121321321);
ResultSet rs1=ExecuteStatement (hstmt);//Accounting. Sally is accessing this data Similar parameters may exist at the connection level in the form of application-level parameters like on statements, but also specified in the connection string. These can be used to provide a "fallback," "default," or connection-wide context for data access.
  (4) Cascading application-level user identification: Third-party data access agents may allow clients to specify several "layers" of data access rules. For instance, the data access agent may allow its clients to specify application, group, and user. When the application starts a database connection, the application may configure the "application" layer in the connection string (or via any other method previously mentioned):
    ConnectionHandle hconn=Connect("Database=xyz; APPLICATION_USER=AccountingApp");
    Then, the application may set the "group" in a prepared statement (or via any other technique previously mentioned):
    StatementHandle hstmt=PrepareStatement (
      "SELECT *FROM CLIENTS WHERE CLIENT_ID=?/*APPLICATION_ USER=AcctsReceivable*/");
    And, for an execution of the statement, the application in some embodiments, may specify application-level user information for an individual user in a bound parameter (or via any other technique previously mentioned):
    BindParameter(hstmt, 2, "Sally");
    As such, in the example above, the fully-qualified application-level user would be:
    AccountingApp.AcctsReceivable.Sally
    In various embodiments, specifying an application-level user need not be restricted to a single field or element in a query. For instance, the example above may be articulated using, for instance, named bound parameters:
    StatementHandle hstmt=PrepareStatement ("SELECT*FROM CLIENTS WHERE CLIENT_ID=?");
    BindParameter(hstmt, 1, 12312321);
    BindParameter(hstmt, "ApplicationLayerUser", "Accts-Receivable");
    BindParameter(hstmt, "GroupLayerUser", "AcctsReceivable");
    BindParameter(hstmt, "ApplicationUser", "Sally");
    In some implementations, similar tiered or hierarchical constructs may be achieved via definitions of the database objects (or records) being accessed, such as the view example above. Other techniques of application-level user identification may include registration of the IP address of the application's host client such that when a driver requests data access from a third-party agent, the third-party agent may automatically assign the request to an appropriate application-level user bucket as a function of the IP address from which the request originated. For example, user sessions with host clients may be bucketed by user identifier or account within a bucket corresponding to access level and the bucket may include the IP addresses of host clients with active sessions for those users.
    Furthermore, in some embodiments, an application may build queries dynamically. The query string, itself, may be edited at different stages of the application to include various layers of application-level user specification. Example:
    SELECT<columns, todo>
    FROM CLIENTS_ACCT_VIEW WHERE CLIENT_ID=?/*APPLICATION_GROUP=Accounting*/
    Here, executions of this query will be for the Accounting group. Then, the application-level user may be specified.
    SELECT SSN/*APPLICATION_USER=Jerry*/
    FROM CLIENTS_ACCT_VIEW WHERE CLIENT_ID=?/*APPLICATION_GROUP=Accounting*/

A security driver or other component may, in some embodiments, examine this query and determine that the fully-qualified application-level user is Accounting. Jerry.
    An example is illustrated by the following join:
    SELECT
      C.SSN AS CLIENT_SSN/*APPLICATION_GROUP= Sales*/
      E.SSN AS EMPLOYEE_SSN/*APPLICATION_ GROUP=HR*/
    FROM CLIENTS C
    LEFT JOIN EMPLOYEES E ON E.ID=C.ID
    WHERE C.CLIENT_ID=?/*APPLICATION_ USER=Jerry*/
    The query demonstrates "Jerry" accessing data in two logical capacities: as his role in HR (if looking at employee data) and as his role in sales (if looking at client data). Each column may be governed under the appropriate role—Sales.Jerry and HR.Jerry—as the application accesses the individual values in the columns for the result set.
  (5) Multi-layer or cascading specification in a single parameter: Multiple layers of application access may be specified in a single parameter using methodologies such as JSON or configured delimiters:
    //JSON
    BindParameter(hstmt, "APPLICATION_USER", "{Application: \"AccountingApp\", Group:\"AcctsReceivable\", User:\"Bill\"}");
    //Pipe "|" may be considered a delimiter, or another ASCII control character may be used:
    BindParameter(hstmt, "APPLICATION_USER", "AccountingApp|AcctsReceivable|Bill");

These and other techniques may be implemented with a process that may be executed by a client computing device to transparently retrofit an existing workload application to interface with a database with higher security or a heterogeneous mix of databases and, in some cases, with a combination of databases that includes a higher-security database than that which the application is configured to interface with as originally written, examples including some of the databases like those described herein, such as blockchain based databases. It should be emphasized, though, that the present techniques are not limited to embodiments drawing upon the above-types of more secure databases and, in many cases, such as in the examples above, may be used in conjunction with various types of databases, such as relational databases or other type of datastore, for which access controls and monitoring are desired. In some embodiments, the process may be executed by the above-describe security driver 30, which may include database driver functionality, or be a database driver with integrated security functionality, or other agent within the request path or wrapping a database driver. Additionally, some or all of the functionality may be executed in a translator 20 in a database gateway, in a database management system, or in some other computing device.

Figure 14:
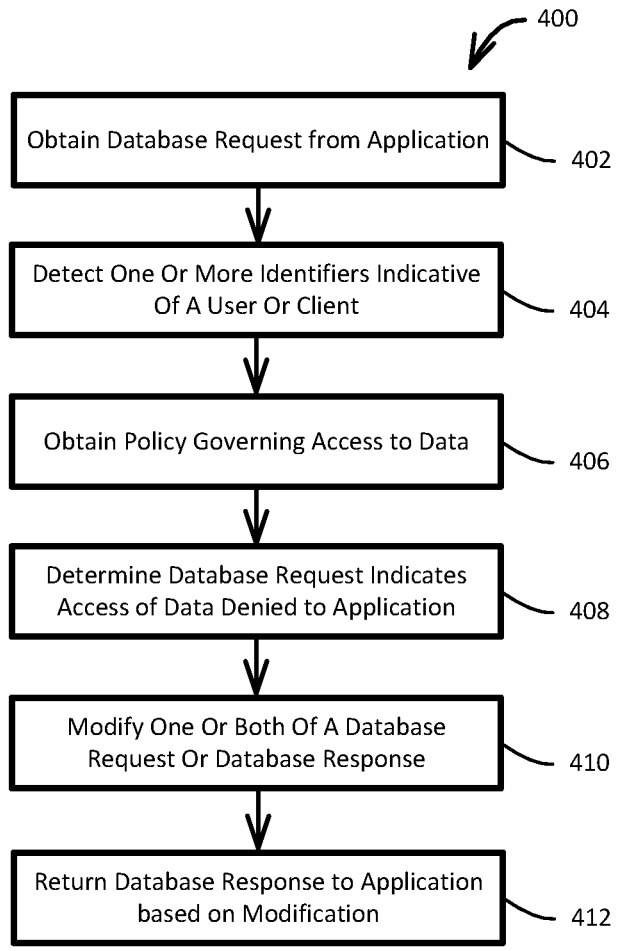
FIG. 14 is a flow chart that shows an example of a process by which application-level user information may be communicated in accordance with some embodiments.

FIG. 14 is a flow chart that shows an example of a process 400 by which application-level user information may be communicated in accordance with some embodiments. Operations of the process 400 may be implemented by components like those discussed with reference to FIGS. 13A and 13B, which may be implemented within computing environments like those discussed above and with reference to FIG. 1, or on other components in accordance with other examples described herein.

Executing the process, in some embodiments, in client computing device, before data leaves the client computing device, or upon data arriving into the client computing device, is expected to yield certain security benefits in some use cases, where for example, the database that the workload application executing on the client computing device is configured to access has is utilized by multiple application-level users under a same database user or when such as database has been compromised (e.g., by logging access at a application-level user a compromised system may be identified). Moreover, in such scenarios, it is likely that an adversary may have compromised other computing devices on a network, and rules governing access rates and controlling how much sensitive data application-level user accounts can access at a time or sequentially is expected to reduce the attack surface of a network. That said, embodiments are not limited to systems providing these benefits, and in some cases, these operations may be performed in another computing device believed to be relatively secure on a network, which is not to suggest that any other feature described herein is limiting.

In some embodiments, the process may be made transparent to a workload application executing on a client computing device, such as a service on one host of a plurality of hosts executing different services in a microservices architecture, or an application executing as a monolithic application on a single computing device. For example, in some embodiments, application-level query modifications may be implemented by application plug-in or other service retrofit to an application. Such as plug-in or service may be permissioned to access application-level user information and cause the application to generate queries with, or modify queries which the application generates to include, appended application-level user information. In some embodiments, the processes of a security driver, which may include database driver functionality, or parse and pass requests to a database driver from an application may be made transparent to that application by registering the process in the operating system of the client computing device to appear to be the database driver that the workload application is configured to access and then wrapping an application program interface of the original database driver with the operations described below. Additionally, here, the security driver, which may include database driver functionality, may also be present within the response path which responses, e.g., including data, from the database are returned and may mask portions of returned data as described above, or omit communications by which that subset is requested and instead populate returned data with a masks. In the former instance, database may be masked deterministically (e.g., with a hash such that actual values of the data stored within a database cannot be determined but may be distinctly referenced). Thus, some embodiments may be responsive to the same set of application program interface requests that a database driver is responsive to, while providing additional functionality. Further, some embodiments may then pass modified or unmodified application program interface exchanges between the workload application and the database driver. In many cases, source code of the workload application is unavailable or is expensive to modify. Thus, retrofitting existing workload applications in a manner that does not require changes to code of that application is expected to be particularly desirable. That said, the present techniques are also applicable in use cases in which the source code is available for the workload application and is modified to implement the present techniques, which again is not to suggest that any other description is limiting.

In some embodiments, the process includes registering a security driver that wraps a database driver. In some embodiments, the security driver may be registered in an operating system in which a workload application (e.g., application 28) making database access request described in subsequent operations of process is executed, and this operating system may also be an environment in which a database driver (e.g., driver 34) operates. In some cases, the security driver may include database driver functionality and replace the database driver. Alternatively, the security driver by virtue of registration of a process of the security driver may be positioned within a request and response path between the application and the database. In some embodiments, as a result of the registration operation, when an application sends an application program interface request to the database driver, that request may be received by the security driver instead, and the security driver may be configured to then communicate with the database driver as an intermediary between the database driver and the application within a single operating system on a client computing device.

In some embodiments, other types of access may be handled in a similar fashion. For instance, some embodiments may wrap a filesystem driver to obtain exchanges between filesystem drivers and workload applications, e.g., operating on documents. In some cases, a file system filter driver may be instantiated that emits events indicative of application program interface exchanges with the filesystem driver and some embodiments may classify these events as pertaining to higher-security documents (or not) and, in some cases, modify the driver behavior in response, e.g., substituting a document stored in the secure distributed storage 16 for an access request that pertains to, e.g., a locally stored text file with a pointer to such a document, masking a subset of data (e.g., and optionally not requesting it or masking upon return), or deterministically masking a subset of returned data.

In a step 402, a component may obtain a database request from an application 402. For example, a security driver or other third-party component (which may or may not include database driver functionality) may be employed to read incoming SQL queries and extract application-level user information from queries by searching SQL query comment fields for strings of pre-specified location or format (e.g., a schema of communicating application-level user information). Other types of requests generated by an application expecting other database types described herein may also be obtained. In some examples, the component may be a comment field processor, which may be included with or in addition to or instead of a security driver, that obtains the request from the application. Some example components for obtaining a database request from an application may include an application programming interface (API) configured to receive database requests in a schema of the API by which applications request to write data to or read data from a database, e.g., by communication with a database driver having such an interface. In some embodiments the request received requests may be modified requests (e.g., by modification of the application) that include application-level user information within a comment field. In various embodiments, the comment field does not impeded processing of database request by (e.g., other) components that are not configured to act on the application-level user information. The component may expose an interface to the application for receiving requests, such as by registering to receive database requests in the schema of the API from an application compatible with the database driver. In some example, the component exposes an interface responsive to at least the same set of requests to which that the database driver is responsive. Thus, for example, the component may wrap functionality of the database driver and provide additional functionality like that described below and may subsequently pass modified requests (or unmodified requests) to the database driver for processing. In some cases, however, the component may include database driver functionality (or a subset thereof, or different functionality) for communicating with a database arrangement.

In some cases, a security driver or third-party component inserted within the request path between an application and a database driver may obtain requests, like the above query or prior example queries, and parse the query to extract the comment field. The query (either unmodified or modified, such as by extraction of the comment field or other modification), may in turn, be passed to the database driver. In other cases, a security driver or third-party component may include database driver functionality and communicate with a database based on the query (e.g., either unmodified or modified, such as by extraction of the comment field or other modification). The security driver may also determine the columns being accessed (in the example above, CLIENTS.SSN) in the query (or rows in a column-oriented database).

Some embodiments may then include receiving a first access request. In some cases, this operation may be performed sometime after registering the security driver and may occur with relative frequency. In some embodiments, the request is like those described above. In some embodiments, the request is an application program interface request to the database driver from the workload application executing on the computing device. In some embodiments, the request may be to a remote database, such as a database 14 described above or some other data store. In some embodiments, the request may specify that a set of values are to be written to a set of fields in a set of records in a database, which may include adding new values to new fields to new records or modifying existing data. In some embodiments, the request may specify that a set of values are to be read from a set of fields in a set of records in a database.

In a step 404, a component, like a security driver, may detect one or more identifiers indicative of a user or a client. For example, a comment field processor (e.g., included within a security driver) may process application-level user information encoded within a received request, or otherwise obtain application-level user information for processing, such as to obtain one or more identifiers corresponding to a user of the application that generated the request or the client device executing the application. In some example embodiments, a security driver may parse the request to detect a delimiter indicative of application-level user information. The application-level user information may be extracted from the request. The request may be formatted in a schema specified by an application program interface of the database driver and may be operative to cause the database driver to respond regardless of whether the registration of the security driver has occurred.

In some embodiments, the request may be modified by the application, application plugin, or service associated with the application to include a comment field having a different schema but which does not affect compatibility (e.g., the comment field may be ignored by a database driver or database). However, the security driver, which may include database driver functionality, may process the comment field, e.g., according to that different schema. In some embodiments the security driver may extract the comment field from the request, either with modification to the request or leaving the request unmodified (and the security driver may also, or alternatively, modify the request responsive to an identified policy based o application-level user information within the comment field).

In a step 406, example embodiments of a security driver or other component may access policy information, which may be stored locally, or obtained by requesting policy information from another service or agent. For example, the security driver may request policy information by transmitting a request including the obtained application-level user information to the agent, or accessing policy information stored locally (e.g., for the user, or for a plurality of users). In some cases, a security driver may maintain in memory a set of one or more policies that each include a set of rules, which may include application-level user rules, along with application rules or other rules by which access is governed.

Policy information obtained by the security driver may include one or more rules governing data access by the application-level, and the security driver may act on the request as described herein based on the one or more rules. In some embodiments, a security driver, and optionally other component along the request path from the application to database, e.g., after modification of the request to include application-level user information, may maintain logs of the requests, which include application-level user information. In some embodiments, the security driver may transmit the logs to a monitoring agent or server, such as above-described agent or another agent. In some embodiments, such as where the security driver request policy information from an agent, the agent may store logs indicative of which policies for which users were delivered to which clients. In some cases, the security driver may log how it acted on the request based on one or more rules specified by the policy and provide such logs to the agent. Thus, for example, application-level user access may be monitored on a variety of different levels and specific results of the application of rules specified by a policy for a user may be monitored. For example, when conveying various requests with an appended field including an application-level identifier value, the request as received by a given component, like a security driver, or database driver, or a database arrangement may be stored to respective logs and reported to a monitoring agent. The logs may be unified, or maintained separately, and requests therein may be associated, such as in association with request as it first appeared on the request path with application-level user information. The log, or logs, may be operable to indicate a set of requests each having an appended comment field including a same application-level user value to monitor corresponding requests (e.g., of a user, a user group, client, etc).

In a step 408, example embodiments of a security driver may determine that a database request indicates access of data denied to an application, such as based on the application-level user information corresponding to the request, the data indicated for access by the request, and the application policy information governing access to that data. Some embodiments may include classifying values as higher-security values or lower-security values, and which security level values a user may access, or even particular values (e.g., by field name) which a user may access, or rate of access, and the like for values, records, or stored data. For example, some embodiments may permit a given application-level user to access values that correspond to a given column or data type or object and restrict some other application-level user from accessing those values. In some cases, this operation may include selecting one or more rules from one or more data policies, for example, based on a given user (or user group), such as a user or user group or user-user group combination as indicated by the application-level user information. Some embodiments may include applying one or more of the above-described rules to deny access to some values or mask or deterministically mask some values, and optionally return some other values (e.g., where a subset of request or returned data responsive to the request is restricted but another portion of data is not). Similarly, write access to submit or modify one or more values may be similarly restricted based on application-level user information and policy information pertaining to access of different data within the database.

In some embodiments, the rules may each include one or more criteria by which data being written to a database is classified as lower-security data or higher-security data. In some cases, these rules may include rules that designate certain types of fields as lower-security or higher-security, such as text fields versus integer fields, or fields within a specified pattern. In some embodiments, the criteria may explicitly list higher-security fields and lower-security fields, and data may be classified as higher-security or lower-security in virtue of a write request attempting to place data into these fields. In some embodiments, the criteria may apply a regular expression to a field identifier, such as a field name to determine whether values within that field are higher-security or lower-security. In some embodiments, the rules may apply to the content of values being written, such that some values in a given field may be higher-security, while other values within that given field may be lower-security. For example, some criteria may include a regular expression that pattern matches against the content of values to determine whether those values are higher-security or lower-security, for instance, designating values that have a format consistent with a phone number, credit card number, or Social Security number, regardless of the field in which they belong, as higher security.

In some embodiments, policy information comprises one or more rules by which permissions to access information in at least some records within the database arrangement are specified for different groups of users or groups of client devices. Policy information may comprise keys and corresponding permission values, where some of the keys correspond to identifiers of restricted information in records and corresponding permission values indicate respective access designations, and some of the keys correspond to user or client device identifiers and corresponding permission values indicate respective access designations. In turn, modifications like those described below, may be perform based on the processing of respective access designations for data and application-level user information based on policy information. For example, by identifying a first access designation corresponding to a key matching at least one value indicative of the user or the client device and identifying a second access designation corresponding to a key matching an identifier of restricted information in a record associated with a database response. In turn, modifying received data to prevent access to restricted information may be performed in response to determining that the first access designation does not permit access to the restricted information having the second access designation.

In a step 410, example embodiments of a security driver may modify one or both of a database request (e.g., to prevent a write or read of certain data) or database response (e.g., to prevent return of certain read data to an application). For example, the security driver may modify one or both of a database request or database response based on results of application of policy information governing access to data implicated by the request or included in the database response. The resulting data, either based on a modified request, or based on modification of returned data, may be returned in a resulting modified database response to the application in a step 412. As outlined above, modifications may occur outbound on the request path, inbound on the response path, or both, and those modifications may be based on the application of policy information to the data being accessed and application-level user information determined in relation to the data access. Some example modifications may include modifying, in association with a read request passed unmodified to the database driver and comprising a statement specifying criteria by which records within the database are selected, a subset of data associated with the selected records based on the policy. Modifying the subset of data may include identifying the subset of data in the selected records based on policy information, and changing values in the subset of data to generate modified records. In turn, the security driver may return, to the application, responsive to the read request, a response including the modified records to control access to the at least some data by the application. In some cases, modifying records obtained by the database driver from the database which include a portion of the controlled data includes returning, to the application, responsive to a given one of the database requests for which one or more records including a portion of the controlled data are returned, one or more modified records in which values corresponding the portion of the controlled data in the one or more records are changed and at least some other values are not changed. In some cases, modifying a subset of data associated with records within the database responsive to applying the policy includes identifying the subset of data based on the policy and changing values in the subset of data to generate a modified subset of data. In turn, the security drive may return, to the application, responsive to a read request in the database requests that comprises a statement by which at least some of the records within the database are selected, a response including modified data in place of the subset of data within the at least some records.

In some cases, an outbound modification is performed in response to determining that the user of the application or the client executing the application is denied access to a portion of data and a database request indicates access of the portion of data. An example outbound modification may include modification of a write to exclude values to write within the portion of data without excluding values to write within another portion of data within a database arrangement. Another example outbound modification may include modification of a read to exclude values to read from the portion of data without excluding values to read from another portion of data within a database arrangement. In some cases, a field to which a value is to be written for a database request is identified, and a security driver determines, based on policy, that the user or the client is denied access to change values within the field and the outbound modifying comprises modification of the write to exclude the value to be written to field. In some cases, modifying comprises identifying a field from which a value is to be read for a database request and determining, based on policy, that the user or the client is denied access to read values within the field. In turn, a security driver may determine, based on the database request, whether other values to be returned from other fields are dependent on the field or the value within the field and the user or client is not denied access to read at least some of the other values in the other fields to be read such that at least some other values in the other fields may be obtained by a modified request.

An inbound modification on received data may also be determined based on the data returned, the application-level user information associated with the request by which the data was obtained, and policy information. An example inbound modification, such as after data is returned by a database arrangement in response to one or more conveyed request, may include modification of returned data to exclude values read from the portion of data without excluding values read from another portion of data within a database arrangement. In some examples, such as of inbound modifications, a portion of restricted information identified within one or more database responses may be modified without modifying at least some other portion of unrestricted information. In some cases, the modification includes identifying values corresponding to restricted information based on permissions associated with respective records on which information in a database response is based and replacing an identified value with a replacement value based on the respective identified value where the replacement value does not reveal the respective identified value. In some cases, modification may include replacing a portion of an identified value with a replacement portion that does not reveal the portion of the respective identified value, or replacing an identified value with a random replacement value, a null value, or a value indicative of the identified value being denied to the user or the client, or replacing an identified value with a reference value by which the identified value may be referenced in the database arrangement without revealing the identified value. In some cases, an inbound modification comprises identifying a field from which a value was read for a database request within the data returned by the database arrangement. The security driver may determine, based on the policy, that the user or the client is denied access to read values within the field, and the returned data may be modified to exclude values read from the portion of data without excluding values read from another portion of data within the database arrangement. In some cases, a specific value within a specific field to which the user or client is denied may be modified.

In some cases, a single query from a workload application may spawn a cascade of iterative, subsequent queries, for example, where JOIN operations are performed, and in which data is merged from one or more databases to determine intermediate query responses. In some cases, a policy may specify one or more applicable rules for join operations, or join operations on some values may be restricted (e.g., denied or masked) for some application-level users. For example, a workload application may request mailing addresses of all users with a credit card number that begins with the specified sequence, and the mailing addresses and credit card numbers may be maintained in different tables, with the credit card numbers designated as higher-security values, and the mailing addresses designated as lower-security values. In some cases, these two different tables may be linked by a primary key in one table that is referenced as a foreign key in another table, and a query from a workload application may specify a join. Some embodiments may retrieve, for example, every record in the first database having pointers to values in the second database that reflect the credit card numbers, merge those values, determine which foreign keys in the table having mailing addresses are responsive to the query criteria, and then issue a subsequent query to the first remote database for those records. In some cases, to expedite these operations, an index may be maintained in which the pointers are associated with values that indicate whether the values are responsive to certain criteria (e.g., a threshold number of prefix characters or suffix characters), and embodiments may access this index to identify a subset of pointers for which values are retrieved from the secure datastore. Additionally, as described above, a policy may specify rules governing join operations, such as a given user may not access a combination of values, like name+billing address+credit card at a same time, but may be able to access name+billing address (e.g., to update a billing address) or name+credit card (e.g., to update a credit card number). In some cases the values to which a user cannot access may be masked, e.g., *3333 or **********3333 for a credit card number, but that access restriction may be more granular, such as some read data is masked, e.g., *3333 for a card number and / for expiration date but the user may have access to write a new entry for the credit card number or expiration information. In some cases, mask values may be cryptographically hashed, such as to deterministically mask data, such that values may be referenced in some instances (e.g., such as by a join or other operation).

Figure 15:
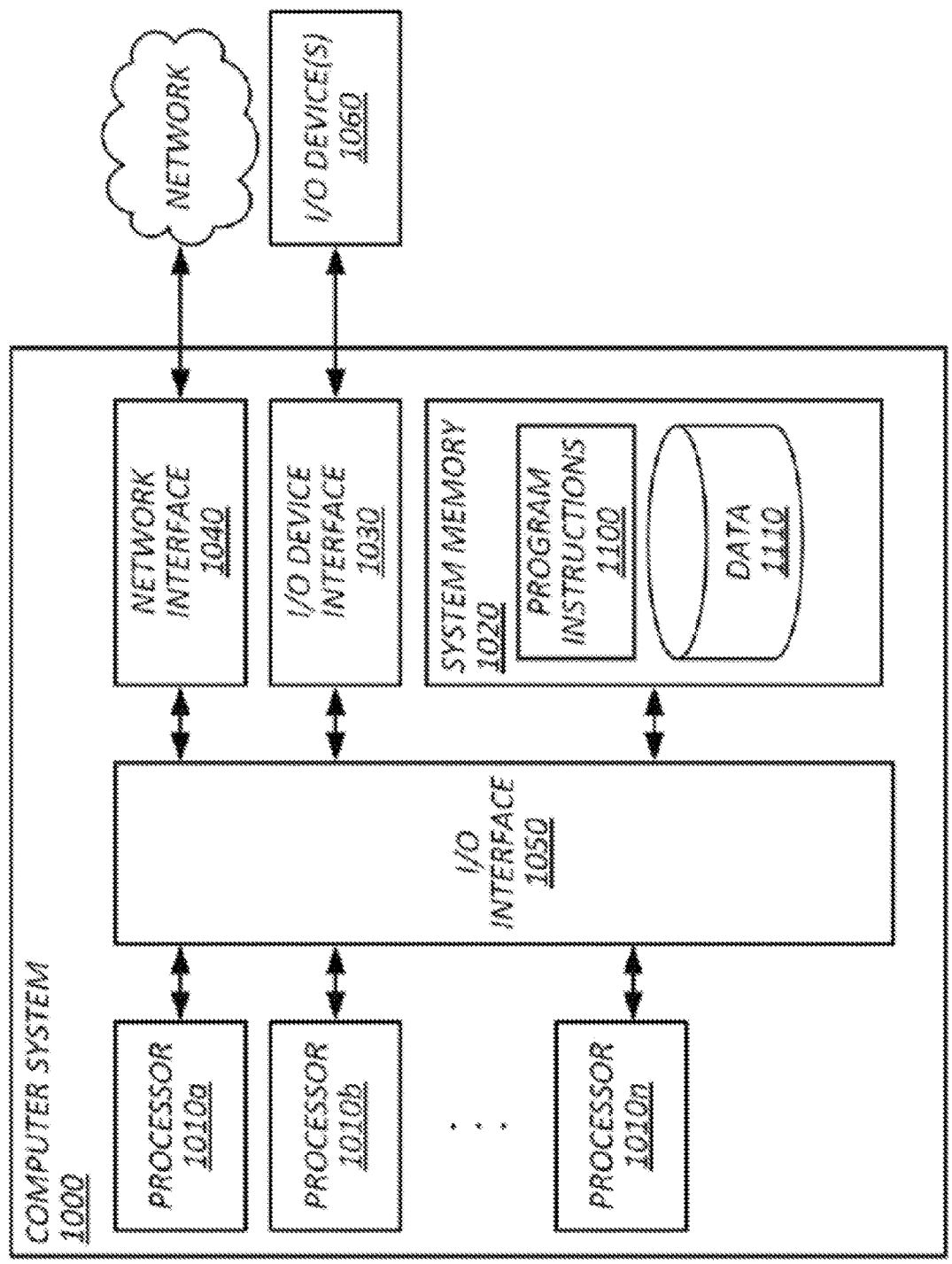
FIG. 15 is a physical architecture block diagram that shows an example of a computing device by which the above techniques may be implemented.

FIG. 15 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C,"

and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and no disclaimers or disavowals should be imported from those documents into the present patent filing.

The present techniques will be better understood with reference to the following enumerated embodiments:

1. A tangible, non-transitory, machine-readable medium storing instructions that when executed by one or more processors effectuate operations comprising: obtaining a security driver configured to interface with a database driver and applications compatible with the database driver, wherein: the database driver includes an application programming interface (API) configured to receive database requests in a schema of the API by which applications request to write data to or read data from a database, the database driver reads data from the database responsive to a read request in the schema of the API, and the database driver writes data to the database responsive to a write request in the schema of the API; registering the security driver to receive database requests in the schema of the API from an application compatible with the database driver; receiving the database requests in the schema of the API from the application, at least some of the database requests being passed to the database driver in the schema of the API; obtaining a policy by which access to at least some data within the database is controlled; modifying, in association with a received read request in the database requests that comprises a statement by which records within the database that satisfy certain criteria are selected, a subset of data associated with the records responsive to applying the policy, wherein applying the policy comprises identifying the subset of data based on the policy and changing values in the subset of data to generate a modified subset of data; and returning, to the application, responsive to the read request, a response including the modified subset of data in place of the subset of data within the records.

2. A tangible, non-transitory, machine-readable medium storing instructions that when executed by one or more processors effectuate operations comprising: accessing a first database driver configured to interface with a relational database, wherein: the first database driver includes an application programming interface (API) configured to receive requests in a schema of the API by which applications request to write data to or read data from the relational database; the first database driver reads data from the relational database responsive to a read request in the schema of the API; and the first database driver writes data to the relational database responsive to a write request in the schema of the API; registering a process of a second database driver to receive requests in the schema of the API instead of the first database driver, the second database driver being different from the first database driver and presenting an API including functions of the API of the first database driver to applications compatible with the first database driver; receiving, with the service, the requests in the schema of the API from an application compatible with the first database driver, at least some of the requests being passed unmodified to the first database driver; obtaining a policy governing access to at least some data; modifying, in association with a read request passed unmodified to the database driver and comprising a statement specifying criteria by which records within the database are selected, a subset of data associated with the selected records based on the policy, wherein modifying the subset of data comprises: identifying the subset of data in the selected records based on the policy, and changing values in the subset of data to generate modified records; and returning, to the application, responsive to the read request, a response including the modified records to control access to the at least some data by the application.

3. A tangible, non-transitory, machine-readable medium storing instructions that when executed by one or more processors effectuate operations comprising: interfacing with a database driver and an application compatible with the database driver; obtaining database requests in the schema of the API from the application;

passing at least some of the database requests to the database driver; obtaining a policy by which user, computing device, or application access to at least some data within the database is controlled; modifying records obtained by the database driver from the database which include a portion of the controlled data; and returning, to the application, responsive to a given one of the database requests for which one or more records including a portion of the controlled data are returned, one or more modified records in which values corresponding the portion of the controlled data in the one or more records are changed and at least some other values are not changed.

4. A tangible, non-transitory, machine-readable medium storing instructions that when executed by one or more processors effectuate operations comprising: obtaining a first driver configured to interface with a second driver and applications compatible with the second driver, wherein: the second driver includes an application programming interface (API) configured to receive database requests in a schema of the API by which applications request to write data to or read data from a database, the second driver reads data from the database responsive to a read request in the schema of the API, and the second driver writes data to the database responsive to a write request in the schema of the API; registering the first driver to receive database requests in the schema of the API from an application compatible with the second driver; receiving, with the first driver, the database requests in the schema of the API from the application, at least some of the database requests being passed by the first driver to the second driver in the schema of the API; obtaining, with the first driver, a policy by which access to at least some data within the database is controlled; modifying, with the first driver, a subset of data associated with records within the database responsive to applying the policy, wherein applying the policy comprises identifying the subset of data based on the policy and changing values in the subset of data to generate a modified subset of data; and returning, to the application, with the first driver, responsive to a read request in the database requests that comprises a statement by which at least some of the records within the database are selected, a response including modified data in place of the subset of data within the at least some records.

5. A tangible, non-transitory, machine-readable medium storing instructions that when executed by one or more processors effectuate operations comprising: registering a security driver to receive database requests generated by an application compatible with a database driver, the security driver obtaining a database request generated by the application; detecting, by the security driver, a user agent string appended to the database request, the user agent string including at least one identifier indicative of a user of the application or a client executing the application; obtaining, by the security driver, a policy by which access to a portion of data within a database arrangement by the application is governed for different users or client devices to permit at least one user or client device access to the portion of data and deny at least one user or computing device access to the portion of data; determining, by the security driver, based on the obtained policy and the identifier included in the user agent string, whether the user of the application or the client executing the application is permitted or denied access to the portion of data; determining, by the security driver, based on the obtained policy and the database request, whether the database request indicates access of the portion of the data; in response to determining that the user of the application or the client executing the application is denied access to the portion of data and the database request indicates access of the portion of data, modifying, by the security driver, for the database request to deny access to the portion of data, at least one of: a write to exclude values to write within the portion of data without excluding values to write within another portion of data within the database arrangement, a read to exclude values to read from the portion of data without excluding values to read from another portion of data within the database arrangement, or data returned by the database arrangement to exclude values read from the portion of data without excluding values read from another portion of data within the database arrangement; and returning, by the security driver, to the application responsive to the database request, a database response being based on the modification and compatible with the application.

6. A tangible, non-transitory, machine-readable medium storing instructions that when executed by one or more processors effectuate operations comprising: obtaining, by a driver of a client executing an application, a database request generated by the application executing on the client; detecting, by the driver, at least one value indicative of a user of the application or the client executing the application that generated the database request; obtaining, by the driver, policy information conveying permissions to access information in at least some records within a database arrangement for some users or some client devices; determining, by the driver, based on the permissions and the detected value, whether the user of the application or the client executing the application is requesting access to a portion of restricted information from one or more records within the database arrangement among a set of records implicated by the database request; obtaining, by the driver, information in records in the set of records implicated by the database request by conveying one or more requests for the information to the database arrangement; identifying, by the driver, based on the permissions, the portion of restricted information within the obtained information; modifying, by the driver, the portion of restricted information without modifying at least some other portion of the obtained information; and providing, by the driver, to the application responsive to the database request, a database response including the at least some other portion of the obtained information.

7. A tangible, non-transitory, machine-readable medium storing instructions that when executed by one or more processors effectuate operations comprising: obtaining a database request generated by an application executing on a client computing device; detecting at least one value indicative of a user of the application or the client computing device executing the application that generated the database request; obtaining policy information conveying permissions to access information in at least some records within a database arrangement for some users or some client devices; determining, based on the permissions and the value, whether the user of the application or the client executing the application is requesting access to a portion of restricted information from one or more records within the database arrangement among a set of records implicated by the database request; conveying one or more requests for the information in records in the set of records implicated by the database request to the database arrangement; modifying the portion of restricted information within one or more database responses without modifying at least some other portion of unrestricted information; and providing, to the application responsive to the database request, a modified database response based on the one or more database responses and the modifying, the modified database response including the unrestricted information.

8. One or more of the disclosed embodiments, wherein registering a security driver comprises registering a process of the security driver within an operating system of a client computing device to appear to be the database driver with which the application is compatible.

9. One or more of the disclosed embodiments, wherein a security driver wraps a database driver and exposes an interface responsive to at least the same set of requests to which that the database driver is responsive.

10. One or more of the disclosed embodiments, wherein an application includes a request modifier, the request modifier configured to obtain user or client information corresponding a runtime environment of an operating system within which the application is executed; and append, to the database request generated by the application, the user agent string based on the obtained user or client information.

11. One or more of the disclosed embodiments, wherein: a user agent string is appended within a comment field of the database request to indicate one or more of a user or client; and the comment field is detected by a security driver and not a database driver.

12. One or more of the disclosed embodiments further comprising, identifying a field to which a value is to be written for the database request; determining, based on the policy, that the user or the client is denied access to change values within the field; and modifying the write to exclude the value to be written to field.

13. One or more of the disclosed embodiments further comprising, identifying a field from which a value is to be read for the database request; determining, based on the policy, that the user or the client is denied access to read values within the field; determining, based on the database request, whether other values to be returned from other fields are dependent on the field or the value within the field and the user or client is not denied access to read at least some of the other values in the other fields to be read; and obtaining the at least some other values in the other fields.

14. One or more of the disclosed embodiments, wherein obtaining at least some other values in other fields not restricted to the user obtaining the at least some other values in the other fields and the value within the field to which the user or client is denied, wherein modifying data returned by the database arrangement to exclude values read from the portion of data without excluding values read from another portion of data within the database arrangement comprises modifying the value within the field to which the user or client is denied.

15. One or more of the disclosed embodiments further comprising, identifying a field from which a value was read for the database request within the data returned by the database arrangement; and determining, based on the policy, that the user or the client is denied access to read values within the field, wherein modifying data returned by the database arrangement to exclude values read from the portion of data without excluding values read from another portion of data within the database arrangement comprises modifying the value within the field to which the user or client is denied.

16. One or more of the disclosed embodiments further comprising, modifying data returned by a database arrangement to exclude values read from a portion of data without excluding values read from another portion of data within the database arrangement comprises identifying the values to exclude based on a policy; and one or more of: replacing an identified value with a replacement value based on the respective identified value, wherein the replacement value does not reveal the respective identified value; replacing a portion of an identified value with a replacement portion that does not reveal the portion of the respective identified value; replacing an identified value with a random replacement value, a null value, or a value indicative of the identified value being denied to the user or the client; and replacing an identified value with a reference value by which the identified value may be referenced in the database arrangement without revealing the identified value.

17. One or more of the disclosed embodiments, wherein an application is configured to generate a database request with an appended field including the at least one value indicative of the user of the application or the client executing the application.

18. One or more of the disclosed embodiments, wherein conveying one or more requests for information to a database arrangement comprises conveying the one or more requests with an appended field including the value to another driver configured to communicate with the database arrangement, and wherein another driver by which the one or more requests are conveyed to the database arrangement does not process the appended field within the one or more requests.

19. One or more of the disclosed embodiments, wherein conveying one or more requests for information to a database arrangement comprises conveying the one or more requests with an appended field including the value to the database arrangement, and wherein the database arrangement does not process the appended field within the one or more requests.

20. One or more of the disclosed embodiments, wherein conveying one or more requests for information to a database arrangement comprises conveying the one or more requests with an appended field including a application-level identifier value, requests received by the database arrangement are stored to a log, and the log is operable to indicate a set of requests each having an appended field including a same value.

21. One or more of the disclosed embodiments, wherein policy information comprises one or more rules by which permissions to access information in the at least some records within the database arrangement are specified for different groups of users or groups of client devices.

22. One or more of the disclosed embodiments, wherein policy information comprises keys and corresponding permission values, some of the keys correspond to identifiers of restricted information in records and corresponding permission values indicate respective access designations, and some of the keys correspond to user or client device identifiers and corresponding permission values indicate respective access designations.

23. One or more of the disclosed embodiments, wherein modifying a portion of restricted information within one or more database responses without modifying at least some other portion of unrestricted information comprises identifying a first access designation corresponding to key matching the at least one value indicative of the user or the client device; identifying a second access designation corresponding to a key matching an identifier of restricted information in a record associated with a database response; and modifying the restricted information in response to determining that the first access designation does not permit access to the restricted information having the second access designation.

24. One or more of the disclosed embodiments, wherein modifying a portion of restricted information within one or more database responses without modifying at least some other portion of unrestricted information comprises identifying values corresponding to restricted information based on permissions associated with respective records on which information in a database response is based, and one or more of: replacing an identified value with a replacement value based on the respective identified value, wherein the replacement value does not reveal the respective identified value; replacing a portion of an identified value with a replacement portion that does not reveal the portion of the respective identified value; replacing an identified value with a random replacement value, a null value, or a value indicative of the identified value being denied to the user or the client; and replacing an identified value with a reference value by which the identified value may be referenced in the database arrangement without revealing the identified value.

25. One or more of the disclosed embodiments further comprising a database arrangement including a relational database configured to be accessed with structured query language (SQL) statements by which records satisfying criteria specified in a statement are selected and returned responsive to a database request including the statement, records are joined across two or more tables, or records or values in records are written 26. One or more of the disclosed embodiments further comprising a database arrangement including a document-oriented database storing a plurality of serialized hierarchical data format document records and configured to be accessed via with xpath or JSON-path statements.

27. One or more of the disclosed embodiments further comprising registering a process of a security driver within an operating system of a client computing device to appear to be the database driver that the application is configured to access.

28. One or more of the disclosed embodiments wherein a security driver wraps the API of the database driver and is responsive to at least the same set of API requests to which that the database driver is responsive.

29. One or more of the disclosed embodiments wherein a received read request in a schema of an API of a database driver comprises a SELECT statement including a WHERE clause for identifying records with matching data, and the SELECT statement is parsed to determine whether values returned responsive to the WHERE are to be modified.

30. One or more of the disclosed embodiments comprising identifying a subset of data based on a policy and identifying the subset of data based on a mapping of table or field combinations in records to a security designation specified by the policy.

31. One or more of the disclosed embodiments, wherein changing or modifying values in a subset of data to generate a modified subset of data comprises changing values in the subset of data that have a correspondence to table or field combinations in records with a high security designation.

32. One or more of the disclosed embodiments, wherein a policy comprises one or more rules by which access to at least some data within the database is controlled.

33. One or more of the disclosed embodiments, wherein a policy includes a configuration of a table or key-value store within the security driver that maps table or field combinations to security designations.

34. One or more of the disclosed embodiments, wherein a table or field combination includes a column name by which arguments in query statements of database requests are compared against.

35. One or more of the disclosed embodiments, wherein a database of a database arrangement is a relational database configured to be accessed via an API with structured query language (SQL) statements by which records satisfying criteria specified in a statement are selected and returned to read data, records are joined across two or more tables, or records or values in records are written 36. One or more of the disclosed embodiments, wherein a database of a database arrangement is a document-oriented database storing a plurality of serialized hierarchical data format documents and configured to be accessed via an API with xpath or JSON-path statements.

37. One or more of the disclosed embodiments, further comprising a validating of one or more of an application ID, client ID, or machine specific identifier by which access to the controlled data is governed by a policy.

38. One or more of the disclosed embodiments, comprising receiving a database request in a schema of an API from the application, receiving at least one request to write data to a database of a database arrangement from a workload application executing in an operating system on a computing device executing the database driver, and receiving the request to read data from the database from the workload application.

39. One or more of the disclosed embodiments, wherein modifying a subset of data associated with records responsive to application of a policy comprises changing at least some values within the subset of data and not changing at least some values not within the subject of data.

40. One or more of the disclosed embodiments, wherein a response including a modified subset of data in place of a subset of data within records includes at least one record having a first value changed by the modifying and a second value not changed by the modifying.

41. One or more of the disclosed embodiments, wherein the at least some values changed within a subset of data correspond to values of a given column within a table.

42. One or more of the disclosed embodiments, wherein modifying a subset of data associated with records responsive to an application of a policy comprises replacing each of at least some values within the subset of data with a deterministic value based on the respective value.

42. One or more of the disclosed embodiments, wherein values having a high security designation are modified to restrict user or client access to the values.

The invention claimed is:

1. A tangible, non-transitory, machine-readable medium storing instructions that when executed by one or more processors effectuate operations comprising:
   obtaining, by a driver of a client executing an application, a database request generated by the application executing on the client;
   detecting, by the driver, at least one value indicative of a user of the application or the client executing the application that generated the database request;
   obtaining, by the driver, policy information conveying permissions to access information in at least some records within a database arrangement for some users or some client devices;
   determining, by the driver, based on the permissions and the detected value, whether the user of the application or the client executing the application is requesting access to a portion of restricted information from one or more records within the database arrangement among a set of records implicated by the database request;
   obtaining, by the driver, information of records in the set of records implicated by the database request by conveying one or more requests for the information to the database arrangement;
   identifying, by the driver, based on the permissions, the portion of restricted information from the one or more records among the set of records within the obtained information from the records in the set of records;
   modifying, by the driver, the portion of restricted information identified in the obtained information from the one or more records in the set of records without modifying at least some other portion of the obtained information from the records in the set of records; and
   providing, by the driver, to the application responsive to the database request, a database response including the at least some other portion of the obtained information.

2. The medium of claim 1, wherein:
   the application is configured to generate the database request with an appended field including the at least one value indicative of the user of the application or the client executing the application.

3. The medium of claim 1, wherein conveying one or more requests for the information to the database arrangement comprises:
   conveying the one or more requests with an appended field including the value to another driver configured to communicate with the database arrangement, and
   wherein the another driver by which the one or more requests are conveyed to the database arrangement does not process the appended field within the one or more requests.

4. The medium of claim 2, wherein conveying one or more requests for the information to the database arrangement comprises:
   conveying the one or more requests with an appended field including the value to the database arrangement, and
   wherein the database arrangement does not process the appended field within the one or more requests.

5. The medium of claim 2, wherein:
   conveying one or more requests for the information to the database arrangement comprises conveying the one or more requests with an appended field including the value,
   requests received by the database arrangement are stored to a log, and
   the log is operable to indicate a set of requests each having an appended field including a same value.

6. A tangible, non-transitory, machine-readable medium storing instructions that when executed by one or more processors effectuate operations comprising:
   obtaining a database request generated by an application executing on a client computing device;
   detecting at least one value indicative of a user of the application or the client computing device executing the application that generated the database request;
   obtaining policy information conveying permissions to access information in at least some records within a database arrangement for some users or some client devices;
   determining, based on the permissions and the value, whether the user of the application or the client executing the application is requesting access to a portion of restricted information from one or more records within the database arrangement among a set of records implicated by the database request;
   conveying one or more requests for information of records in the set of records implicated by the database request to the database arrangement;
   identifying the portion of restricted information obtained from the one or more records within one or more database responses based on the one or more requests;
   modifying the portion of restricted information identified within the one or more database responses without modifying at least some other portion of unrestricted information within the database responses; and
   providing, to the application responsive to the database request, a modified database response based on the one or more database responses and the modifying, the modified database response including the unrestricted information.

7. The medium of claim 6, wherein the policy information comprises one or more rules by which permissions to access information in the at least some records within the database arrangement are specified for different groups of users or groups of client devices.

8. The medium of claim 6, wherein:
   the policy information comprises keys and corresponding permission values,
   a first set of the keys correspond to user or client device identifiers and corresponding first permission values indicate respective first access designations; and
   a second set of the keys correspond to identifiers of restricted information in records and corresponding second permission values indicate respective second access designations.

9. The medium of claim 8, wherein modifying the portion of restricted information identified within the one or more database responses without modifying at least some other portion of unrestricted information comprises:
   identifying a first access designation corresponding to a key in the first set of the keys matching the at least one value indicative of the user or the client device;
   identifying a second access designation corresponding to a key in the second set of the keys matching an identifier of restricted information, from the portion of restricted information, in a record associated with a database response; and modifying the restricted information in the record in response to determining that the first access designation does not permit access to the restricted information in the record having the second access designation.

10. The medium of claim 6, wherein modifying the portion of restricted information identified within the one or more database responses without modifying at least some other portion of unrestricted information comprises:

identifying values corresponding to restricted information based on permissions associated with respective records on which information in a given database response of the one or more database responses is based, and one or more of:
replacing an identified value with a replacement value based on the respective identified value, wherein the replacement value does not reveal the respective identified value;
replacing a portion of an identified value with a replacement portion that does not reveal the portion of the respective identified value;
replacing an identified value with a random replacement value, a null value, or a value indicative of the identified value being denied to the user or the client; and
replacing an identified value with a reference value by which the identified value may be referenced in the database arrangement without revealing the identified value.

11. The medium of claim 6, wherein:
the database arrangement includes a relational database configured to be accessed with structured query language (SQL) statements by which records satisfying criteria specified in a statement are selected and returned responsive to a given database request including the statement, records are joined across two or more tables, or records or values in records are written.

12. The medium of claim 6, wherein:
the database arrangement includes a document-oriented database storing a plurality of serialized hierarchical data format document records and configured to be accessed via xpath or JSON-path statements.

13. A method of application-level user permissioning comprising:
obtaining, by a driver of a client executing an application, a database request generated by the application executing on the client;
detecting, by the driver, at least one value indicative of a user of the application or the client executing the application that generated the database request;
obtaining, by the driver, policy information conveying permissions to access information in at least some records within a database arrangement for some users or some client devices;
determining, by the driver, based on the permissions and the detected value, whether the user of the application or the client executing the application is requesting access to a portion of restricted information from one or more records within the database arrangement among a set of records implicated by the database request;
obtaining, by the driver, information of records in the set of records implicated by the database request by conveying one or more requests for the information to the database arrangement;

identifying, by the driver, based on the permissions, the portion of restricted information from the one or more records among the set of records within the obtained information from the records in the set of records;
modifying, by the driver, the portion of restricted information identified in the obtained information from the one or more records in the set of records without modifying at least some other portion of the obtained information from the records in the set of records; and
providing, by the driver, to the application responsive to the database request, a database response including the at least some other portion of the obtained information.

14. The method of claim 13, wherein:
the application is configured to generate the database request with an appended field including the at least one value indicative of the user of the application or the client executing the application.

15. The method of claim 13, wherein conveying one or more requests for the information to the database arrangement comprises:
conveying the one or more requests with an appended field including the value to another driver configured to communicate with the database arrangement, and
wherein the another driver by which the one or more requests are conveyed to the database arrangement does not process the appended field within the one or more requests.

16. The method of claim 14, wherein conveying one or more requests for the information to the database arrangement comprises:
conveying the one or more requests with an appended field including the value to the database arrangement, and
wherein the database arrangement does not process the appended field within the one or more requests.

17. The method of claim 14, wherein:
conveying one or more requests for the information to the database arrangement comprises conveying the one or more requests with an appended field including the value,
requests received by the database arrangement are stored to a log, and
the log is operable to indicate a set of requests each having an appended field including a same value.

18. A method of application-level user permissioning comprising:
obtaining a database request generated by an application executing on a client computing device;
detecting at least one value indicative of a user of the application or the client computing device executing the application that generated the database request;
obtaining policy information conveying permissions to access information in at least some records within a database arrangement for some users or some client devices;
determining, based on the permissions and the value, whether the user of the application or the client executing the application is requesting access to a portion of restricted information from one or more records within the database arrangement among a set of records implicated by the database request;
conveying one or more requests for information of records in the set of records implicated by the database request to the database arrangement;
identifying the portion of restricted information obtained from the one or more records within one or more database responses based on the one or more requests;

modifying the portion of restricted information identified within the one or more database responses without modifying at least some other portion of unrestricted information within the database responses; and providing, to the application responsive to the database request, a modified database response based on the one or more database responses and the modifying, the modified database response including the unrestricted information.

19. The method of claim 18, wherein the policy information comprises one or more rules by which permissions to access information in the at least some records within the database arrangement are specified for different groups of users or groups of client devices.

20. The method of claim 18, wherein:
the policy information comprises keys and corresponding permission values,
a first set of the keys correspond to user or client device identifiers and corresponding first permission values indicate respective first access designations; and
a second set of the keys correspond to identifiers of restricted information in records and corresponding second permission values indicate respective second access designations.

21. The method of claim 20, wherein modifying the portion of restricted information identified within the one or more database responses without modifying at least some other portion of unrestricted information comprises:
identifying a first access designation corresponding to a key in the first set of the keys matching the at least one value indicative of the user or the client device;
identifying a second access designation corresponding to a key in the second set of the keys matching an identifier of restricted information, from the portion of restricted information, in a record associated with a database response; and
modifying the restricted information in the record in response to determining that the first access designation does not permit access to the restricted information in the record having the second access designation.

22. The method of claim 18, wherein modifying the portion of restricted information identified within the one or more database responses without modifying at least some other portion of unrestricted information comprises:
identifying values corresponding to restricted information based on permissions associated with respective records on which information in a given database response of the one or more database responses is based, and
one or more of:
replacing an identified value with a replacement value based on the respective identified value, wherein the replacement value does not reveal the respective identified value;
replacing a portion of an identified value with a replacement portion that does not reveal the portion of the respective identified value;
replacing an identified value with a random replacement value, a null value, or a value indicative of the identified value being denied to the user or the client; and
replacing an identified value with a reference value by which the identified value may be referenced in the database arrangement without revealing the identified value.

23. The method of claim 18, wherein:
the database arrangement includes a relational database configured to be accessed with structured query language (SQL) statements by which records satisfying criteria specified in a statement are selected and returned responsive to a given database request including the statement, records are joined across two or more tables, or records or values in records are written.

24. The method of claim 18, wherein:
the database arrangement includes a document-oriented database storing a plurality of serialized hierarchical data format document records and configured to be accessed via xpath or JSON-path statements.

* * * * *